(12) United States Patent
Sato

(10) Patent No.: US 8,698,734 B2
(45) Date of Patent: Apr. 15, 2014

(54) ELECTROPHORETIC DISPLAY DEVICE, DRIVING METHOD OF THE SAME, AND ELECTRONIC APPARATUS

(75) Inventor: Takashi Sato, Chino (JP)

(73) Assignee: Seiko Epson Corporation (JP)

( * ) Notice: Subject to any disclaimer, the term of this patent is extended or adjusted under 35 U.S.C. 154(b) by 389 days.

(21) Appl. No.: 13/083,885

(22) Filed: Apr. 11, 2011

(65) Prior Publication Data

US 2011/0249043 A1 Oct. 13, 2011

(30) Foreign Application Priority Data

Apr. 12, 2010 (JP) ................................ 2010-091368
Mar. 15, 2011 (JP) ................................ 2011-056716

(51) Int. Cl.
*G09G 3/34* (2006.01)

(52) U.S. Cl.
USPC ........................... 345/107; 345/690; 359/296

(58) Field of Classification Search
USPC ........................... 345/107, 204, 690; 359/296
See application file for complete search history.

(56) References Cited

U.S. PATENT DOCUMENTS

| | | | |
|---|---|---|---|
| 6,144,361 A | 11/2000 | Gordon, II et al. | |
| 6,806,995 B2 | 10/2004 | Chung et al. | |
| 7,027,029 B2 | 4/2006 | Yamaguchi et al. | |
| 7,046,228 B2 | 5/2006 | Liang et al. | |
| 7,145,547 B2 | 12/2006 | Johnson | |
| 7,492,505 B2 | 2/2009 | Liang et al. | |
| 7,675,502 B2 * | 3/2010 | Chopra et al. | 345/107 |
| 7,679,813 B2 | 3/2010 | Liang et al. | |
| 7,821,702 B2 | 10/2010 | Liang et al. | |
| 7,982,941 B2 | 7/2011 | Lin et al. | |
| 8,018,642 B2 | 9/2011 | Yeo et al. | |
| 8,054,288 B2 | 11/2011 | Sugita et al. | |
| 8,072,675 B2 | 12/2011 | Lin et al. | |
| 8,089,687 B2 | 1/2012 | Mabeck et al. | |
| 8,441,713 B2 | 5/2013 | Kawashima et al. | |
| 2001/0030639 A1 | 10/2001 | Goden | |
| 2002/0018042 A1* | 2/2002 | Albert et al. | 345/107 |
| 2002/0033793 A1* | 3/2002 | Machida et al. | 345/107 |
| 2002/0113770 A1 | 8/2002 | Jacobson et al. | |
| 2002/0180688 A1 | 12/2002 | Drzaic et al. | |
| 2003/0034950 A1 | 2/2003 | Liang et al. | |
| 2005/0012707 A1 | 1/2005 | Liu | |
| 2005/0270267 A1 | 12/2005 | Johnson | |
| 2006/0146242 A1 | 7/2006 | Kim et al. | |
| 2006/0187189 A1* | 8/2006 | Komatsu | 345/107 |

(Continued)

FOREIGN PATENT DOCUMENTS

| | | |
|---|---|---|
| JP | 2007-240679 | 9/2007 |
| JP | 2007-310182 | 11/2007 |

(Continued)

*Primary Examiner* — Stephen Sherman
(74) *Attorney, Agent, or Firm* — Harness, Dickey & Pierce, P.L.C.

(57) ABSTRACT

An electrophoretic display device is provided with a first substrate, a second substrate, an electrophoretic layer which is arranged between the first substrate and the second substrate and has at least a dispersion medium and particles mixed in the dispersion medium, a first electrode which is formed in an island shape on the electrophoretic layer side of the first substrate for each pixel, and a second electrode which is formed on the electrophoretic layer side of the second substrate with an area wider than the first electrode, where gradation is controlled using an area of the particles which are visually recognized when the electrophoretic layer is viewed from the second electrode side.

20 Claims, 32 Drawing Sheets

(56) References Cited

U.S. PATENT DOCUMENTS

| | | |
|---|---|---|
| 2007/0211330 A1 | 9/2007 | Ohshima et al. |
| 2007/0222745 A1 | 9/2007 | Kawai |
| 2007/0268245 A1 | 11/2007 | Sugita et al. |
| 2008/0024688 A1 | 1/2008 | Mizoguchi |
| 2008/0174851 A1 | 7/2008 | Kawai et al. |
| 2008/0291527 A1 | 11/2008 | Kim et al. |
| 2009/0268274 A1 | 10/2009 | Masuzawa et al. |
| 2010/0053490 A1 | 3/2010 | Kang et al. |
| 2010/0085628 A1 | 4/2010 | Lee |
| 2010/0245981 A1 | 9/2010 | Yeo et al. |

FOREIGN PATENT DOCUMENTS

| | | |
|---|---|---|
| JP | 2009-9092 | 1/2009 |
| JP | 2009-98382 | 5/2009 |
| WO | WO2010-110806 | 9/2010 |

* cited by examiner

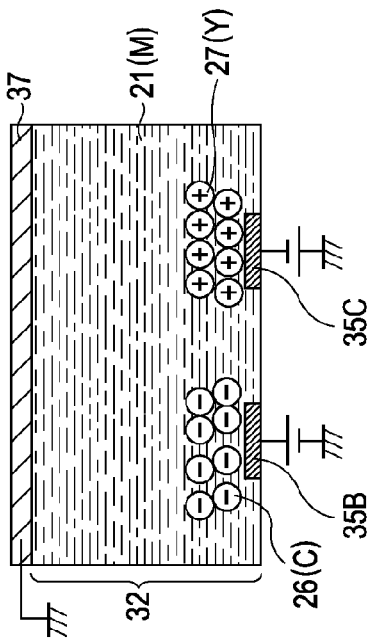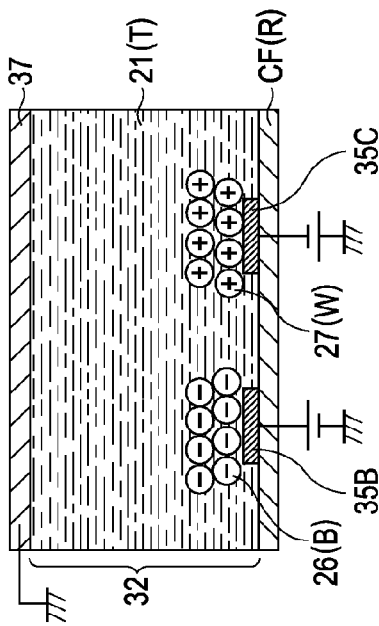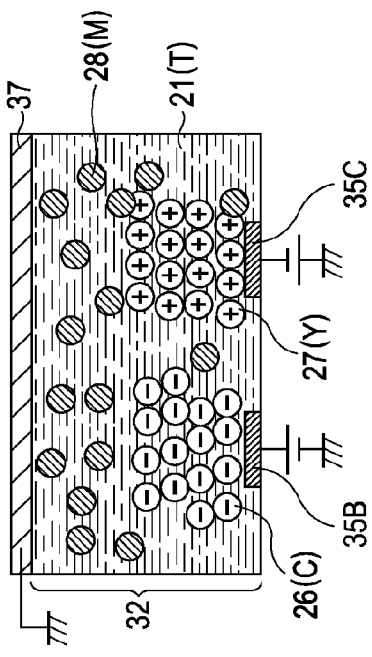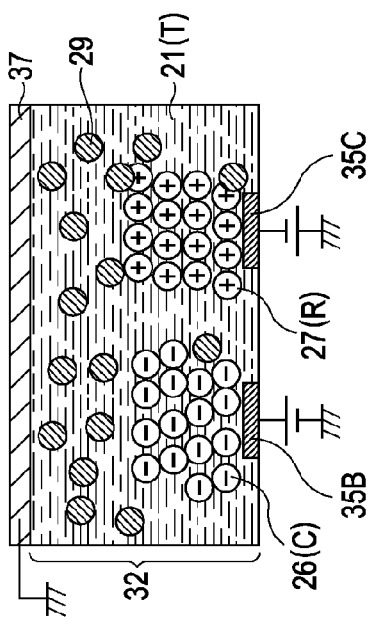

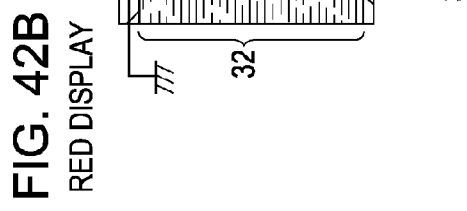
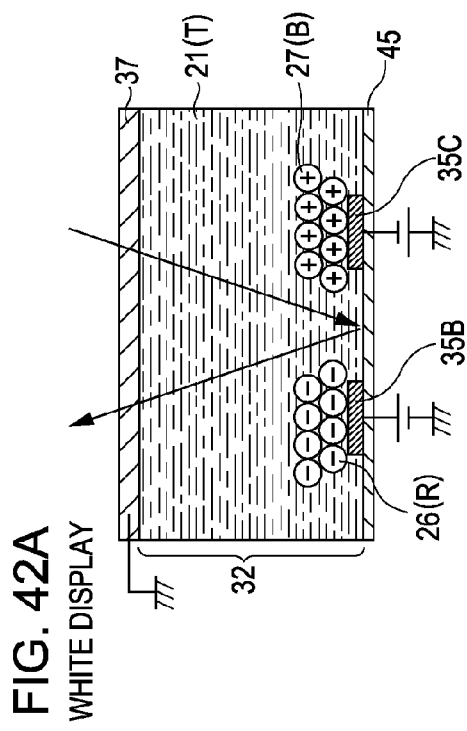
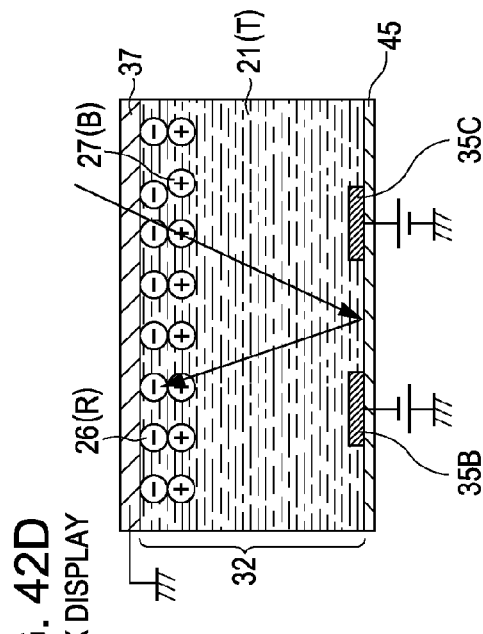
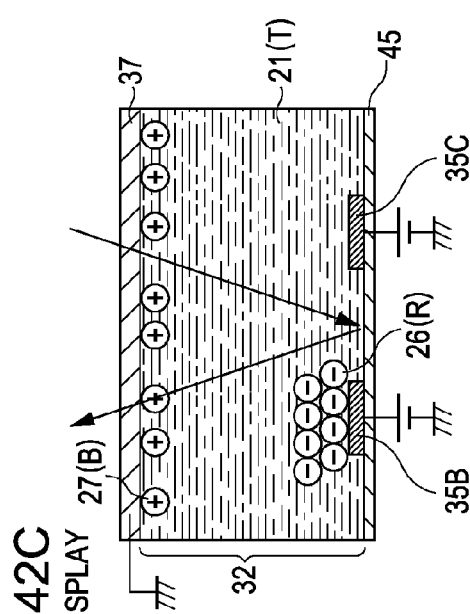

PALE RED DISPLAY

BLACK DISPLAY

ELECTROPHORETIC DISPLAY DEVICE, DRIVING METHOD OF THE SAME, AND ELECTRONIC APPARATUS

CROSS-REFERENCE TO RELATED APPLICATION

This application is based on and claims priority from Japanese Patent Application No. 2010-091368, filed on Apr. 12, 2010, and Japanese Patent Application No. 2011-056716, filed on Mar. 15, 2011, the contents of which are incorporated herein by reference.

BACKGROUND

1. Technical Field

The present invention relates to an electrophoretic display device, a driving method of the same and an electronic apparatus.

2. Related Art

In recent years, as a display portion such as electronic paper, electrophoretic display devices have come to be used. The electrophoretic display device has a configuration which has an electrophoretic dispersion liquid where a plurality of electrophoretic particles is dispersed in a liquid-phase dispersion medium (dispersion medium). The electrophoretic display device is a device where the distribution state of the electrophoretic particles changes due to the application of an electric field and changes in the optical properties of the electrophoretic dispersion liquid are used for display.

In regard to the electrophoretic display device such as this, there is proposed a concept of a color electrophoretic display device which uses three particles such as is disclosed in JP-A-2009-9092 and JP-A-2009-98382. Here, there are disclosed three particles of a particle which is charged with a positive charge, a particle which is charged with a negative charge, and a particle with no charge which are driven using three electrodes.

However, in JP-A-2009-9092 and JP-A-2009-98382, there are issues with the controllability of brightness and saturation in one sub pixel in order to realize a color electrophoretic display device, and it is difficult to perform a full-color display. In the color electrophoretic display device, a method is desirable where all three of brightness, saturation, and hue or at least one is controlled in an analog manner.

SUMMARY

An advantage of some aspects of the invention is that an electrophoretic display device, a driving method of the same, and an electronic apparatus are provided which are able to control all three of brightness, saturation, and hue or at least one by controlling the movement of particles and to perform an excellent color display.

An electrophoretic display device according to an aspect of the invention is provided with a first substrate, a second substrate, an electrophoretic layer which is arranged between the first substrate and the second substrate and has at least a dispersion medium and particles mixed in the dispersion medium, a first electrode which is formed in an island shape on the electrophoretic layer side of the first substrate and is provided for each pixel, and a second electrode which is formed on the electrophoretic layer side of the second substrate with an area wider than the first electrode, where gradation is controlled using an area of the particles which are visually recognized when the electrophoretic layer is viewed from the second electrode side.

According to the aspect, using the polarity of a voltage applied to the first electrode and the second electrode, it is possible to control the movement and the distribution range of the particles mixed in the dispersion medium of the electrophoretic layer. According to this, it is possible to control all three of brightness, saturation, and hue or at least one, and it is possible to provide an electrophoretic display device which can perform an excellent color display. According to the aspect, since it is possible to distribute the particles on the second electrode by applying an arbitrary voltage to the first electrode and the second electrode, a desired color display is obtained by controlling the gradation using an area of the particles which are visually recognized when the electrophoretic layer is viewed from the second electrode side. In addition, since the first electrode provided for each pixel has an area which is equal to or less than ¼ of the pixel, it is possible for the particles to be distributed in small dot regions on the second electrode, and as a result, the gradation width is broadened.

In addition, it is preferable that a plurality of first electrodes is provided for each pixel and each of the plurality of first electrodes are mutually connected at a layer further to the first substrate side than the first electrodes.

According to the aspect, it is possible to apply the same voltage simultaneously to the plurality of first electrodes.

In addition, it is preferable that there is a third electrode formed in an island shape for each pixel on the electrophoretic layer side of the first substrate, and the first electrode and the third electrode are driven independently of each other.

According to the aspect, the first electrode and the third electrode are driven independently of each other, and it is possible to control the two-dimensional and three-dimensional distribution of the particles on the second electrode using voltages applied to each of the first electrode and the third electrode.

In addition, it is preferable that the particles are charged particles which have a positive or negative charge and non-charged particles with a color different from the charged particles are mixed in the dispersion medium.

According to the aspect, it is possible to control the movement of two types of particles according to the polarity of the voltage applied to the first electrode and the third electrode since at least two types of particles which have either a positive or negative polarity are mixed in the dispersion medium.

In addition, it is preferable that a mixed color of the color of the non-charged particles and the color of the charged particles is displayed according to an area of the non-charged particles and an area of the charged particles which are visually recognized when the electrophoretic layer is viewed from the second electrode side.

According to the aspect, since a mixed color of a first color and a second color is displayed according to an area of the particles with the first color and an area of the particles with the second color which are visually recognized when the electrophoretic layer is viewed from the second electrode side, it is possible to perform a desired color display by controlling the distribution area of the particles with the first color and the particles with the second color.

In addition, it is preferable that first particles which have a positive charge and second particles which have a negative charge and a color different from the first particles are mixed in the dispersion medium.

According to the aspect, for example, through mixing of the particles which are non-charged particles with a different color, it is possible to express more colors using combinations with the particles which have arbitrary colors.

In addition, it is preferable that a mixed color of the color of the first particles and the color of the second particles is displayed according to an area of the first particles and an area of the second particles which are visually recognized when the electrophoretic layer is viewed from the second electrode side.

According to the aspect, it is possible to display an arbitrary color by controlling the movement and distribution area of each of the particles which have a positive or negative charge. That is, it is possible to control the movement of the particles to the second electrode side using the polarity of the voltage applied to the first electrode and the third electrode. According to this, it is possible to distribute particles with an arbitrary color on the second electrode.

In addition, it is preferable that the width of the first electrodes and the third electrodes in a direction where the first electrodes are adjacent to each other and a direction where the first electrodes and the third electrodes are adjacent is shorter than the gap between the first electrode and the second electrode.

According to the aspect, since the width of the first electrodes and the third electrodes in the direction where the first electrodes are adjacent to each other and the direction where the first electrodes and the third electrodes are adjacent is set to a shorter dimension than the gap between the first electrode and the second electrode, it is possible to make the distribution ranges of the particles smaller and it is possible to perform small dot display. It is possible to adjust the gradation (color) using the size of the dots.

In addition, it is preferable that the widths of the first electrode and the third electrode are equal to or less than half of the length of the gap between the first electrode and the second electrode.

According to the aspect, it is possible to perform display with smaller dots and the colors which can be expressed increases.

In addition, it is preferable that the dispersion medium is colored.

According to the aspect, the number of colors which can be expressed increases due to combinations with the colored particles.

In addition, it is preferable that a color filter is provided on the first substrate side or the second substrate side of the electrophoretic layer.

According to the aspect, since the color filter is provided, the number of colors which can be expressed increases due to combinations with the colored particles.

In addition, it is preferable that the particles have a transparent portion and a colored portion, and the colored portion is configured so that transmissivity varies according to wavelength.

According to the aspect, it is possible to express pale colors.

According to another aspect of the invention, a driving method of an electrophoretic display device which is provided with a first substrate, a second substrate, an electrophoretic layer which is arranged between the first substrate and the second substrate and has at least a dispersion medium and particles mixed in the dispersion medium, a first electrode which is formed in an island shape on the electrophoretic layer side of the first substrate and is provided for each pixel, a second electrode which is formed on the electrophoretic layer side of the second substrate with an area wider than the first electrode, where gradation is controlled using an area of the particles which are visually recognized when the electrophoretic layer is viewed from the second electrode side, includes the steps of applying a voltage for drawing the particles to the first electrode side to each of the first electrode and the second electrode and applying a voltage for moving the particles to the second electrode side to each of the first electrode and the second electrode.

According to the aspect, since the applying of a voltage for drawing the particles to the first electrode side to each of the first electrode and the third electrode and the applying of a voltage for moving the particles to the second electrode side to each of the first electrode and the third electrode is included, it is possible to write a new display after having returned once to an initial state.

According to this, the movement of the particles is smoothly performed and it is possible to stably obtain a desired display.

In addition, it is preferable that the two-dimensional and three-dimensional distribution of the charged particles on the second substrate side is controlled using the size and the application time of the voltage applied to the first electrode and the second electrode.

According to the aspect, by controlling the two-dimensional and three-dimensional distribution of the particles on the second substrate side using the size and the application time of the voltage applied to the electrodes, it is possible to perform gradation control and it is possible to express a display of an arbitrary color.

In addition, it is preferable that the application time is controlled using a pulse width or the number of frames.

According to the aspect, by controlling the application time where the voltage is applied to the first electrode and the second electrode using a pulse width or the number of frames, it is possible to control gradation.

In addition, it is preferable that the electrophoretic display device has a third electrode formed in an island shape for each pixel on the electrophoretic layer side of the first substrate and voltages which are different from each other are applied at the same time to the first electrode and the third electrode.

According to the aspect, by applying the voltages which are different from each other at the same time to the first electrode and the third electrode, it is possible to promptly perform image switching.

In addition, it is preferable that the electrophoretic display device has a third electrode formed in an island shape for each pixel on the electrophoretic layer side of the first substrate and voltages which are different from each other are sequentially applied to the first electrode and the third electrode.

According to the aspect, by sequentially applying the voltages which are different from each other to the first electrode and the third electrode, it is possible to control the two-dimensional and the three dimensional distribution of the particles on the second substrate side.

In addition, it is preferable that the electrophoretic display device has a third electrode formed in an island shape for each pixel on the electrophoretic layer side of the first substrate, and there are the steps of performing a first preset operation where the particles are drawn to the first electrode side and the third electrode side by a positive voltage being applied to the first electrode with regard to the second electrode and a negative voltage being applied to the third electrode with regard to the second electrode, and performing a second preset operation where the particles are drawn to the first electrode side and the third electrode side by a negative voltage being applied to the first electrode with regard to the second electrode and a positive voltage being applied to the third electrode with regard to the second electrode.

According to the aspect, since the first preset operation and the second preset operation are performed, by the display being performed by the switching of the polarity of the voltage applied to the first electrode and the third electrode, the DC component between the first electrode, the second electrode, and the third electrode disappears and each of the electrodes are driven using an alternating current. According to this, it is possible to prevent deterioration of the electrophoretic material, corrosion of the electrodes, and the like.

In addition, it is preferable that the first preset operation and the second preset operation are alternately performed.

According to the aspect, since the first preset operation and the second preset operation are alternately performed, it is possible to perform display after having returned once to an initial state using the preset operations. According to this, the movement of the particles becomes smoother than when display operations are continuously executed and it is possible to stably obtain a desired switching display.

An electronic apparatus according to still another aspect of the invention is provided with the electrophoretic display device of the invention.

According to the aspect, since a display portion is provided which can display color without using sub pixels, it is possible to appropriately control at least any of the brightness, saturation, and hue of a display image (display color).

BRIEF DESCRIPTION OF THE DRAWINGS

The invention will be described with reference to the accompanying drawings, wherein like numbers reference like elements.

FIGS. 33A to 33D are cross-sectional diagrams illustrating a schematic configuration of different applied examples.

FIGS. 42A to 42D are diagrams illustrating the distribution state of the charged particles in another embodiment.

DESCRIPTION OF EXEMPLARY EMBODIMENTS

Below, the embodiments of the invention will be described with reference to the diagrams. In addition, in each diagram used in the description below, scaling of each component is suitably changed in order to make each component an identifiable size. In the specifications, each of the colors red, green, and blue will be respectively denoted by R, G and B, and each of the colors cyan, magenta, and yellow will be respectively denoted by C, M, and Y.

First Embodiment

Figure 1A:
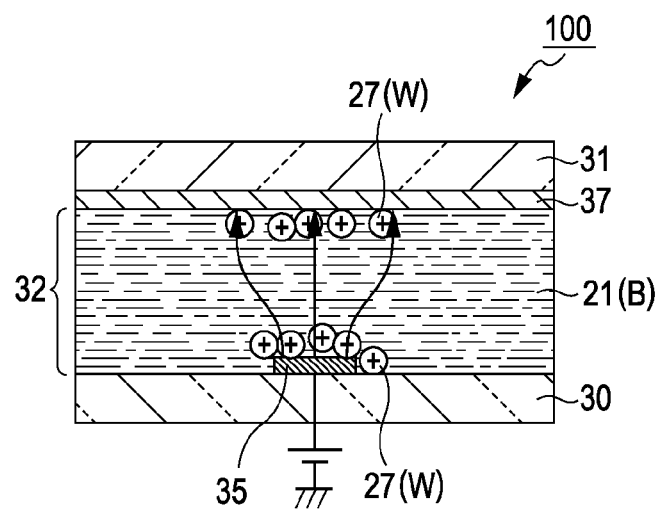
FIGS. 1A and 1B are diagrams illustrating an overall configuration of an electrophoretic display device according to a first embodiment.
Figure 1B:
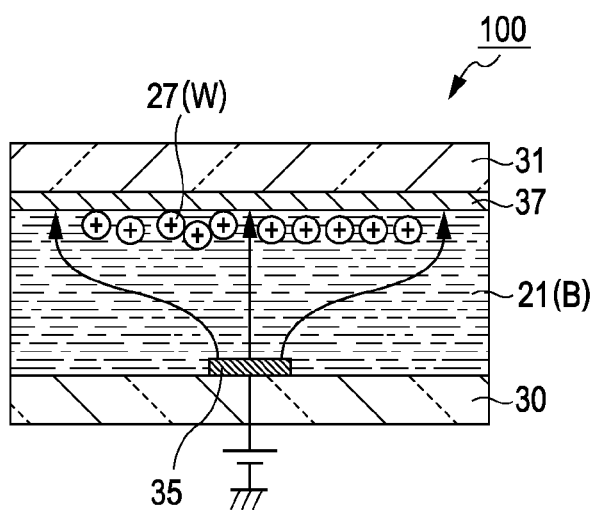

First, a concept which is the basis of the invention will be shown. FIGS. 1A and 1B are partial cross-sectional diagrams illustrating an electrophoretic display device according to a first embodiment. The display device uses an electrophoretic material and the configuration in FIGS. 1A and 1B is simplified to explain a principle.

As shown in FIGS. 1A and 1B, in a electrophoretic display device 100, an electrophoretic layer 32 is interposed between a first substrate 30 and a second substrate 31. A pixel electrode 35 (first electrode) with an island shape is formed on a surface of the electrophoretic layer 32 side of the first substrate 30, and an opposing electrode 37 (second electrode) is formed on the surface of the electrophoretic layer 32 side of the second substrate 31. The opposing electrode 37 covers the pixel electrode 35 in a planar view, is formed wider than the pixel electrode 35, and is formed in a region which covers at least a portion of the second substrate 31 which contributes to the display.

In the electrophoretic layer 32 which is formed between the plurality of pixel electrodes 35 and the opposing electrode 37, a plurality of positively charged particles 27 (W) with a white color which have a positive charge (first electrophoretic particles) are mixed in a dispersion medium 21 (B) with a black color. The charged particles, such as the positively charged particles 27 (W), act as electrophoretic particles in the electrophoretic layer 32. When a negative voltage is applied to the pixel electrode 35, the positively charged particles 27 (W) are collected on the pixel electrode 35. At this time, in a case where positive voltages which are different from each other are applied to the pixel electrodes 35, how the white particles are arranged on the opposing electrode 37 is considered. Here, a ground potential is applied to the opposing electrode 37 as a common potential. In addition, out of the positive voltages applied to the pixel electrode 35, the voltage which is the absolute maximum value is a voltage VH (referred to below as the maximum positive value), and out of the negative voltages applied to the pixel electrode 35, the voltage which is the absolute maximum value is a voltage VL (referred to below as the maximum negative value).

In addition, "applying a voltage to a pixel electrode" has the same meaning as a "potential which generates the voltage with a ground potential being supplied to an electrode".

As shown in FIG. 1A, when a positive voltage Vh with an intermediate size (Vh<VH) is applied in the pixel electrode 35, the positively charged particles 27 (W) move to the opposing electrode 37 side due to the electric field which is caused by a difference in potential (voltage) between a potential corresponding to the potential Vh and the ground potential of the opposing electrode 37. However, since the voltage is not large, the positively charged particles 27 (W) are distributed so as to hardly spread out on the opposing electrode 37 side. This is due to the following reason. That is, the particles 27 (W) move even due to an inclined electric field (an electric field from the pixel electrode 35 which has a line of electric force with an inclined direction with regard to a normal line of the first substrate 30), but the inclined electric field does not become large since the original electric field is not large. As such, the amount of movement of the particles 27 (W) is small in a direction which is parallel to the second substrate 31, and it is possible to concentrate the particles in a narrow range and realize a distribution in a spot manner. In addition, the number of moved particles is also small. As such, here, it is possible to realize a small area of white display.

On the other hand, as shown in FIG. 1B, when the large positive voltage VH (maximum positive value) is applied to the pixel electrode 35, since a difference in potential (voltage) between the pixel electrode 35 and the opposing electrode 37 becomes larger than the case of FIG. 1A, a larger electric field is generated between the pixel electrode 35 and the opposing electrode 37. As a result, more of the particles 27 (W) than in the case of FIG. 1A move to the second substrate 31 side, and typically, almost all of the particles 27 (W) move to the second substrate 31 side. In addition, since the electric field becomes larger and the inclined electric field from the pixel electrode 35 also becomes larger, the particles 27 (W) are distributed over a wider range in the direction which is parallel to the second substrate 31 due to the inclined electric field, and the distribution range spreads out in a planar view. As such, in FIG. 1B, it is possible to realize a white display with an area larger than in FIG. 1A.

In addition, in a case where the particles 27 (W) are not moved to the opposing electrode 37 side, that is, in a case where a negative voltage is applied to each of the pixel electrodes 35 and all of the particles 27 (W) are collected on the pixel electrodes 35, since the color of the dispersion medium 21 (B) with a black color is visually recognized from the second substrate 31 side, all of the pixels display black.

In this manner, by controlling the number of the particles 27 (W) which reach the opposing electrode 37 and the distribution state (distribution region), it is possible to control a black display, a white display, or an intermediate gradation display from black to white. In addition, due to the plurality of pixel electrodes 35 being provided with an island shape in one pixel, it is possible to control the display with greater controllability.

Below, detailed control will be described.

FIGS. 2A to 2D are explanatory diagrams of a driving method of the electrophoretic display device.

In the electrophoretic display device shown in FIGS. 2A to 2D, the positively charged particles 27 (W) with a white color which have a positive charge (first electrophoretic particles) are present in the dispersion medium 21 (B) with a black color, and there is a configuration where the two pixel electrodes 35 and 35 shown in the diagrams are applied with the same potential. The positively charged particles 27 (W) are colorless and transparent particles.

Figure 2A:
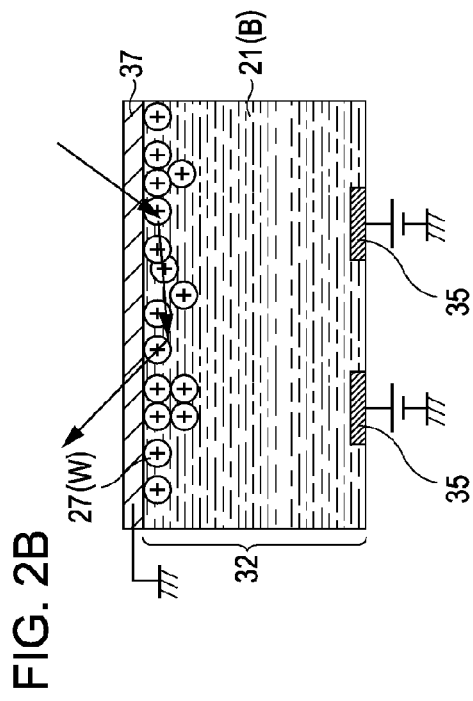
FIGS. 2A to 2D are explanatory diagrams of a driving method of the electrophoretic display device according to the first embodiment.

In FIG. 2A, the negative voltage VL (maximum negative value) is applied to each of the pixel electrodes 35 and 35. In this case, the positively charged particles 27 (W) collect on the pixel electrodes 35 and 35, and there is only the color of the dispersion medium 21 (B) with a black color that is visually recognized when viewed from the opposing electrode 37 side. As such, here, black is displayed. The arrows in FIG. 2A show an appearance of the incident light being absorbed. In FIG. 2A, the incident light is absorbed by the dispersion medium 21 (B) with a black color.

Figure 2B:
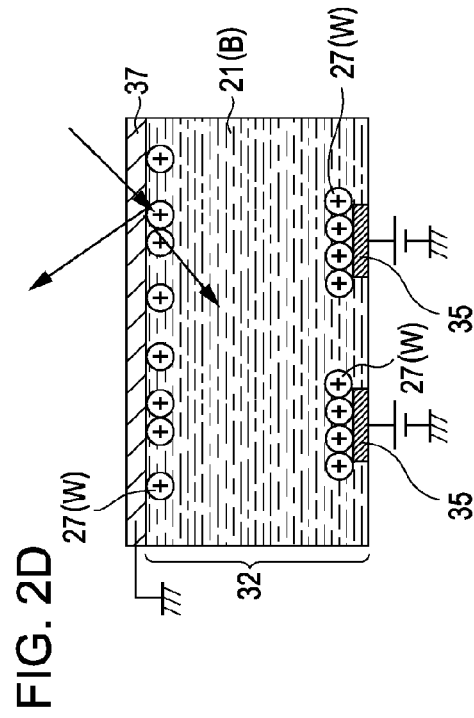

In FIG. 2B, the positive voltage VH (maximum positive value) is applied to each of the pixel electrodes 35 and 35. In this case, the positively charged particles 27 (W) are moved to the opposing electrode 37 side and collect on the opposing electrode 37. The positively charged particles 27 (W) are two-dimensionally or three-dimensionally distributed on the opposing electrode 37 side and the color of many of the positively charged particles 27 (W) is visually recognized when the electrophoretic layer 32 is viewed from the opposing electrode 37 side. As such, here, white is displayed. As shown by the arrows in FIG. 2B, since the incident light is scattered one time or a plurality of times due to the positively charged particles 27 (W) and returns to the viewing side, white is shown as described above. In this manner, even if the positively charged particles 27 (W) are particles with transmissivity, white display is performed due to the incident light being scattered to the viewing side by the positively charged particles 27 (W).

Figure 2C:
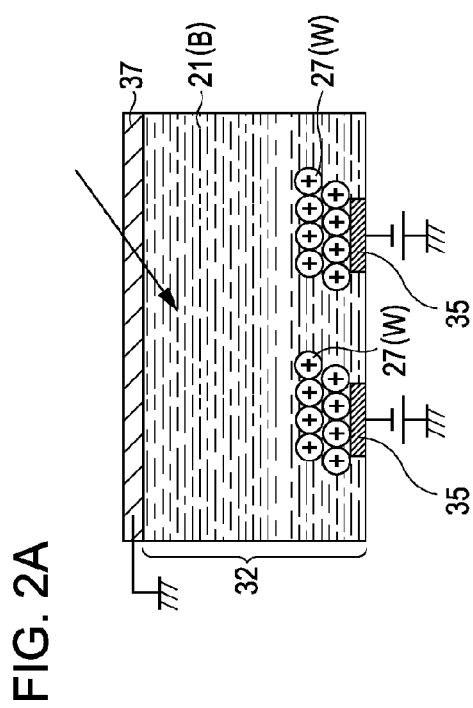

In FIG. 2C, a positive voltage Vh smaller than in FIG. 2B (Vh<VH) is applied to the pixel electrodes 35 and 35. In this case, a small amount of the positively charged particles 27 (W) are moved to the opposing electrode 37 side in a spot manner, that is, in a state where the distribution range is small in a planar view compared to in FIG. 2B. Since a white region due to the positively charged particles 27 (W) and a black region due to the dispersion medium 21 (B) with a black color are intermingled in the opposing electrode 37 side, overall, gray is displayed. As shown by the arrows in FIG. 2C, there are components of the incident light which are scattered to the viewing side by the positively charged particles 27 (W) and components which are absorbed by the dispersion medium 21 (B) with a black color, and when the components are combined, overall, gray is displayed.

Figure 2D:
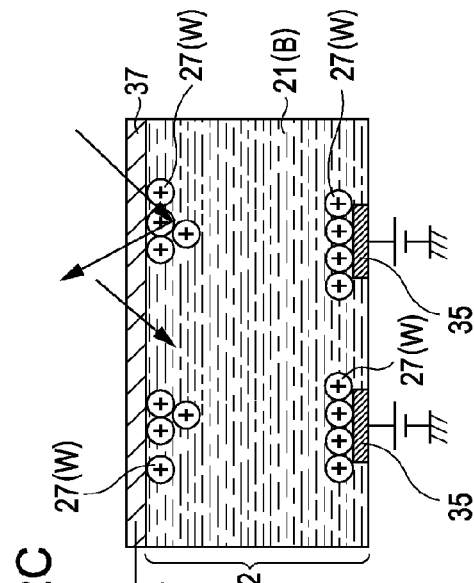

FIG. 2D shows a different method of performing gray display. As shown in FIG. 2D, a positive voltage Vh smaller than in FIG. 2B (Vh<VH) is applied to each of the pixel electrodes 35 and 35, and a portion of the positively charged particles 27 (W) are moved to the opposing electrode 37 side. However, differently to the case of FIG. 2C, the positively charged particles 27 (W) are distributed in a wide range in a planar view. In the case of this state, since the number of particles is too small to display all white, the black of the dispersion medium 21 (B) also contributes to display, and as a result, gray is displayed. As shown by the arrows in FIG. 2D, there are components of the incident light which are scattered to the viewing side by the positively charged particles 27 (W) and components which are absorbed by the dispersion medium 21 (B) with a black color, and when the components are combined, overall, gray is displayed.

In addition, the control of the movement amount and the distribution range of the positively charged particles 27 (W) in the FIGS. 2C and 2D is possible due to design factors, such as the distance between the pixel electrodes 35 and 35 and the size of the pixel electrodes 35 and 35, and the applied voltage.

In addition, in the description of FIGS. 2A to 2D, the movement amount and the distribution range of the positively charged particles 27 (W) is controlled by the size of the voltage applied to each of the pixel electrodes 35 and 35, but control is possible also through the length of the voltage application time.

The control of brightness is performed using the area of the particles 27 (W) where the particles 27 (W) are visually recognized when the electrophoretic layer 32 is viewed from the outer side of the opposing electrode 37. In the white display due to the particles 27 (W), since it is necessary that the incident light is scattered a plurality of times by the particles, three-dimensional distribution in a depth direction in the electrophoretic layer 32 is necessary. The visually recognized area described above refers to an effective area which is actually visually recognized and includes the two-dimensional and three-dimensional distribution of the particles.

As described above, using the control of the movement amount and the distribution range of the positively charged particles 27 (W), it is possible to control brightness in each pixel.

The movement between FIGS. 2B to 2D is performed via control in FIG. 2A. That is, after performing a certain display, when switching displays, a large negative voltage (first voltage) is applied to the pixel electrodes 35 and 35 and all of the positively charged particles 27 (W) are collected on each of the pixel electrodes 35 and 35 (preset state).

Next, a predetermined writing voltage is applied to the pixel electrode 35 and 35 and there is a move to a white display (FIG. 2B) or a gray display (FIG. 2C or FIG. 2D). In a case where a black display (FIG. 2A) is to be displayed, the ground potential or a negative voltage is applied to the pixel electrodes 35 and 35, and the preset state is maintained.

Electrode corrosion and material deterioration are generated when a direct voltage is applied between the opposing electrode 37 and the pixel electrodes 35 and 35. Even in a case where a voltage for AC conversion to prevent this is applied between both electrodes 35 and 37, it is preferred if a preset state described above is included somewhere in a series of operations.

Figure 3:
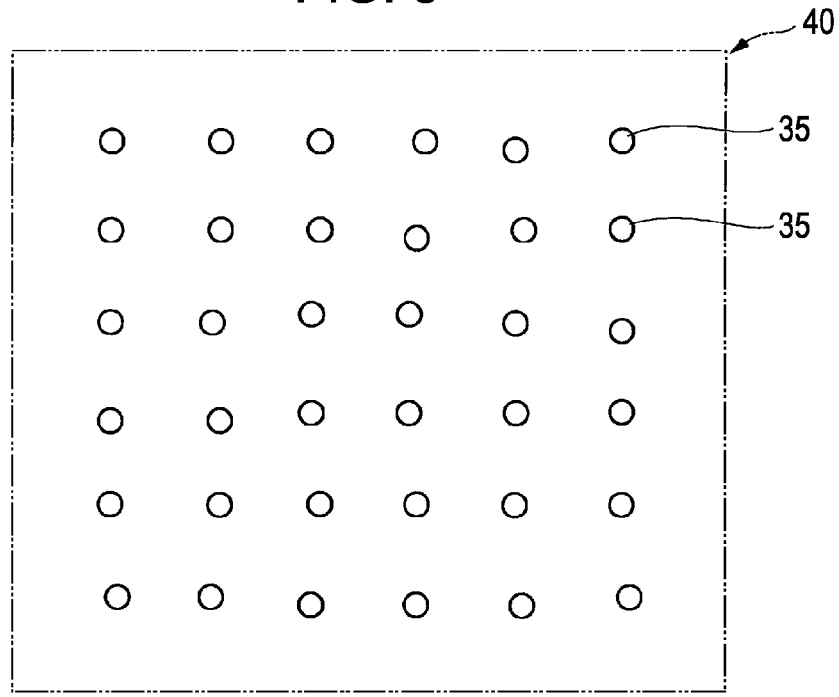
FIG. 3 is an example illustrating a layout of a pixel electrode in one pixel.
Figure 4:
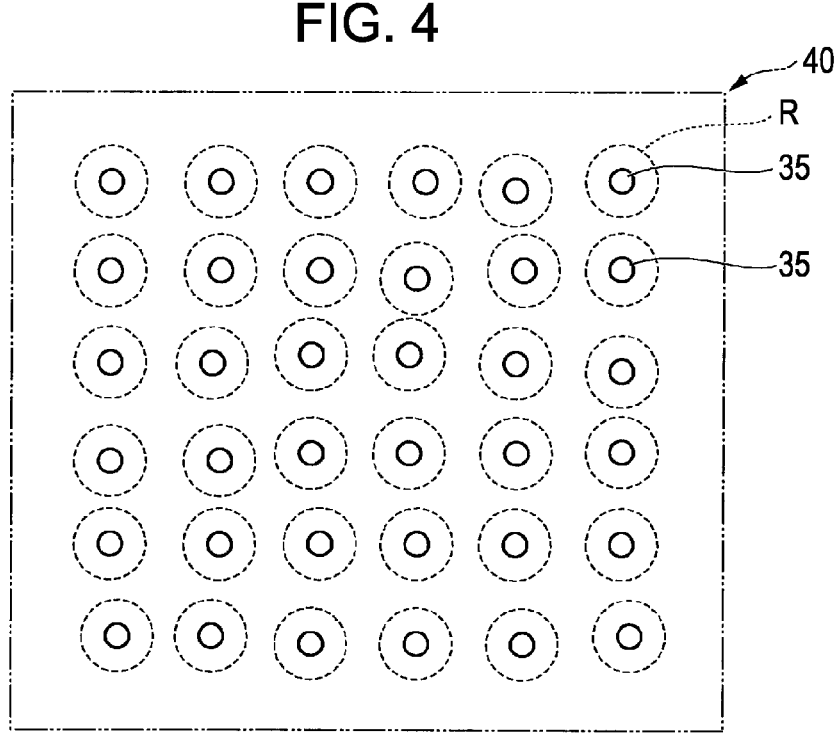
FIG. 4 illustrates a distribution state of particles in the one pixel shown in FIG. 3.

FIG. 3 is an example illustrating a layout of the pixel electrode in one pixel, and FIG. 4 illustrates a distribution state of the particles in the one pixel shown in FIG. 3.

As shown in FIG. 3, the plurality of pixel electrodes 35 are arranged with a predetermined interval relative to each other in one pixel 40. When an intermediate positive voltage is applied to each of the pixel electrodes 35, as shown in FIG. 4, the positively charged particles 27 (W) with a white color are distributed in a spot manner on the opposing electrode 37 side of the pixel electrodes 35. The positively charged particles 27 (W) are distributed in a wider range than the area of the pixel electrode 35 (circular distribution region R shown by a dashed line), but the positively charged particles 27 (W) distributed on the adjacent pixel electrodes 35 and 35 do not overlap. As a result, in regions other than the distribution region R of the positively charged particles 27 (W), the black of the dispersion medium 21 (B) is visible, and overall, gray is displayed.

Here, at the boundary of the distribution region R (dashed line portion), the amount of the positively charged particles 27 (W) is small and there is not a completely white state but a gray state. However, even in the region such as this, there is a portion of contribution to the white state by the white particles. Gray display is performed due to the effective white area which is visually recognized including the portion of contribution, in other words, the effective area of the positively charged particles 27 (W). That is, gradation display is performed by the effective area of the charged particles viewed from the opposing electrode 37 side.

Figure 5:
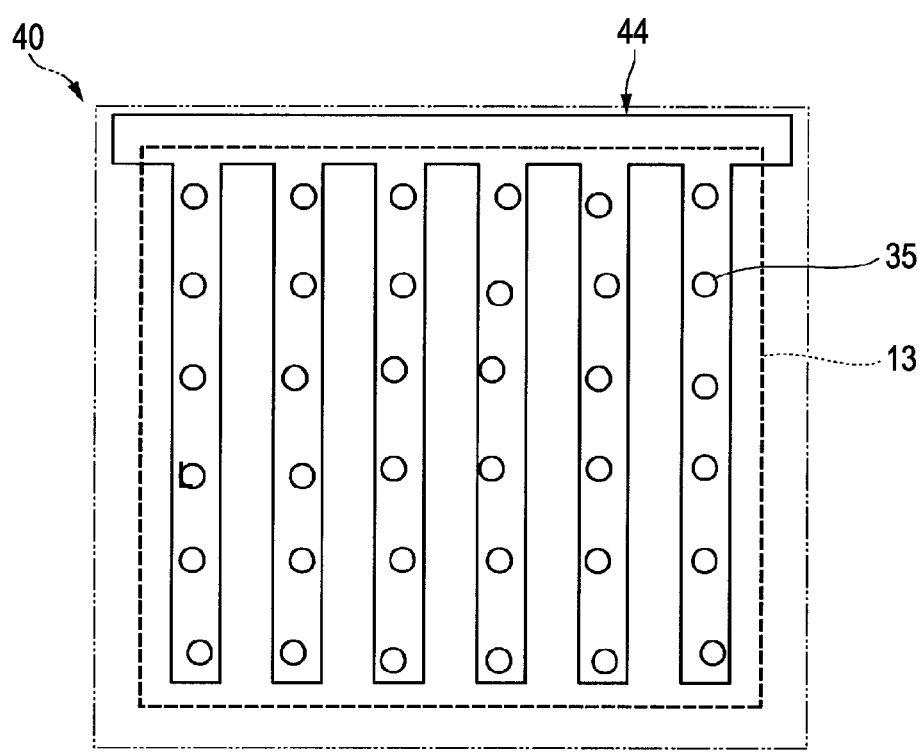
FIG. 5 is a planar diagram illustrating a configuration of the one pixel shown in FIG. 4.

FIG. 5 is a planar diagram illustrating a configuration of the one pixel shown in FIG. 4.

As shown in FIG. 5, the pixel electrodes 35 which are formed in a plurality of rows in the pixel region are mutually connected by a connection electrode 44 formed on a lower layer side of the pixel electrodes 35, that is a layer further to the first substrate 30 side than the pixel electrodes 35. Then, the electrophoretic layer 32 which includes the dispersion medium 21 (B) with a black color and the positively charged particles 27 (W) is enclosed by a sealing material 13.

Figure 6A:
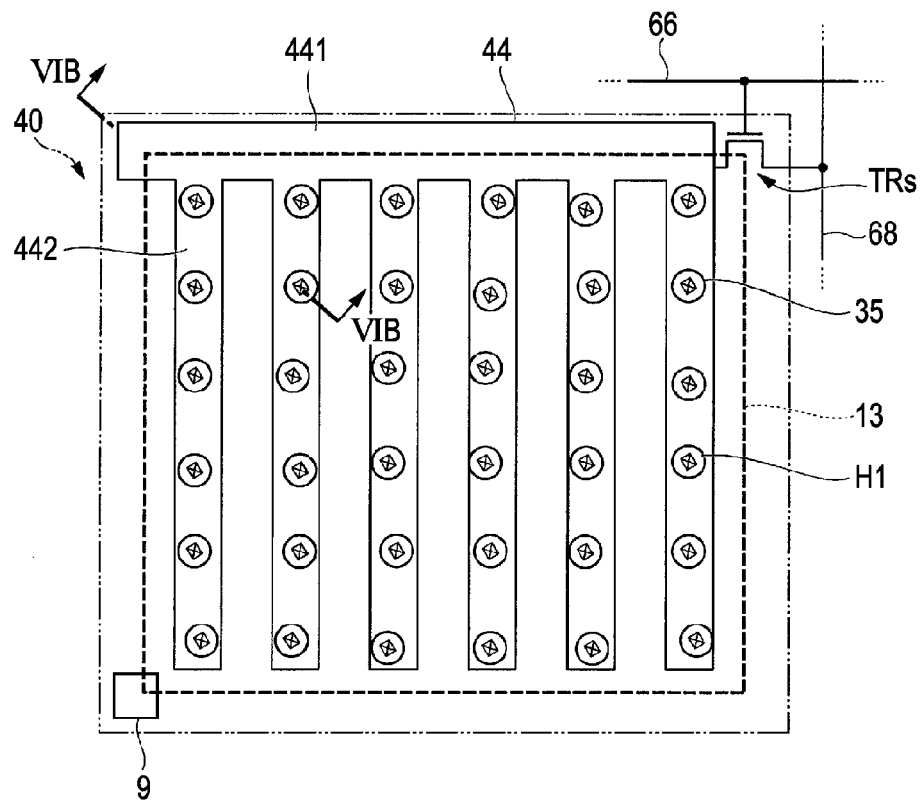
FIG. 6A is a planar diagram illustrating a configuration of the one pixel in more detail and FIG. 6B is a cross-sectional diagram along a line VIB-VIB of FIG. 6A.
Figure 6B:
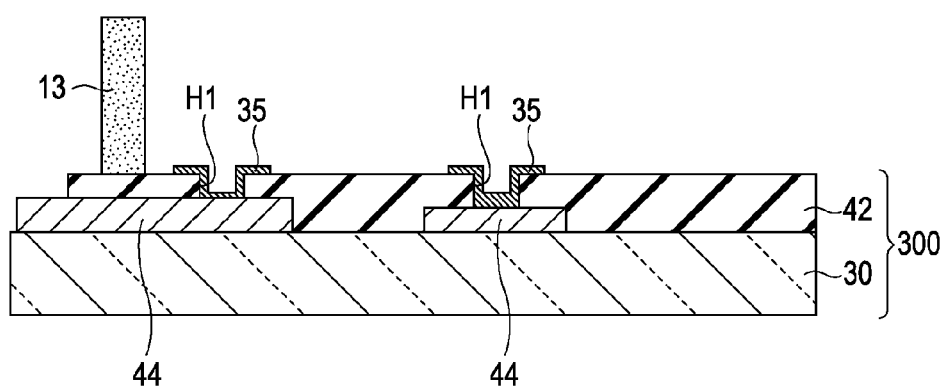

FIG. 6A is a planar diagram illustrating a configuration of the one pixel in more detail and FIG. 6B is a cross-sectional diagram along a line VIB-VIB of FIG. 6A.

As shown in FIGS. 6A and 6B, a selection transistor TRs, the connection electrode 44, a insulating film 42, the plurality of pixel electrodes 35, and the sealing material 13 are provided on the first substrate 30 for each of the pixels 40.

The gate of the selection transistor TRs is connected to a scanning line 66, the source of the selection transistor TRs is connected to a data line 68, and the drain of the selection transistor TRs is connected to the connection electrode 44.

The connection electrode 44 is formed in the same layer as the source electrode and the drain electrode of the selection transistor TRs, has a trunk portion 441 and a plurality of branch portions 442 which are connected by the trunk portion 441, and has an overall pectinate shape. In addition, in FIGS. 6A and 6B, six of the branch portions 442 are shown in the diagrams but the invention is not limited to this.

The insulating film 42 is formed from an oxide film or a nitride film and is formed over the entire substrate surface so as to cover the selection transistor TRs and the connection electrode 44.

The pixel electrode 35 is formed in a planar circular shape and is connected to the connection electrode 44 via a contact hole H1 through the insulating film 42. On the other hand, the opposing electrode 37 (referred to FIG. 7) is formed in an area wider than the total area of the pixel electrodes 35. Then, the diameter of each of the pixel electrodes 35 is set to be a smaller length than a cell gap (distance between the pixel electrode 35 and the opposing electrode 37), and in the embodiment, the diameter is set to a length equal to or less than ½ of the cell gap. According to this, it is possible to reduce the size of the smallest dot when viewed from the second substrate 31 side and a pale white or black display is possible. Here, the pixel electrode 35 is formed in a planar circular shape but may be a polygonal shape. In addition, the total area of the plurality of pixel electrodes 35 arranged in one pixel is equal to or less than ¼ of the area of one pixel.

An up/down conduction portion 9 is a terminal for applying a potential to the opposing electrode 37. By arranging a conductive member such as silver paste between the opposing electrode 37 and the up/down conduction portion 9 formed on the first substrate 30, there is conduction between the first substrate 30 and the opposing electrode 37.

The configuring components from the first substrate 30 to the pixel electrode 35 is referred to as an element substrate 300. The element substrate 300 of the embodiment includes the first substrate 30, the connection electrode 44, the insulating film 42, the pixel electrode 35, and the up/down conduction portion 9.

Figure 7:
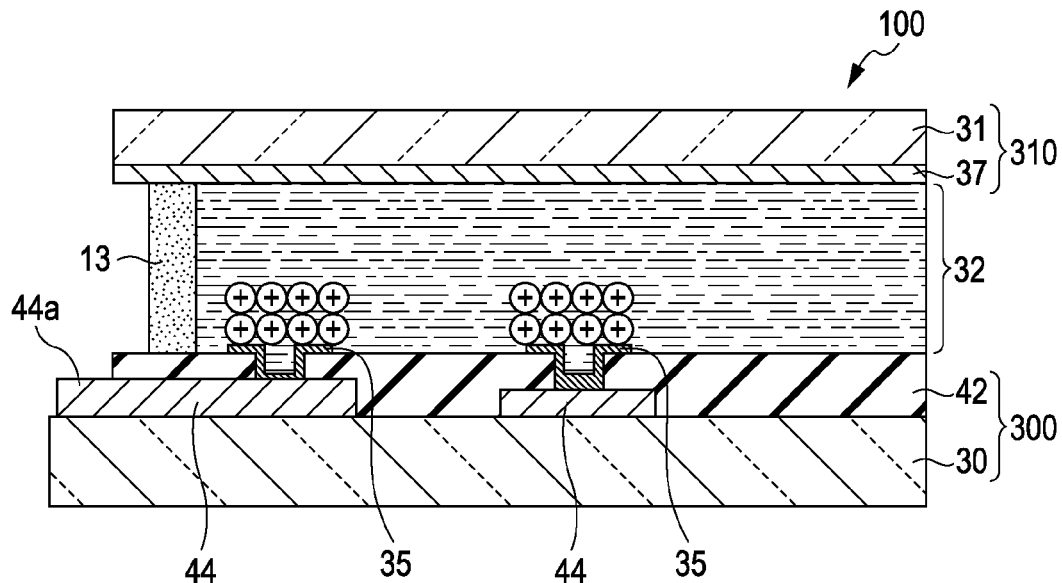
FIG. 7 is a cross-sectional diagram illustrating a schematic configuration of the electrophoretic display device according to the first embodiment.

FIG. 7 is a cross-sectional diagram illustrating a schematic configuration of the electrophoretic display device.

The electrophoretic display device 100 is where the electrophoretic layer 32 is interposed between the first substrate 30 and the second substrate 31. In more detail, the electrophoretic layer 32 is interposed between the element substrate 300, which includes from the first substrate 30 to the pixel electrode 35, and an opposing substrate 310 which includes the second substrate 31 and the opposing electrode 37. A portion of the connection electrode 44 formed on the first substrate 30 is a connection portion 44a to an external circuit.

The pixel electrode 35 is formed from 50 nm of ITO, the insulating film 42 is formed from 300 nm of a silicon nitride film, and the connection electrode 44 is formed from 200 nm of Al.

The opposing electrode 37 is formed from 100 nm of ITO, and the first substrate 30 and the second substrate 31 are formed from glass or PET base materials with a thickness of 0.5 nm. Here, the opposing electrode 37 has a formation where it takes up an area wider than the total area of the pixel electrodes 35 in one pixel.

The sealing material 13 uses a material which is similar to a liquid crystal device and a UV-cured acrylic material is used. Alternately, a thermally-cured epoxy resin may be used. The electrophoretic layer 32 is encapsulated in a region enclosed by the element substrate 300, the opposing substrate 310, and the sealing material 13.

Figure 8:
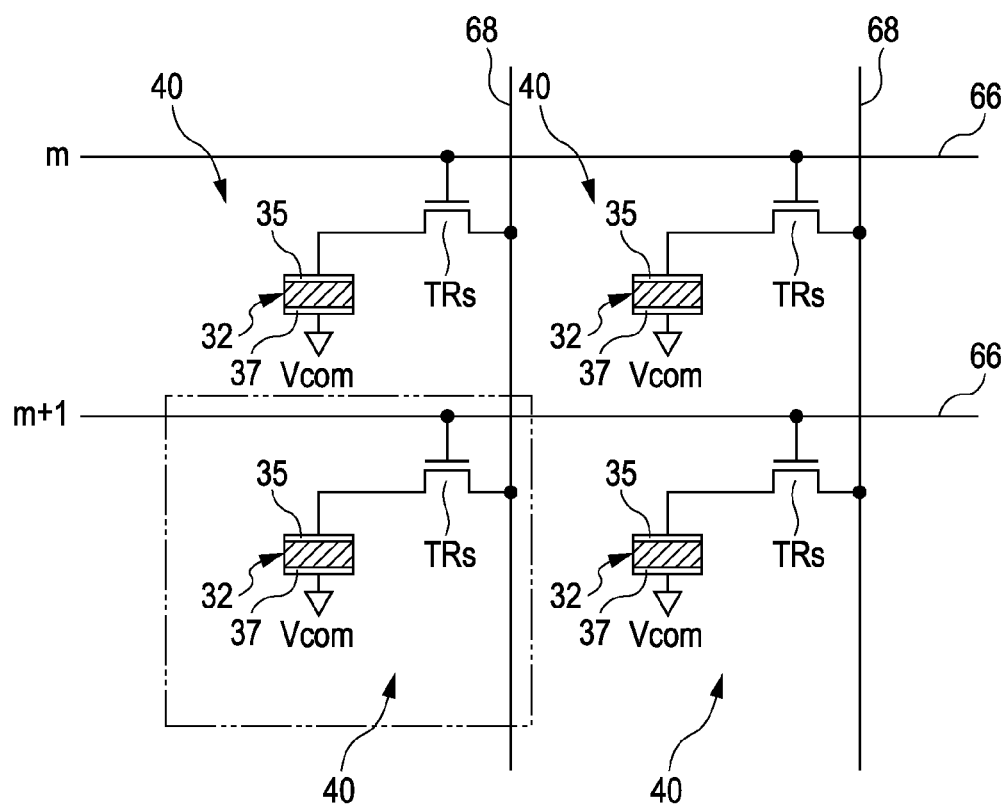
FIG. 8 is an equivalent circuit diagram of one pixel of the electrophoretic display device according to the first embodiment.

FIG. 8 is an equivalent circuit diagram of one pixel of the electrophoretic display device.

A pixel circuit of one pixel (pixel 40) is configured so as to each include the electrophoretic layer 32 as a electrooptical material and a selection transistor TRs for performing a switching operation and applying a voltage to the electrophoretic layer 32.

The gate of the selection transistor TRs is connected to the scanning line 66, the source of the selection transistor TRs is connected to the data line 68, and the drain of the selection transistor TRs is connected to the electrophoretic layer 32 (pixel electrode 35).

In addition, in FIG. 8, although a holding capacitance is not described, it may be an equivalent circuit with a holding capacitance attached.

Figure 9A:
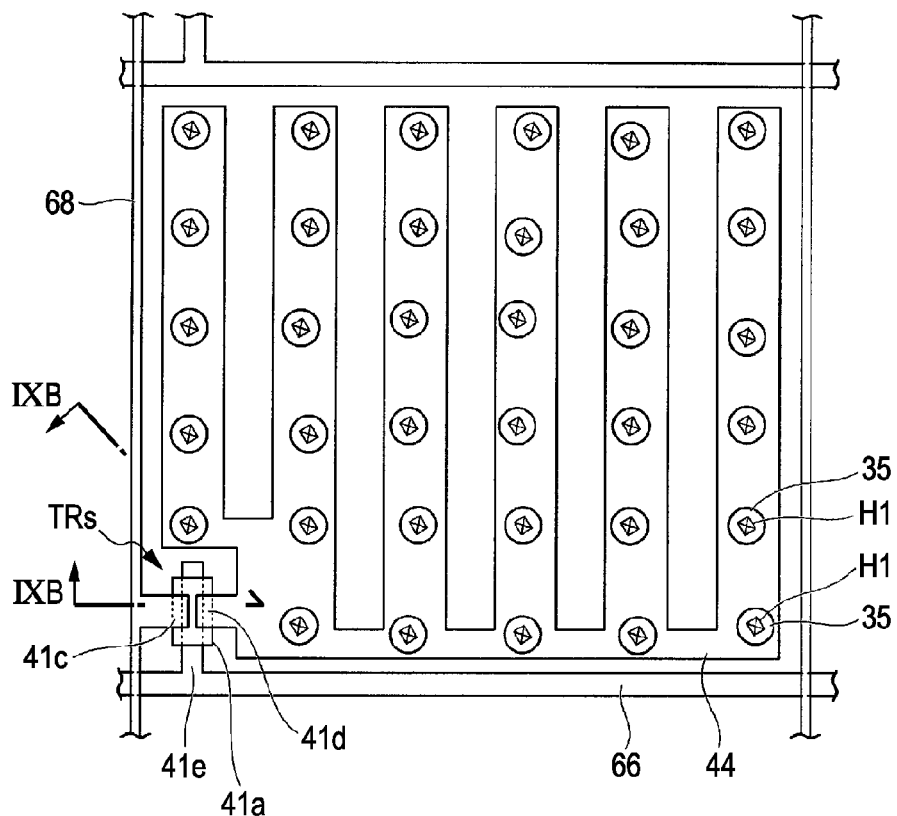
FIG. 9A is a planar diagram illustrating a layout of one pixel and FIG. 9B is a cross-sectional diagram along a line IXB-IXB of FIG. 9A.
Figure 9B:
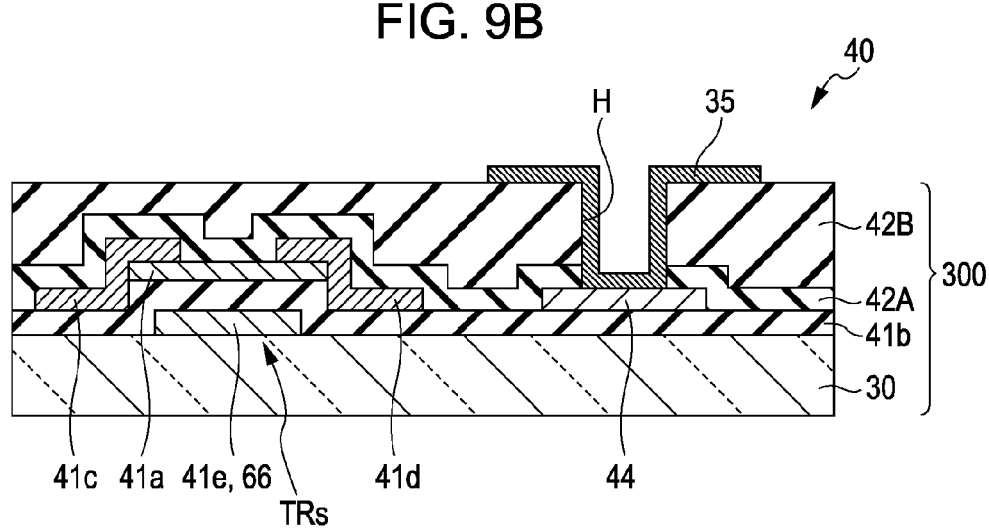

FIG. 9A is a planar diagram illustrating a layout example of one pixel and FIG. 9B is a cross-sectional diagram along a line IXB-IXB of FIG. 9A.

As shown in FIGS. 9A and 9B, the first substrate 30 is formed from a glass substrate with a thickness of 0.6 mm, and on the surface thereof, a gate electrode 41e (scanning line 66) is formed from aluminum (Al) with a thickness of 300 nm. Then, a gate insulating film 41b is formed from a silicon oxide film on the entire surface of the first substrate 30 so as to cover the gate electrode 41e, and a semiconductor layer 41a is formed from a-IGZO (an oxide of In, Ga, and Zn) with a thickness of 50 nm directly on the gate electrode 41e.

On the gate insulating film 41b, a source electrode 41c and a drain electrode 41d formed from Al with a thickness of 300 nm are each provided so as to partially overlap with the gate electrode 41e and the semiconductor layer 41a. The source electrode 41c and the drain electrode 41d are formed so a portion sits on top of the semiconductor layer 41a. The connection electrode 44 formed from aluminum (Al) with the same thickness of 300 nm is formed on the gate insulating film 41b. Since the connection electrode 44 is patterned and formed at the same time as the source electrode 41c and the drain electrode 41d, the connection electrode 44 is connected to the drain electrode 41d.

Here, as the selection transistor TRs, it is possible to use a typical a-Si TFT, poly Si TFT, organic TFT, oxide TFT, or the like. It is possible to use either a top gate or a bottom gate configuration.

On the selection transistor TRs and the connection electrode 44, an first interlayer insulating film 42A is formed from a silicon oxide film with a thickness of 300 nm and a second interlayer insulating film 42B is formed from photosensitive acrylic with a thickness of 1 μm so as to cover the selection transistor TRs and the connection electrode 44. Then, the plurality of pixel electrodes 35 which is formed from 50 nm of ITO is provided via the contact hole H1 formed in the first interlayer insulating film 42A and the second interlayer insulating film 42B.

Figure 10:
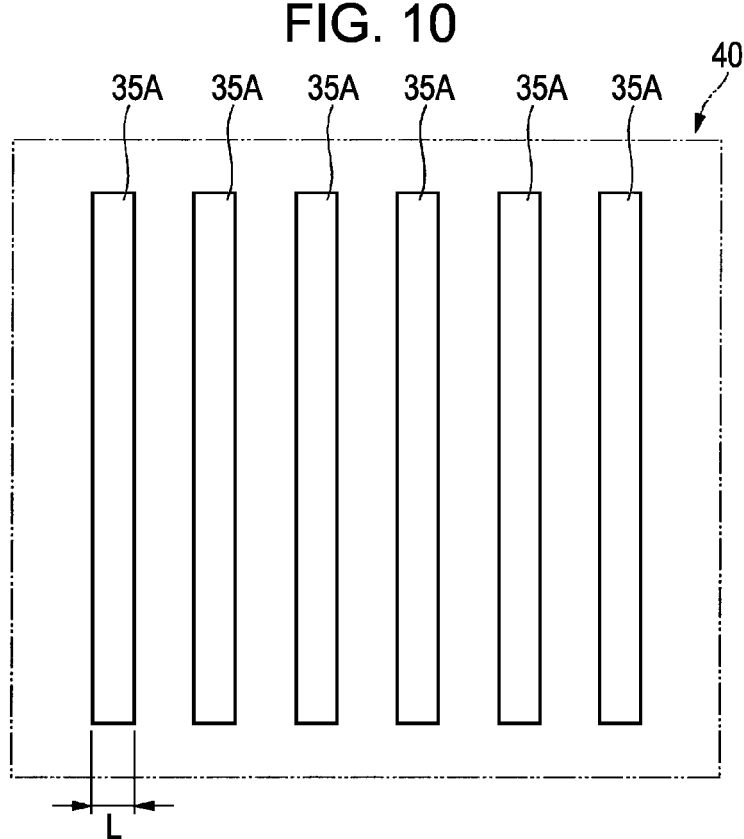
FIG. 10 is a planar diagram illustrating a different configuration of a pixel electrode.

FIG. 10 is a planar diagram illustrating a different configuration of a pixel electrode.

As shown in FIG. 10, a plurality of pixel electrodes 35A (first electrodes) may be arranged with stripe shapes in one pixel (pixel 40). Each of the pixel electrodes 35A are lined up with each other in an extending direction and arranged in predetermined intervals in a short-side direction. Lengths L of the short sides of each of the pixel electrodes 35A are set to a dimension smaller than the cell gap. For example, it is most preferable if the length of the short side is a length equal to or less than ½ of the cell gap. Since the pixel electrodes 35A here have a wider area than the circular pixel electrodes 35 described in the previous embodiment, it is possible to efficiently absorb the particles.

Figure 11:
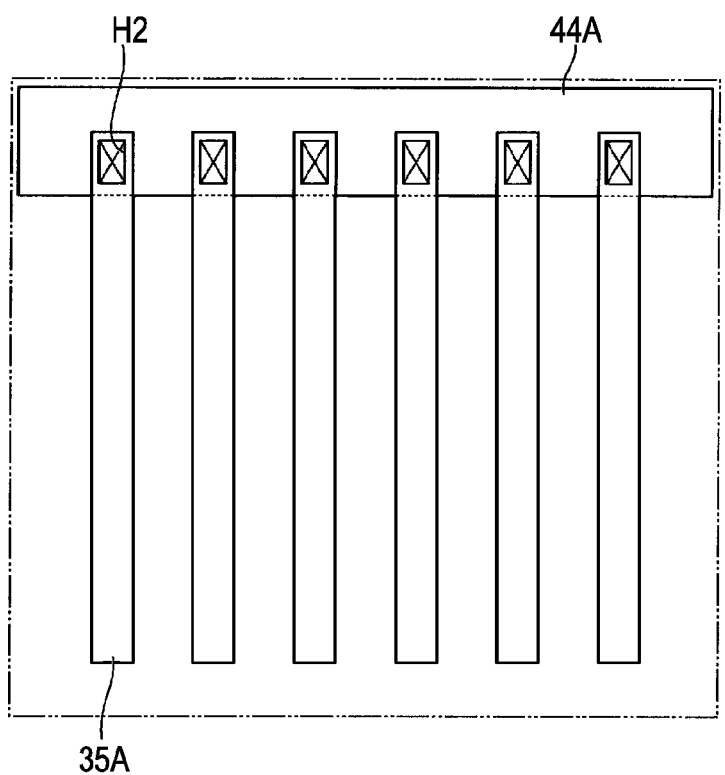
FIG. 11 is a planar diagram of an element substrate provided with the pixel electrode shown in FIG. 10.

FIG. 11 is a planar diagram of the element substrate provided with the pixel electrode shown in FIG. 10.

As shown in FIG. 11, each of the pixel electrodes 35A are connected to a connection electrode 44A at a lower layer side via a contact hole H2 formed in the first interlayer insulating film 42A (FIG. 9B) and the second interlayer insulating film 42B (FIG. 9B). The connection electrode 44A is positioned at an edge portion side of each of the pixel electrodes 35A and is formed in a length so as to overlap with the edge portions of all of the pixel electrodes 35A in the pixel.

Figure 12A:
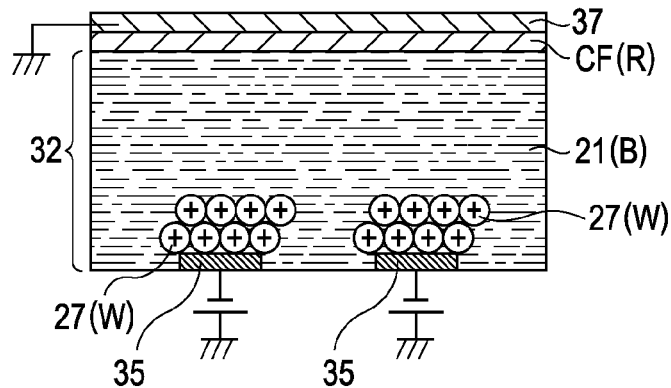
FIGS. 12A to 12C are cross-sectional diagrams illustrating a different example of the electrophoretic display device.
Figure 12B:
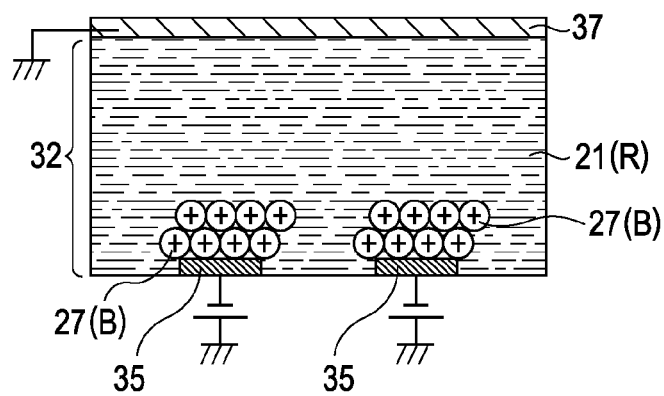
Figure 12C:
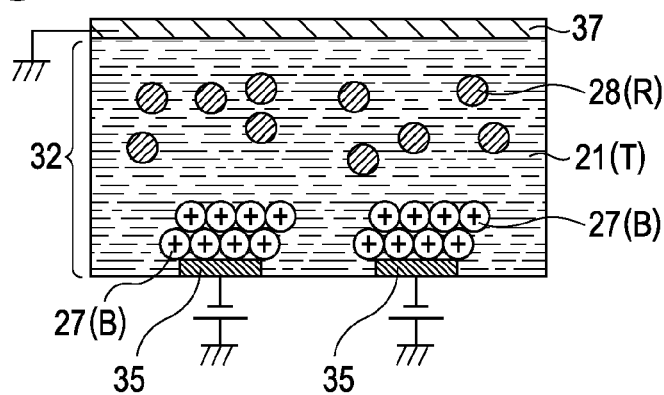

FIGS. 12A to 12C are cross-sectional diagrams illustrating a different example of the electrophoretic display device.

In FIG. 12A, an example is shown where a color filter is provided on the opposing substrate side.

The color filter CF is on the opposing substrate 310 side (FIG. 7) and is arranged further to the electrophoretic layer 32 side than the opposing electrode 37 included on the opposing substrate 310. In the electrophoretic layer 32, the positively charged particles 27 (W) with a white color which have a positive charge are mixed in the dispersion medium 21 (B) with a black color, and a color filter CF (R) with a red color is used as the color filter CF. In addition, not only the color filter CF (R) with a red color but color filters CF with other colors may be used. In addition, if color filters with the three RGB colors are used, an RGB color display is possible. In this manner, using the color combinations of the color filter and colored particles, the number of colors which can be expressed is increased. Here, the color filter CF may be arranged on a side opposite to the electrophoretic layer 32 side with regard to the opposing electrode 37 and may be arranged between the second substrate 31 (FIG. 7) and the opposing electrode 37.

In a state shown in FIG. 12A, a negative voltage is applied to each of the pixel electrodes 35 and all of the positively charged particles 27 (W) with a white color are collected on each of the pixel electrodes 35. According to this, dark red or black is displayed when viewed from the opposing electrode 37 side due to the color of the color filter CF and the dispersion medium 21 (B) with a black color.

FIG. 12B shows an example where the electrophoretic layer 32 is provided where the positively charged particles 27 with a black color which have a positive charge are mixed in the dispersion medium 21 (R) with a red color. In the case of the configuration, the brightness of red is controlled and the hue is changed if the color of the dispersion medium is changed.

In addition, in the embodiment, a color display combining the three colors of RGB can be performed. Furthermore, cyan (C), magenta (M), and yellow (Y) may be used instead of RGB.

FIG. 12C shows an example where the electrophoretic layer 32 is provided where the positively charged particles 27 (B) with a black color which have a positive charge and non-charged particles 28 (R) with a red color are mixed in the transparent dispersion medium 21 (T).

When a negative voltage is applied to each of the pixel electrodes 35, the positively charged particles 27 (B) with a black color are collect on each of the pixel electrodes 35 and there is a state of the non-charged particles 28 (R) with a red color being suspended in the dispersion medium 21 (T). According to this, a pale (faint) red is displayed. In addition, there may be black particles in a white dispersion medium. In this manner, it is possible to perform many combinations, such as color combinations of dispersion mediums and particles, and color filters.

Here, the charged polarity of the particles may not necessarily be positive and may be negative.

In addition, although not shown, it is possible to arrange a capsule between the pixel electrode and the opposing electrode and use a capsule-type electrophoretic layer where a dispersion medium and charged particles are enclosed in the capsule. Even in a capsule-type electrophoretic layer such as this, it is possible to perform the operations in the same manner as the other embodiments. It is possible to use the particles with different colors which have a negative or a positive charge in either a capsule-type or a non-capsule-type electrophoretic layer.

The electrophoretic display device 100 of the embodiment is provided with the electrophoretic layer 32 which is arranged between the first substrate 30 and the second substrate 31 and has at least the dispersion medium 21 (B) with a black color and the positively charged particles 27 (W) with a white color which are mixed in the dispersion medium 21 (B), the plurality of pixel electrodes 35 formed with an island shape on the electrophoretic layer 32 side of the first substrate 30, and the opposing electrode 37 which is formed on the electrophoretic layer 32 side of the second substrate 31 with an area wider than the pixel electrode 35, where gradation is controlled using an area (distribution area) of the positively charged particles 27 (W) which are visually recognized when the electrophoretic layer 32 is viewed from the opposing electrode side 37.

According to this, by changing the polarity of the voltage applied to each of the pixel electrodes 35, it is possible to move the electrophoretic particles which have either a positive or a negative charge (in the embodiment, the positively charged white particles 27 (W) which have a positive charge) to the pixel electrode 35 side or the opposing electrode 37 side. In the embodiment, by applying a positive voltage to the pixel electrode 35, it is possible for the positively charged particles 27 (W) with a white color which have a positive charge to be moved to and distributed on a surface of the opposing electrode 37 side. According to this, it is possible to realize a white display. In addition, using the size or the length of the application time of the applied voltage, it is possible to control the number of particles moved to the opposing electrode 37 side or the distribution range, and as a result, it is possible to easily perform a display of an arbitrary intermediate gradation such as a gray display.

In addition, the total area of the plurality of pixel electrodes 35 in one pixel of the embodiment is equal to or less than ¼ of the pixel area. According to this, it is possible to distribute the positively charged particles 27 (W) in a small area on the opposing electrode 37 and it is possible to more finely control gradation. In addition, since the diameter of each of the pixel electrodes 35 is set to a dimension smaller than the cell gap, it is possible to further reduce the distribution range of the particles on each of the pixel electrodes 35 in a case of a planar view and it is possible to form a small dot display. It is possible to adjust the gradation (color) using the size of the dots. According to this, it is possible to realize an arbitrary color display image and it is possible to provide the high-quality electrophoretic display device 100.

Here, in a case where the electrophoretic layer 32 included in the pixel is partitioned using the sealing material 13, it is possible for the pixel area to be the area of the region partitioned using the sealing material 13. In addition, in a case where the electrophoretic layer 32 included in the pixel is not partitioned using the sealing material 13, it is possible to define the pixel area as an area determined by the product of the arrangement pitch of the scanning lines 66 and the arrangement pitch of the data lines 68.

In addition, the pixel electrodes 35 which are formed in a plurality of rows in the pixel 40 are mutually connected by the connection electrode 44 formed on the lower layer side of the pixel electrodes 35. According to the configuration such as this, control is easy since it is possible to apply the same voltage simultaneously to each of the pixel electrodes 35 via the connection electrode 44.

In the embodiment, transparent particles which have a positive charge are used, but the color and the polarity of the charge are not limited and it is possible to use other combinations.

Second Embodiment

Below, the configuration of an electrophoretic display device according to a second embodiment will be described.

Figure 13A:
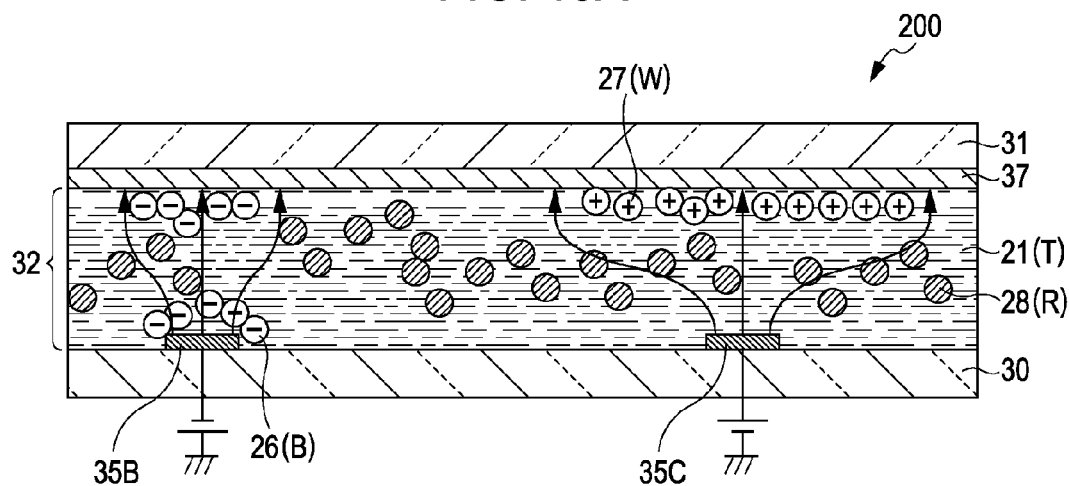
FIG. 13A is a cross-sectional diagram of an electrophoretic display device according to a second embodiment and FIG. 13B is a graph illustrating RGB light transmissivity of non-charged particles.
Figure 13B:
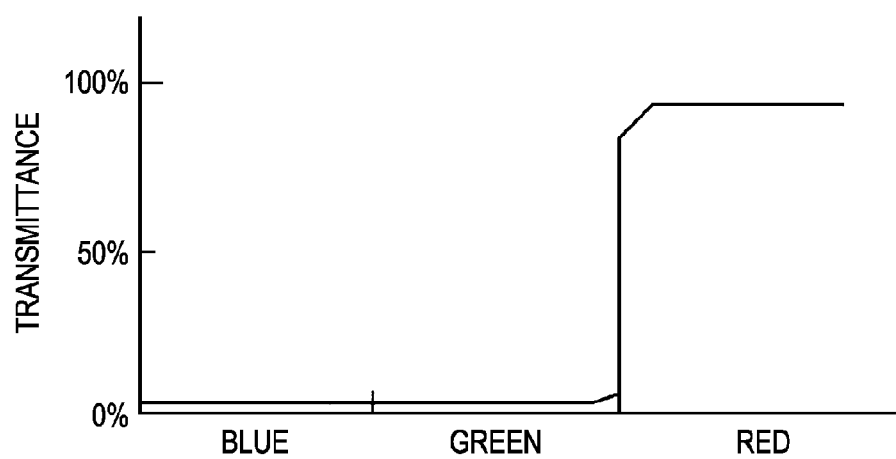

FIG. 13A is a cross-sectional diagram of the electrophoretic display device according to the second embodiment and FIG. 13B is a graph illustrating RGB light transmissivity of non-charged particles.

Here, a method will be described where the distribution on the opposing electrode of two types of negatively charged particles 26 and the positively charged particles 27 which have a negative and positive charge is controlled using two selection transistors in one pixel. At this time, by coloring the dispersion medium or holding (dispersing) non-charged particles which are colored in the dispersion medium, it is possible to realize hue using the three base colors.

The basic configuration of the embodiment is substantially the same as the first embodiment, but that two selection transistors are provided in one pixel is different from the first embodiment. The two selection transistors are each connected to the plurality of island-shaped pixel electrodes. The opposing electrode which faces the plurality of pixel electrodes has an area wider than the total area of the island-shaped pixel electrodes, and is a continuous electrode (electrode with no gaps) at least in the region which contributes to the display in the pixel. In the opposing electrode 37, a notch portion where there are no electrodes may be provided corresponding to requirements.

An electrophoretic display device 200 according to the embodiment is provided with the electrophoretic layer 32 which holds negatively charged particles 26 (B) with a black color which have a negative charge (second particles), the positively charged particles 27 (W) with a white color which have a positive charge (first particles), and non-charged particles 28 with a red color in the transparent dispersion medium 21 (T). On the first substrate 30, a plurality of first pixel electrodes 35B (first electrodes) and second pixel electrodes 35C (third electrodes) are formed in one pixel. The total area of the plurality of the first pixel electrodes 35B and the plurality of the second pixel electrodes 35C in one pixel is equal to or less than ¼ of the pixel. The first pixel electrodes 35B and the second pixel electrodes 35C are driven independently from each other, and by a voltage being applied to each of the first pixel electrodes 35B and the second pixel electrodes 35C, the two-dimensional or three-dimensional distribution of the negatively charged particles 26 (B) with a black color which have a negative charge on the opposing electrode 37 and the positively charged particles 27 (W) with a white color which have a positive charge is controlled.

When the negatively charged particles 26 (B) with a black color are moved to the opposing electrode 37 side (second electrode), the brightness is controlled in a downward direction. On the other hand, when the positively charged particles 27 (W) with a white color are moved to the opposing electrode 37, the saturation is controlled in a downward direction. In addition, when the negatively charged particles 26 (B) with a black color and the positively charged particles 27 (W) with a white color are moved at the same time to the opposing electrode 37, it is possible to simultaneously control the brightness and the saturation.

Here, the positively charged particles 27 (W) with a white color which have a positive charge, the negatively charged particles 26 (B) with a black color which have a negative charge, and with regard to the negatively charged particles 26 (B) with a black color which have a negative charge and the positively charged particles 27 (W) with a white color which have a positive charge, the non-charged particles 28 (R) with a red color are provided in the transparent dispersion medium 21 (T) in each pixel, and the two pixel electrodes 35B and 35C with an area smaller than the opposing electrode 37 are used to control the movement of the charged particles 26 and 27. In addition, using the voltage polarity applied to each of the pixel electrodes 35B and 35C, the distribution of the charged particles on the opposing electrode 37 is controlled.

Here, it is possible to control the distribution of the charged particles 26 and 27 on the opposing electrode 37 side using not only the size of the voltage applied to each of the pixel electrodes 35B and 35C but also the length of the application time.

FIG. 13B shows light transmissivity of the non-charged particles with a red color.

The non-charged particles 28 (R) with a red color are formed from transparent particles (which have translucency) which lower the transmissivity of only the colors of green (G) and blue (B) and scatter the color of red. This is realized by, for example, the non-charged particles 28 (R) having a transparent portion and a colored portion, and the colored portion being configured so that transmissivity varies according to wavelength. As a result, a bright red coloring can be obtained. The coloring of white in the electrophoretic display device is because there are many transparent particles and scattering occurs between the transmissive particles and the dispersion medium, and as a result, scattered reflection is formed and this is seen by the human eye as white. Since the non-charged particles 28 (R) with a red color are the base of the transparent particles and the transmissivity of only predetermined colors (G, B) is lowered, R is as per before, that is, the transparent particles which show white are scattered in the same manner. As a result, a bright red coloring can be obtained.

At this time, it is possible to determine the extent to which the transmissivity of green (G) and blue (B) is lowered according to the brightness and the coloring requested by the electrophoretic display device 200. Here, it is set to 1% to 99%. In addition, it is possible to change the range of the wavelengths where the transmissivity is lowered in addition to the brightness and contrast. As a means of lowering the transmissivity, the absorbing and damping of wavelengths of predetermined colors is used in the particles.

In addition, as the non-charged particles, semi-transparent particles which have a degree of reflectivity at the particle surface may be used. Here, reflectivity refers to the incident light being returned to the incidence side and not in a travelling direction. The details will be described later, but it is possible to effectively perform the mixing of colors by the particles having reflectivity. For example, the non-charged particles have a transparent portion and a colored portion, and the colored portion is configured so that reflectivity or transmissivity varies according to wavelength.

It is sufficient if the transmissivity is in the range of 1% to 99% and also the reflectivity is in the range of 1% to 99%. Since there is hardly any damping and absorbing in the particles, the total of the absorption and the reflectivity is substantially 100%. The positively charged particles 27 (W) with a white color are colorless and transparent and the non-charged particles 28 (R) with a red color are made in the same manner. It is desirable that the dispersion medium is colorless and transparent and does not influence the coloring of the three particles.

In this manner, in the embodiment, the non-charged particles 28 (R) with a red color are transparent or semi-transparent particles, and the dispersion medium 21 (T) is colorless and transparent. Here, as the non-charged particles, particles may be used with low transmissivity of two colors out of any of the wavelengths of RGB in order to configure RGB. In addition, the particles at this time may be colored over the entire particle or may have a transparent portion and a colored portion. For example, only the core of the particles (colored portion) may be colored. Alternatively, only the surface of the particles (colored portion) may be colored. In addition, the density of the color may change so as to lower the density from the surface to the core section. Alternatively, the particles may be partially colored irrespective of whether it is the core or the surface. In addition, the particles are not limited to being spheres. The material has a transparent inorganic material such as titanium oxide or a transparent organic material as its main component and a dye or a pigment is held therein. Due to particles with the configuration such as this, it is possible to express pale colors.

In addition, FIGS. 14A to 17B illustrate an operating principle of a configuration using three particles.

The black particles which have a negative charge, the white particles which have a positive charge, and the non-charged red particles are held in the transparent dispersion medium. The opposing electrode is formed on substantially the entire surface of the display area and the two pixel electrodes are formed in smaller areas than the opposing electrode.

Figure 14A:
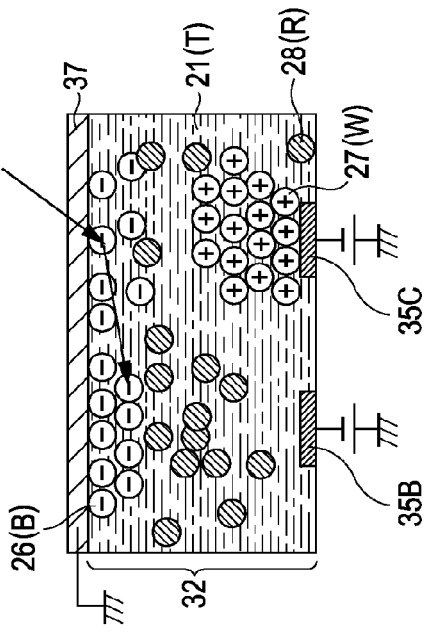
FIGS. 14A to 14D illustrate an operating principle of a configuration using three particles.

As shown in FIG. 14A, when the positive voltage VH is applied to the first pixel electrode 35B and the negative voltage VL is applied to the second pixel electrode 35C, the negatively charged particles 26 (B) with a black color which have a negative charge are adsorbed to the first pixel electrode 35B side and the positively charged particles 27 (W) with a white color which have a positive charge are adsorbed to the second pixel electrode 35C. The non-charged particles 28 (R) with a red color are in a state of being suspended in the colorless and transparent dispersion medium 21 (T). In addition, the light which is incident from the outside is scattered by the non-charged particles 28 (R) with a red color and exits from the surface with a red color.

Figure 14B:
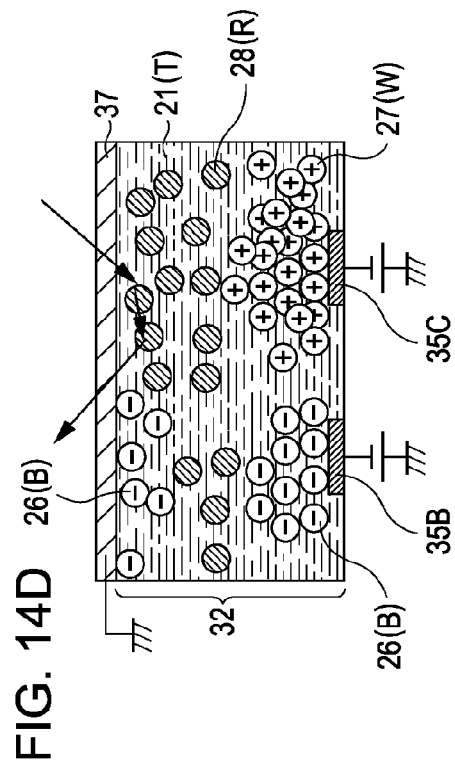

As shown in FIG. 14B, with the red display state shown in FIG. 14A as a standard, when the negative voltage VL is applied to each of the first pixel electrode 35B and the second pixel electrode 35C, the positively charged particles 27 (W) with a white color which have a positive charge are adsorbed to the second pixel electrode 35C side, but the negatively charged particles 26 (B) with a black color which have a negative charge move to the opposing electrode 37 side. The surface of the opposing electrode 37 is in a state of being substantially buried by the negatively charged particles 26 (B) with a black color, and the non-charged particles 28 (R) with a red color exist further to the pixel electrodes 35B and 35C side in the dispersion medium 21 (T) than the negatively charged particles 26 (B) with a black color. In the case of this state, black is displayed since the negatively charged particles 26 (B) with a black color are seen from the opposing electrode side.

Figure 14C:
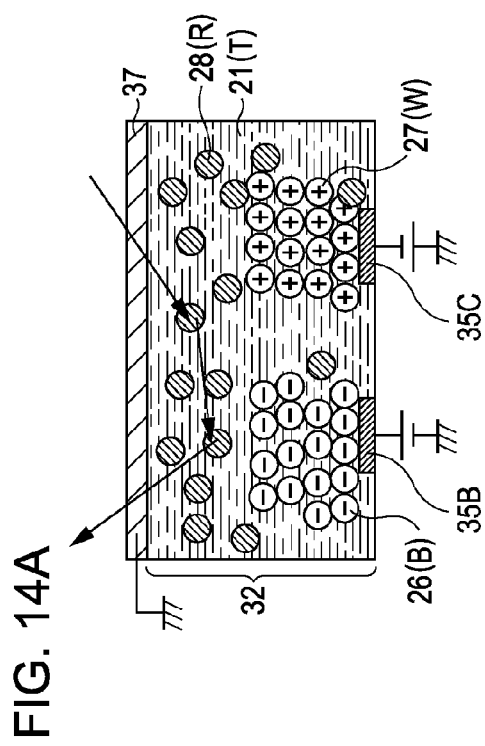

As shown in FIG. 14C, with the red display state shown in FIG. 14A as a standard, when the positive voltage VH is applied to the first pixel electrode 35B and the positive voltage VH is applied to the second pixel electrode 35C, the negatively charged particles 26 (B) with a black color which have a negative charge are adsorbed to the first pixel electrode 35B side, but the positively charged particles 27 (W) with a white color which have a positive charge move to the opposing electrode 37 side. The surface of the opposing electrode 37 is in a state of being substantially buried by the positively charged particles 27 (W) with a white color, and the non-charged particles 28 (R) with a red color exist further to the pixel electrodes 35B and 35C side in the dispersion medium 21 (T) than the positively charged particles 27 (W) with a white color. In the case of this state, white is displayed since the positively charged particles 27 (W) with a white color are seen from the opposing electrode side.

Figure 14D:
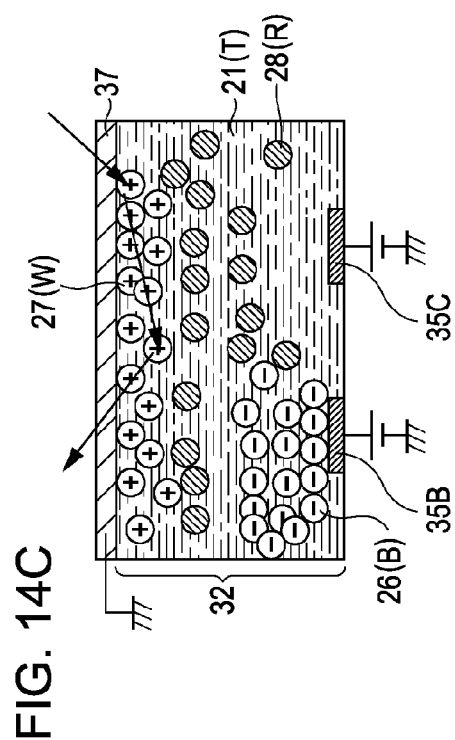

As shown in FIG. 14D, with the red display state shown in FIG. 14A as a standard, the negative voltage VL is applied to the second pixel electrode 35C and a negative voltage Vl (Vl<VL) which has an absolute value smaller than the negative voltage applied when black is displayed (FIG. 14B) is applied to the first pixel electrode 35B. In this state, a portion of the negatively charged particles 26 (B) with a black color which were adsorbed to the first pixel electrode 35B move to the opposing electrode 37 side. Dark red is displayed since the opposing electrode 37 is partially covered due to the negatively charged particles 26 (B) with a black color which moved to the opposing electrode 37 side.

In this manner, controlling of the brightness is performed using control of the amount of movement of the negatively charged particles 26 (B) with a black color to the opposing electrode 37 side due to the size of the applied voltage.

Figure 15A:
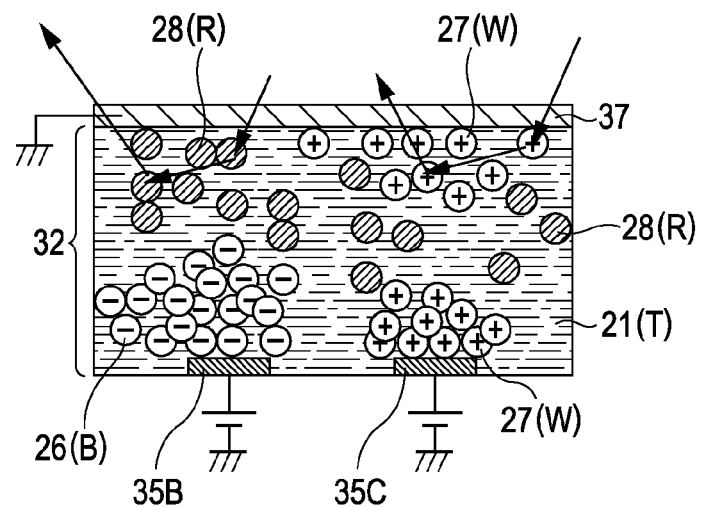
FIGS. 15A and 15B illustrate an operating principle of a configuration using three particles.

As shown in FIG. 15A, with the red display state shown in FIG. 14A as a standard, the positive voltage VH is applied to the first pixel electrode 35B and a positive voltage Vh (Vh<VH) which has an absolute value smaller than the positive voltage applied when white is displayed (FIG. 14C) is applied to the second pixel electrode 35C. In this state, a portion of the positively charged particles 27 (W) with a white color which were adsorbed to the second pixel electrode 35C move to the opposing electrode 37 side. Pale red is displayed since the opposing electrode 37 is partially covered due to the positively charged particles 27 (W) with a white color which moved to the opposing electrode 37 side.

In this manner, controlling of the saturation is performed using control of the amount of movement of the positively charged particles 27 (W) with a white color to the opposing electrode 37 side due to the size of the applied voltage.

Figure 15B:
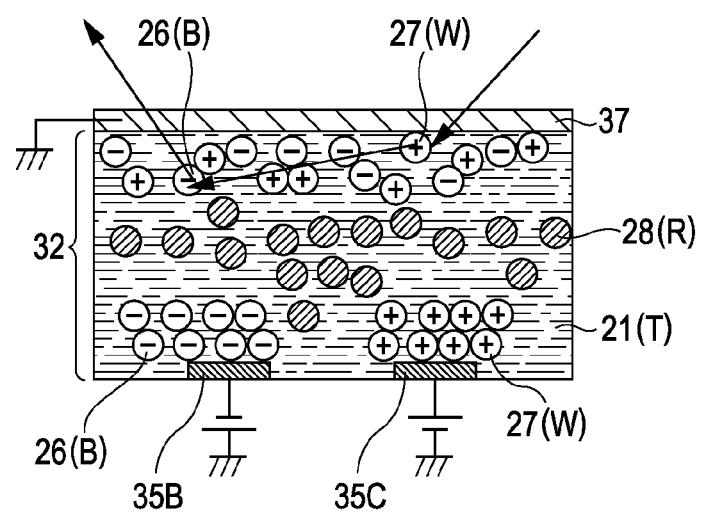

As shown in FIG. 15B, with the red display state shown in FIG. 14A as a standard, when the negative voltage Vl is applied to the first pixel electrode 35B and the positive voltage Vh is applied to the second pixel electrode 35C at the same time, the negatively charged particles 26 (B) with a black color and the positively charged particles 27 (W) with a white color are distributed in a three-dimensional manner in a random state on the opposing electrode 37 side. In this state, the light which is incident from the outside is scattered by both the positively charged particles 27 (W) with a white color and the negatively charged particles 26 (B) with a black color and is discharged to the outside. According to this gray is displayed.

Here, a positive voltage Vh which has an absolute value smaller than the positive voltage applied when black is displayed is applied to the first pixel electrode 35B and a negative voltage Vl which has an absolute value smaller than the negative voltage applied when white is displayed is applied to the second pixel electrode 35C. At this time, the voltage may not be applied simultaneously to the first pixel electrode 35B and the second pixel electrode 35C but may be applied sequentially. According to this, it is possible to control the two-dimensional or three-dimensional distribution of the particles on the opposing electrode 37 side. In addition, image switching can be swiftly performed by different voltages being applied simultaneously to the first pixel electrode 35B and the second pixel electrode 35C.

In addition, it is possible to display gray even by the positively charged particles 27 (W) with a white color and the negatively charged particles 26 (B) with a black color not being arranged randomly on the opposing electrode 37 but by each being arranged to form white and black regions. This is equivalent to the case of, for example, a distribution combining the distributions of the negatively charged particles 26 (B) with a black color in FIG. 14D and the positively charged particles 27 (W) with a white color in FIG. 15A.

As described above, the adjustment of the brightness of the display color is possible by adjusting using the control of the amount of movement of the negatively charged particles 26 (B) with a black color to the opposing electrode 37 side, that is, the two-dimensional or three-dimensional distribution of the negatively charged particles 26 (B) with a black color on the opposing electrode 37 side. In addition, the adjustment of the saturation of the display color is possible by adjusting using the control of the amount of movement of the positively charged particles 27 (W) with a white color to the opposing electrode 37 side, that is, the two-dimensional or three-dimensional distribution of the positively charged particles 27 (W) with a white color on the opposing electrode 37 side.

On the other hand, in regard to displaying gray, it is possible to display an arbitrary gray by using the control of the amount of movement of the negatively charged particles 26 (B) with a black color and the positively charged particles 27 (W) with a white color to the opposing electrode 37 side, that is, the two-dimensional or three-dimensional distribution of the negatively charged particles 26 (B) with a black color and the positively charged particles 27 (W) with a white color on the opposing electrode 37 side.

In this manner, as a result, the brightness, saturation, and displaying of gray are controlled by the effective area of particle distribution which is visually recognized when the electrophoretic layer 32 is viewed from the outside of the opposing electrode 37 side.

In the black display (FIG. 14B), the white display (FIG. 14C), the dark red display (FIG. 14D), the pale red display (FIG. 15A), and the gray display (FIG. 15B), the negatively charged particles 26 (B) with a black color and the positively charged particles 27 (W) with a white color are distributed in a three dimensional manner also in a cell thickness direction so that there can be coloring of each color in the pixel area.

In addition, in the black display of FIG. 14B, when the number of the negatively charged particles 26 (B) with a black color on the opposing electrode 37 side is reduced, the incident light is scattered by the two particles of the non-charged particles 28 (R) with a red color and the negatively charged particles 26 (B) with a black color and is discharged from the opposing substrate side. Even with this method, brightness control is possible.

In the same manner, in the white display of FIG. 14C, when the number of the positively charged particles 27 (W) with a white color on the opposing electrode 37 side is reduced, the incident light is scattered by the two particles of the non-charged particles 28 (R) with a red color and the positively charged particles 27 (W) with a white color and is discharged from the opposing substrate side. Even with this method, saturation control is possible.

Even in these cases, the brightness and the saturation is controlled by changing the effective particle area.

Here, as shown in FIGS. 14A to 15B, when a plurality of particles expresses a mixed color, the non-charged particles 28 (R) with a red color are not 100% transparent and color mixing can be efficiently performed with a degree of reflectivity. For example, when transmissivity is close to 100%, it is necessary that the incident light is reflected by numerous refractions and the like before it is output from the front and it is necessary that there is a thick particle layer for outputting the light from the front. The distributing of a thick particle layer on the opposing electrode 37 is not effectively also in terms of energy. When the particle layer is thin, light reaches the bottom of a cell (pixel electrode 35B and 35C side) without being output from the front, a normally unnecessary particle color is reflected, and unnecessary color mixing is generated.

Instead of this, giving the particles a degree of reflectivity and leading the light to the front using a thin particle layer is easier to perform the necessary arbitrary color mixing.

Figure 16A:
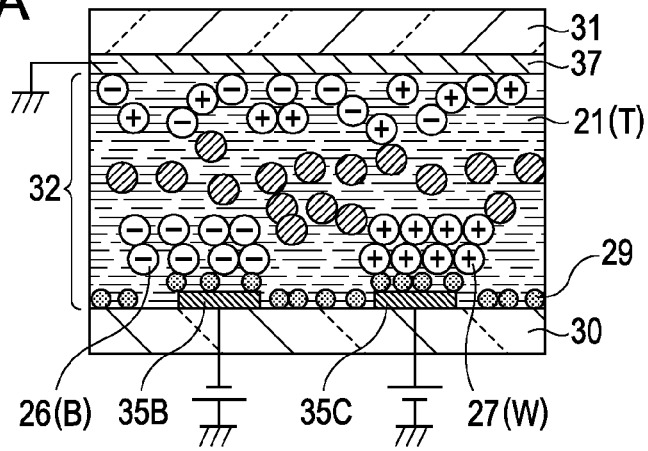
FIGS. 16A to 16C illustrate an operating principle of a configuration using three particles.
Figure 16B:
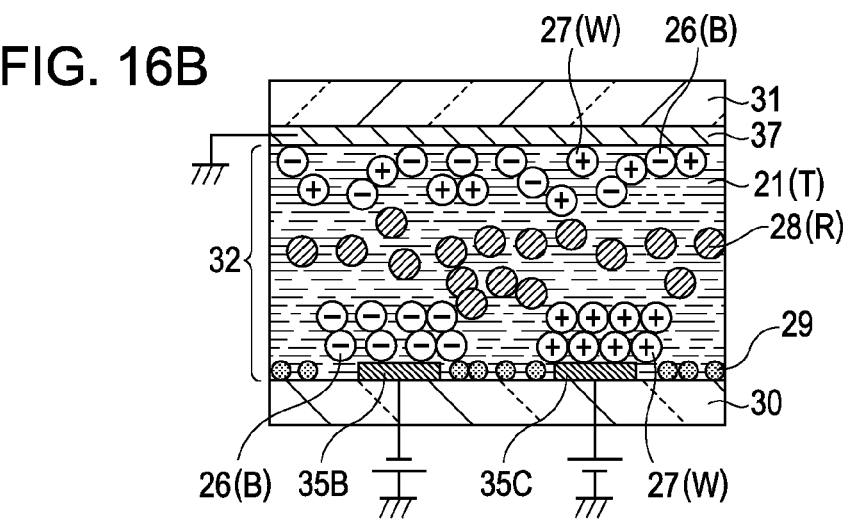

In addition, as shown in FIGS. 16A and 16B, transparent particles 29 may be fixed on the surface of the first substrate 30 which has the two pixel electrodes 35B and 35C in one pixel. According to this, the light which is transmitted by the electrophoretic layer 32 from the second substrate 31 side is scattered by the transparent particles 29 and it is possible to discharge the incident light efficiently from the front.

As the transparent particles 29, it is possible to use a transparent inorganic material such as titanium oxide or a transparent organic material. In FIG. 16A, there are the transparent particles 29 on the pixel electrodes 35B and 35C, and in FIG. 16B, there are the transparent particles 29 only between the pixel electrodes 35B and 35C. The transparent particles 29 are non-charged particles.

Figure 16C:
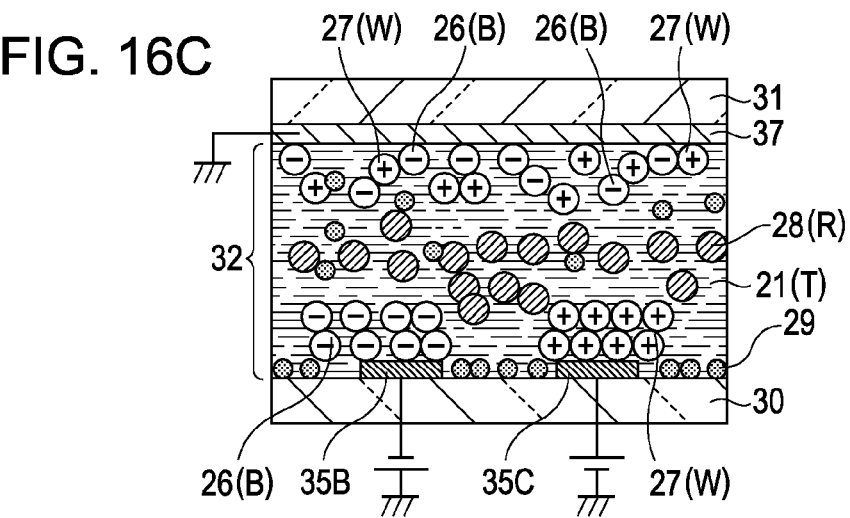

Furthermore, as shown in FIG. 16C, the non-charged and colorless transparent particles 29 may be held in the dispersion medium 21 (T). According to this, the scattering ability of all of the particles 29 with regard to all wavelengths of light improves and it is easy to output a bright white color. In addition, by holding a small amount of non-charged black particles in the dispersion medium 21 (T), it is easy to perform black display. Alternatively, both non-charged black particles and white particles may be held in the dispersion medium 21 (T).

Here, the transmissivity, reflectivity, materials and the like of the non-charged transparent particles 29 are based on the colored particles.

Figure 17A:
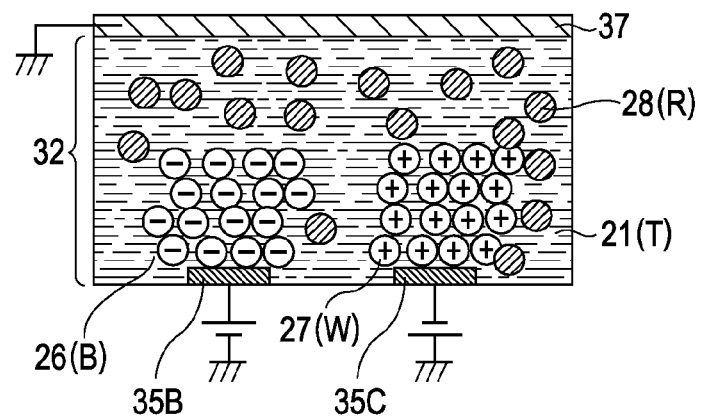
FIGS. 17A and 17B illustrate an operating principle of a configuration using three particles.
Figure 17B:
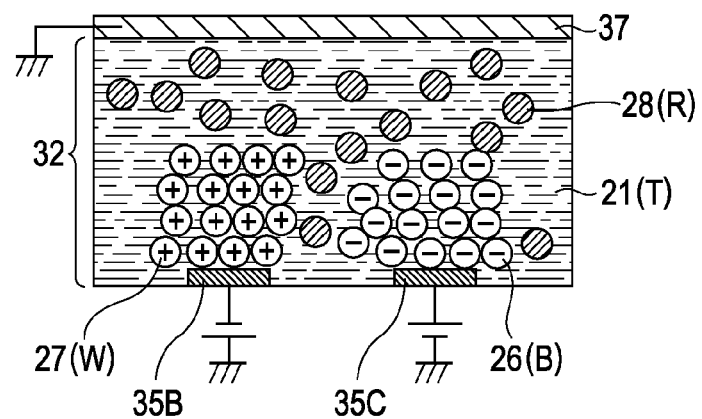

As shown in FIGS. 17A and 17B, the polarity of the voltage applied to the first pixel electrode 35B and the second pixel electrode 35C may be changed and the functions of each may be switched. The switching is performed when writing of one screen is completed and there is a preset state for the writing of the next screen. According to this, between the first pixel electrode 35B, the second pixel electrode 35C, and the opposing electrode 37 are each driven by an alternating current. It is possible to prevent deterioration of the electrophoretic material, corrosion of the electrodes, and the like.

Here, the switching of the functions of the first pixel electrode 35B and the second pixel electrode 35C may be performed for each plurality of screens and not for each one screen.

Figure 18:
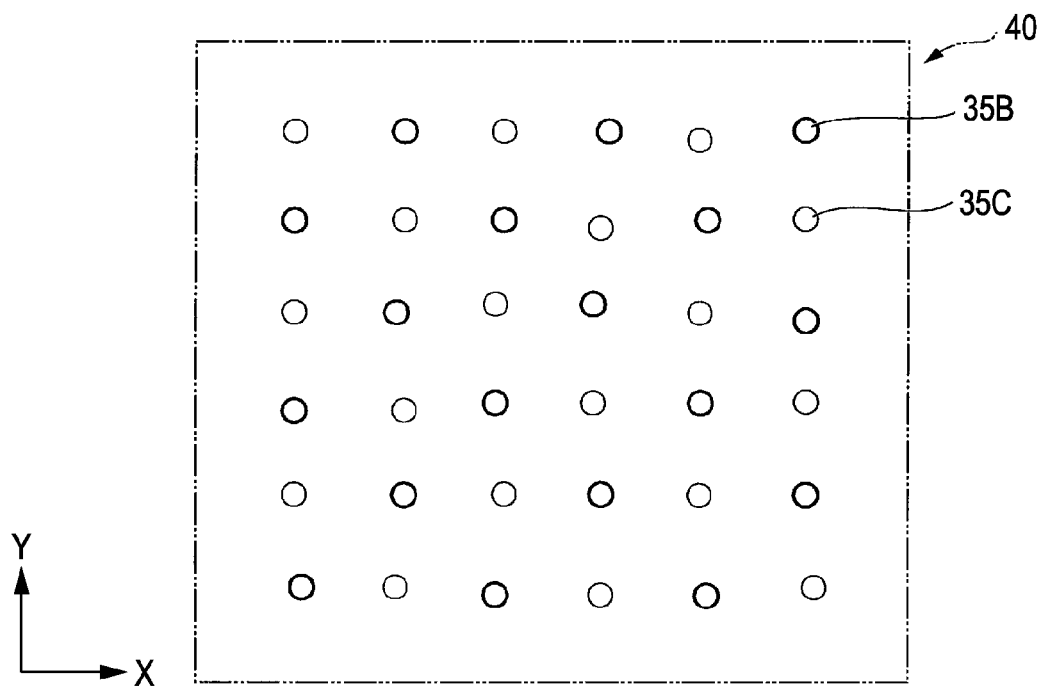
FIG. 18 is a planar diagram illustrating an arrangement example of a pixel electrode in one pixel.

FIG. 18 is a planar diagram illustrating an arrangement example of a pixel electrode in one pixel.

As shown in FIG. 18, the first pixel electrode 35B and the second pixel electrode 35C in one pixel (pixel 40) are arranged alternately in two directions (X direction and Y direction). As described above, voltages with polarities which are different from each other are applied in the first pixel electrode 35B and the second pixel electrode 35C, and due to the polarities of the voltages applied to each, the movement of the negatively charged particles 26 (B) with a black color which have a negative charge and the positively charged particles 27 (W) with a white color which have a positive charge is controlled.

Figure 19:
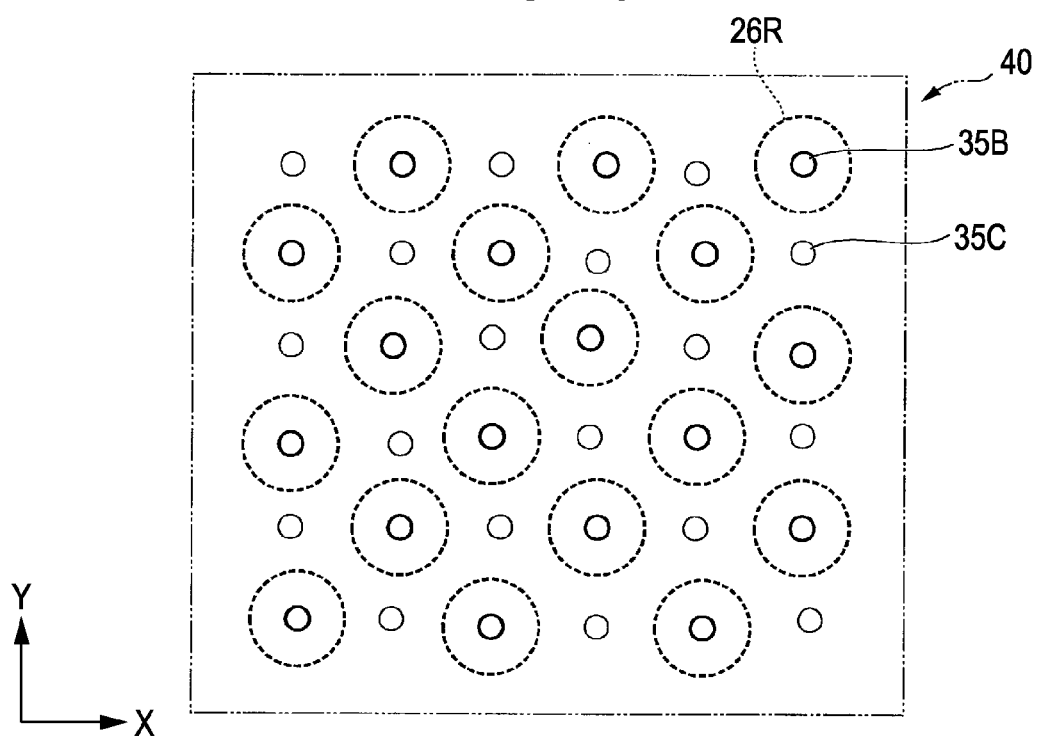
FIG. 19 illustrates a distribution of particles when expressing dark red.

FIG. 19 illustrates a distribution of particles when expressing dark red.

When the negative voltage VL is applied to the first pixel electrode 35B, the negatively charged particles 26 (B) with a black color collect on the opposing electrode 37 (not shown) side of the first pixel electrode 35B and are distributed in a predetermined range according to the size of the applied voltage and the like. The transparent dispersion medium 21 (T) and the non-charged particles 28 (R) can be seen in regions other than a distribution region 26R of the negatively charged particles 26 (B) with a black color. Here, the black display due to the negatively charged particles 26 (B) occupies approximately ⅓ of the area of the entire pixel region and the red display due to the non-charged particles 28 (R) occupies approximately ⅔ of the area of the entire pixel region. It is possible to express a dark red using the distribution of the black display (black particles) such as this.

Figure 20:
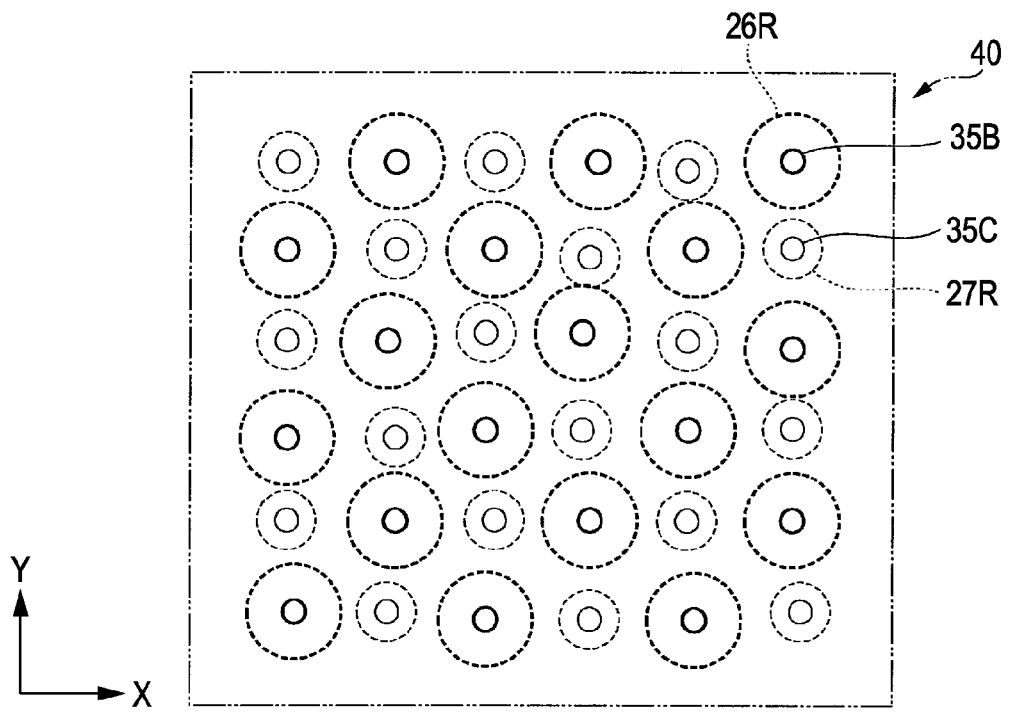
FIG. 20 illustrates a distribution of black particles and white particles when controlling brightness and saturation at the same time.

FIG. 20 illustrates a distribution of the black particles and the white particles when controlling brightness and saturation at the same time. As shown in FIG. 20, the negative voltage Vl is applied to the first pixel electrode 35B and the positive voltage VH is applied to the second pixel electrode 35C. The voltage Vl applied to the first pixel electrode 35B is a voltage which is smaller than the voltage (VL) when moving all of the negatively charged particles 26 to the opposing electrode 37 side. When voltages which are different in terms of polarity and size are applied to each of the pixel electrodes 35B and 35C, the negatively charged particles 26 with a black color collect on the opposing electrode 37 side of the first pixel electrode 35B and are distributed in a predetermined range according to the size of the applied voltage and the like. In addition, the positively charged particles 27 (W) collect on the opposing electrode 37 side of the second pixel electrode 35C and are distributed in a predetermined range according to the size of the applied voltage and the like. According to this, in the vicinity of the distribution region 26R of the negatively charged particles 26 (B), there is a distribution region 27R of the positively charged particles 27 (W) which is smaller than the distribution region 26R, large black display spots and relatively small white display spots are displayed and it is possible to express a red where the overall brightness and saturation have been reduced.

The electrophoretic display device 200 of the embodiment is provided with the plurality of first pixel electrodes 35B and second pixel electrodes 35C in one pixel on the first substrate 30, drives the first pixel electrodes 35B and the second pixel electrodes 35C independently of each other, and is configured to control the gradation using each of the distribution areas of the black and white charged particles 26 and 27 which are visually recognized when the electrophoretic layer 32 is viewed from the opposing electrode 37 side.

According to the configuration of the embodiment, it is possible to perform a color display using a combination of colored particles, a colored dispersion medium and the like. In addition, it is possible to control the two-dimensional or three-dimensional distribution of the negatively charged particles 26 (B) which have a negative charge and the positively charged particles 27 (W) which have a positive charge on the opposing electrode 37 side using the size and the application time of the voltages applied to each of the first pixel electrode 35B and the second pixel electrode 35C. According to this, it is possible to control the gradation of the display color viewed from the opposing substrate 310 side. It is possible to realize an arbitrary color display by controlling the gradation of a display image using the distribution range (dot size) of each of the particles 26 and 27 on the opposing electrode 37.

At this time, in the same manner of the case of the first embodiment of FIG. 4, there is not a complete black or white display in the boundary of the distribution regions 26R and 27R, but the gradation is controlled by the effective area when the distribution region 26R and 27R are visually recognized and the controlling of brightness and saturation is performed.

In addition, it is possible to control the application time of voltages applied to each of the first pixel electrode 35B and the second pixel electrode 35C using a pulse width or the number of frames.

Third Embodiment

Next, an electrophoretic display device according to a third embodiment will be described. The embodiment is equivalent to a configuration which is more detailed than the electrophoretic display device and the driving method of the same according to the second embodiment.

Figure 21:
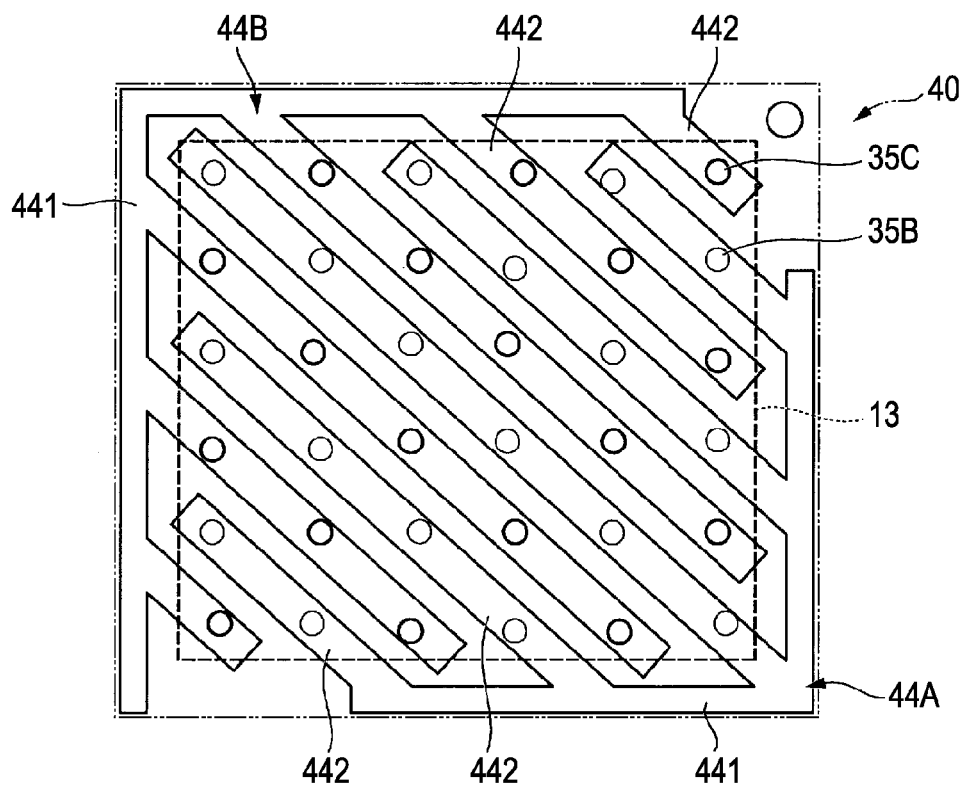
FIG. 21 is a planar diagram schematically illustrating a configuration of a connection electrode and a pixel electrode in one pixel of an electrophoretic display device according to a third embodiment.
Figure 22:
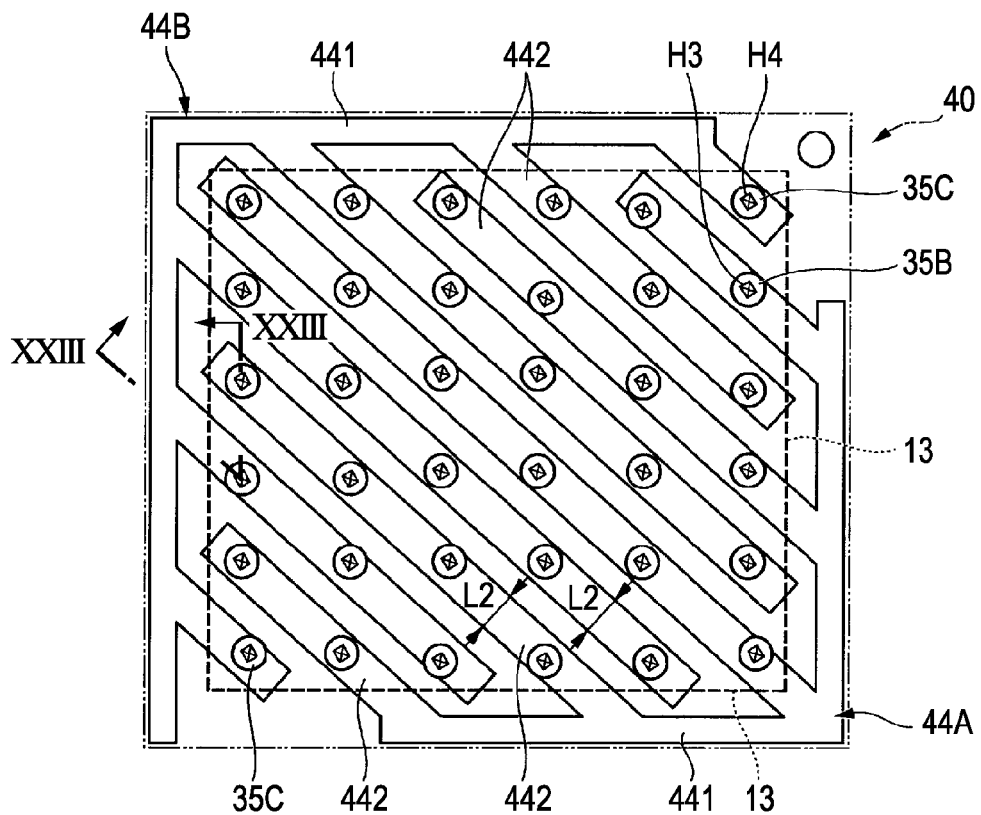
FIG. 22 is a planar diagram describing in detail a configuration of an element substrate in one pixel.
Figure 23:
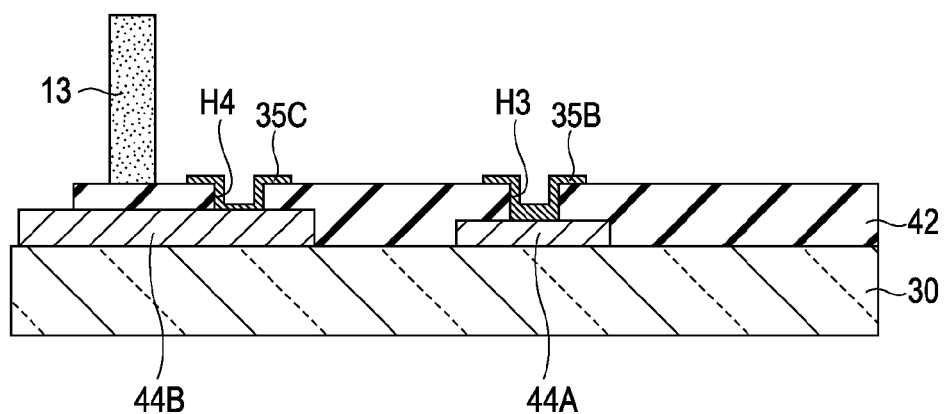
FIG. 23 is a cross-sectional diagram along a line XXIII-XXIII of FIG. 22.
Figure 24:
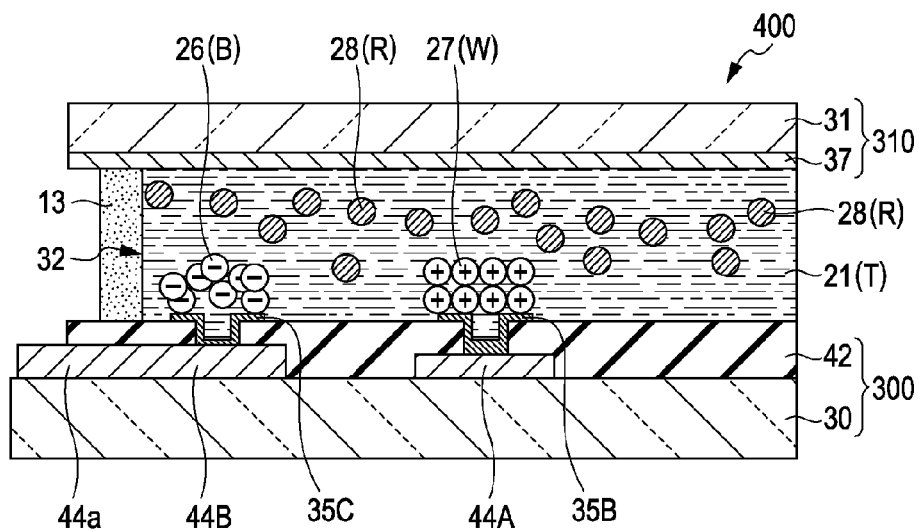
FIG. 24 is a partial cross-sectional diagram of the electrophoretic display device according to the third embodiment.

FIG. 21 is a planar diagram schematically illustrating a configuration of a connection electrode and a pixel electrode in one pixel. FIG. 22 is a planar diagram describing in detail a configuration of an element substrate in one pixel. FIG. 23 is a cross-sectional diagram along a line XXIIIC-XXIIIC of FIG. 22. FIG. 24 is a partial cross-sectional diagram of the electrophoretic display device according to the embodiment.

As shown in FIG. 21, the first pixel electrode 35B and the second pixel electrode 35C are pattern arranged alternately along two directions (for example, the extending directions of the scanning line and the data line). In the embodiment, two connection electrodes 44A and 44B are provided in one pixel (pixel 40). Each of the connection electrodes 44A and 44B have a trunk portion 441 with a<shape which is bent at a right angle extending along the two directions described above (for example, the extending direction of the scanning line or the data line) and a plurality of branch portions 442 which are connected by the trunk portion 441. The plurality of branch portions 442 extends in parallel to each other in a different direction to the extension direction of the trunk portion 441 (here, a direction which is approximately 45° with regard to the branch portions 442), and the extension lengths of all of the branch portions 442 are different. The branch portions 442, which extend from the vicinity of the angle portion (bent portion) of the trunk portion 441, are the longest and become shorter lengths for the branch portions 442 farther away from the bent portion of the trunk portion 441. Each of the connection electrodes 44A and 44B has a pectinate shape and are arranged in the pixel 40 to mesh with each other. That is, in a state where the branch portions 442 of the second connection electrode 44B exist on both sides of the branch portion 442 of the first connection electrode 44A. The branch portions 442 of the first connection electrode 44A corresponds to the first pixel electrodes 35B and the branch portions 442 of the second connection electrode 44B corresponds to the second pixel electrodes 35C.

As shown in FIGS. 22 and 23, the first pixel electrode 35B is connected to the first connection electrode 44A via a contact hole H3 and the second pixel electrode 35C is connected to the second connection electrode 44B via a contact hole H4. The first pixel electrode 35B faces the first connection electrode 44A and the second pixel electrode 35C faces the second connection electrode 44B in a planar view, and short-side direction lengths L2 of the branch portions 442 and 442 of each of the connection electrodes 44A and 44B with regard to the respective pixel electrodes 35B and 35C are arbitrarily set.

In addition, the sealing material 13 is arranged to partition one pixel and there is a frame to enclose the first pixel electrode 35B and the second pixel electrode 35C. The sealing material 13 uses a material which is similar to a liquid crystal device as described above, and here, a UV-cured acrylic material is used. Alternately, a thermally-cured epoxy resin may be used.

Here, the first pixel electrode 35B and the second pixel electrode 35C are formed in a circular shape in a planar view. The diameter of the first pixel electrode 35B and the second pixel electrode 35C is set to be a smaller shape than the cell gap and is preferably equal to or less than ½ of the cell gap.

In addition, the first pixel electrode 35B and the second pixel electrode 35C are formed to be intermingled and distanced from each other so as not to overlap in the same pixel area.

As shown in FIG. 24, in a electrophoretic display device 400 of the embodiment, the electrophoretic layer 32 is interposed between the first substrate 30 and the second substrate 31 of the configuration such as that described above, and in the electrophoretic layer 32, the negatively charged particles 26 (B) with a black color which have a negative charge, the positively charged particles 27 (W) with a white color which have a positive charge, and non-charged particles 28 (R) with a red color are held in the transparent dispersion medium 21 (T). In more detail, the electrophoretic layer 32 is interposed between the element substrate 300, which includes from the first substrate 30 to the pixel electrodes 35B and 35C, and an opposing substrate 310 which includes the second substrate 31 and the opposing electrode 37. Here, either one of the first connection electrode 44A or the second connection electrode 44B formed on the first substrate 30 has a connection portion for connecting to an external circuit. For example, in the embodiment, a portion of the second connection electrode 44B is a connection portion 44a to an external circuit.

Figure 25:
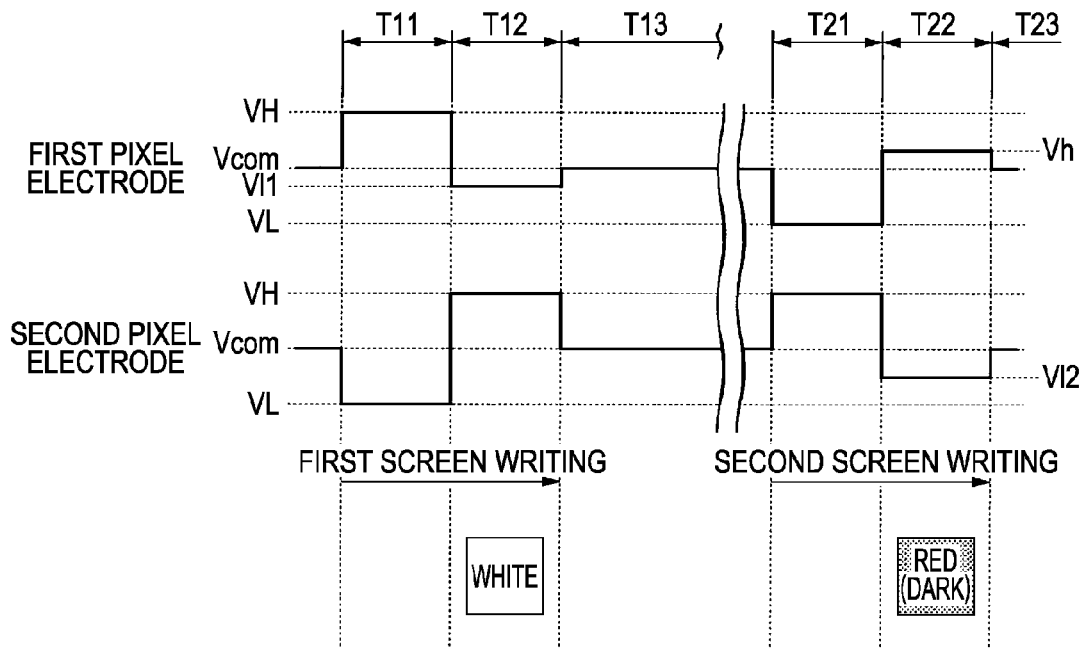
FIG. 25 illustrates a driving waveform when driving the electrophoretic display device according to the third embodiment.

FIG. 25 illustrates a driving waveform when driving the electrophoretic display device according to the third embodiment.

Here, an operation, where white display is initially performed and rewriting to a dark red after the white display is maintained for a while, will be described based on FIGS. 14A to 17B. A ground potential (Vcom) is applied in the opposing electrode 37 and a predetermined voltage is applied to the first pixel electrode 35B and the second pixel electrode 35C in this state.

Preset Time T11

First, a preset operation (first preset operation) is performed so as to be FIG. 14A. The positive voltage VH (maximum positive voltage) is applied to the first pixel electrode 35B and the negatively charged particles 26 (B) with a black color which have a negative charge are adsorbed to the first pixel electrode 35B side, and at the same time, the large negative voltage VL (maximum negative voltage) is applied to the second pixel electrode 35C and the positively charged particles 27 (W) with a white color which have a positive charge are adsorbed to the second pixel electrode 35C side. In this manner, red is displayed in the pixel 40 and is set as an initial state.

Writing Time T12

Next, a writing operation is executed. The positive voltage VH is applied to the second pixel electrode 35C in order to perform white display. In the first pixel electrode 35B, Vcom or the minus voltage Vl1 which is sufficient so that the black particles 26 do not separate from on the first pixel electrode 35B as shown in FIG. 25 (sufficient so that that white particles 27 are not adsorbed to the first pixel electrode 35B) is applied. In this manner, the black particles 26 (B) are adsorbed to the first pixel electrode 35B. Then, only the white particles 27 (W) are moved to the opposing electrode 37 side and distributed so as to cover the entire surface of the opposing electrode 37. According to this, only the white particles 27 (W) are visually recognized when viewed from the opposing substrate side and white is displayed (FIG. 14C).

In addition, in the first pixel electrode 35B, the positive voltage VH may still be applied continuing from the preset time described above, but here, by applying a small negative voltage Vl1, the separation of the black particles 26 and the white particles coming over to the first pixel electrode 35B are prevented.

Image Holding Time T13

Next, an operation for holding a display is executed. Here, in order to hold an image without rewriting, Vcom is applied in the first pixel electrode 35B and the second pixel electrode 35C. All of the three electrodes of the first pixel electrode 35B, the second pixel electrode 35C, and the opposing electrode 37 may be in a high impedance state.

Preset Time T21

Next, in a case of rewriting to a dark red display, the preset operation (second preset operation) such as that described above is executed. However, this time, the large negative voltage VL is applied to the first pixel electrode 35B and the large positive voltage VH is applied to the second pixel electrode 35C. According to this, the color particles opposite to the time of the previous preset operation (first preset operation) are collected on the respective pixel electrodes 35B and 35C sides. The positively charged particles 27 (W) with a white color which have a positive charge are adsorbed to the first pixel electrode 35B side and the negatively charged particles 26 (B) with a black color which have a negative charge are adsorbed to the second pixel electrode 35C side (FIG. 17B).

In this manner, an alternating current voltage is applied between the three electrodes including the opposing electrode 37 and it is possible to prevent deterioration of the electrophoretic material and corrosion of the electrodes since a direct current voltage is not applied.

Writing Time T22

Next, the writing operation is executed. A negative voltage Vl2 (|Vcom|<|Vl2|<|Vl1|) with an absolute value which is smaller than the voltage Vl1 and larger than the voltage Vcom is applied in the second pixel electrode 35C and a portion of the negatively charged particles 26 (B) with a black color are moved to the opposing electrode 37 side. At this time, in the first pixel electrode 35B, Vcom or a small positive voltage Vh which is sufficient so that the positively charged particles 27 (W) with a white color do not separate from the first pixel electrode 35B as shown in FIG. 25 (sufficient so that that black particles 26 are not adsorbed to the first pixel electrode 35B) is applied. In this manner, the positively charged particles 27 (W) are adsorbed to the first pixel electrode 35B. According to this, there is a state where many of the non-charged particles 28 (R) with a red color and a small amount of the negatively charged particles 26 (B) with a black color are distributed on the opposing electrode 37 side and a dark red is displayed. Here, similar to the previous case, the voltage VL may be used instead of the voltage Vh.

Image Holding Time T23

When writing is completed, Vcom is applied to the three electrodes of the first pixel electrode 35B, the second pixel electrode 35C, and the opposing electrode 37. According to this, the three electrodes described above are in a high impedance state and the display is held. Power is not consumed.

In this manner, the preset operation and the writing operation may be executed with a holding operation between each operation and not performed in continuation. A holding state is a state where a voltage which rewrites the image in each of the pixel electrodes 35B and 35C is not actually applied from an external portion. In addition, Vl and Vh are, for example, voltages for, without moving the black particles or the white particles on one of the pixel electrodes, moving a predetermined amount of the particles on the other pixel electrode to a predetermined position on the opposing electrode 37 side. If this is achieved, the voltages may be any polarity or size.

The size relationship of the voltages described above is one example. This is because the values of the size relationship of the voltages change due to the distance between the pixel electrode 35B and the pixel electrode 35C, the distance between the pixel electrodes 35B and 35C and the opposing electrode 37, the sizes of the pixel electrode 35B and the pixel electrode 35C, and the electrophoretic material.

Furthermore, the switching of the polarities of the voltages applied to the two first pixel electrodes 35B and 35C in the preset time may be performed for each plurality of screens and not for each one screen.

In addition, Vcom is not limited to the ground voltage.

In the driving method described above, the voltage applied to the opposing electrode 37 is set as Vcom and is constant, but an alternating current voltage may be applied. For example, Vcom may alternate between the ground voltage and the voltage VH. When Vcom is the ground potential, if a positive voltage such as the voltage VH is applied to the pixel electrode 35B (35C), it is possible to perform a similar operation to the case where a positive voltage is applied to the pixel electrode 35B (35C) in the embodiment described above. In addition, when Vcom is the voltage VH, the pixel electrode 35B (35C) has a relatively smaller polarity than the opposing electrode 37 due to the ground potential or an intermediate voltage between the ground potential and the voltage VH being applied to the pixel electrode 35B (35C), it is possible to perform a similar operation to the case where a negative voltage is applied to the pixel electrode 35B (35C) in the embodiment described above.

In the embodiment described above, a voltage with an amplitude |VH−VL| is applied in the pixel electrode 35B and the second pixel electrode 35C, but it is possible to reduce the amplitude to |VH| if an alternating current voltage is applied.

Below, a specific configuration for realizing the operation of the embodiment will be described.

Figure 26:
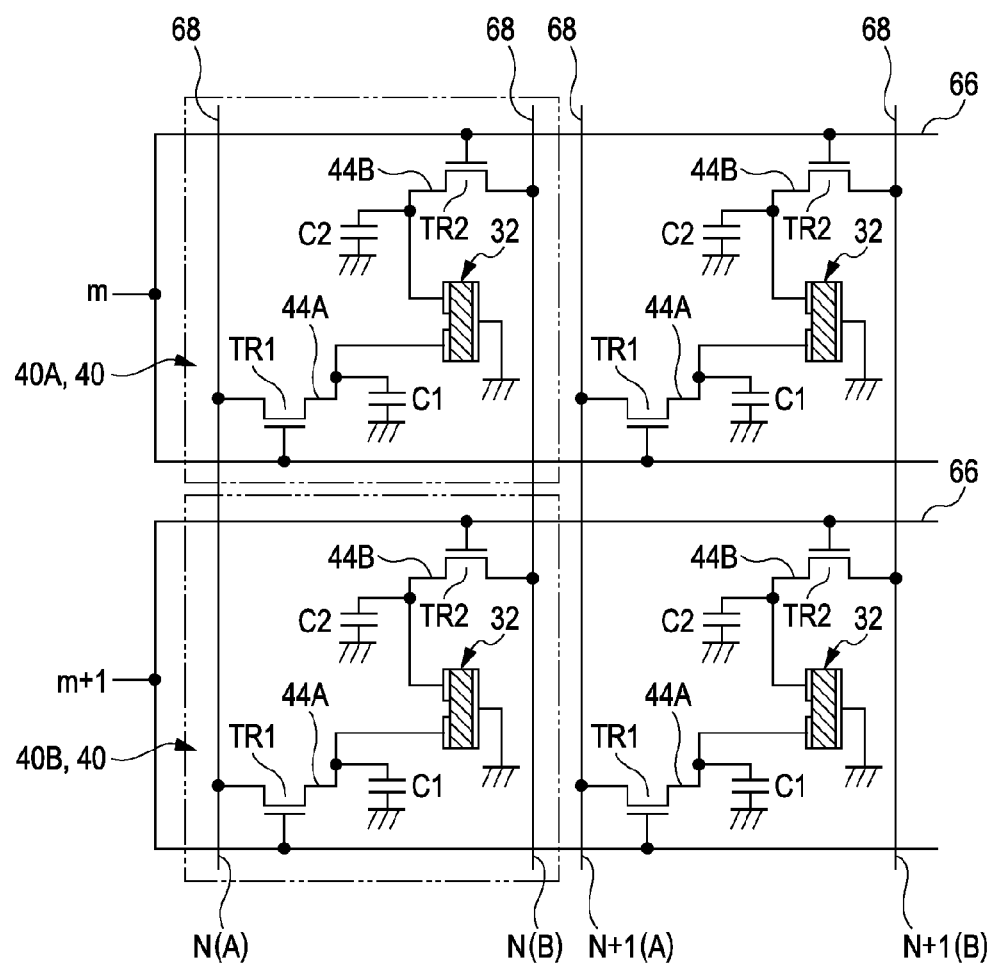
FIG. 26 is an equivalent circuit diagram of the electrophoretic display device.

FIG. 26 is an equivalent circuit diagram of the electrophoretic display device.

In the electrophoretic display device of the embodiment, two selection transistors TR1 and TR2 are provided in one pixel. As shown in FIG. 26, a pixel circuit in one pixel each has a configuration which includes the electrophoretic layer 32 as an electro-optic material, holding capacitances C1 and C2 for holding a electric polarization state of the electrophoretic layer 32, and the selection transistors TR1 and TR2 for performing a switching operation and accumulating a electrical charge in the holding capacitances C1 and C2.

The gate of the selection transistor TR1 is connected to the scanning line 66 (first scanning line), the source of the selection transistor TR1 is connected to the data line 68 (first data line), and the drain of the selection transistor TR1 is connected to the electrophoretic layer 32. The gate of the selection transistor TR2 is connected to the scanning line 66 (second scanning line), the source of the selection transistor TR2 is connected to the data line 68 (second data line), and the drain of the selection transistor TR2 is connected to the electrophoretic layer 32.

Specifically, out of the pixels 40A and 40B which are adjacent in the column direction, in the pixel 40A, the gates of each of the selection transistors TR1 and TR2 are connected to an m row of the scanning line 66. In addition, the source of the selection transistor TR1 is connected to an N (A) row of the data line 68 and the drain of the selection transistor TR1 is connected to the electrophoretic layer 32 and one electrode of the holding capacitance C1. On the other hand, the source of the selection transistor TR2 is connected to an N (B) row of the data line 68B and the drain of the selection transistor TR2 is connected to the electrophoretic layer 32 and one electrode of the holding capacitance C2.

Here, it is possible to have a configuration with none of the holding capacitances C1 and C2. In addition, a means for applied a voltage to the electrophoretic layer 32 other than the holding capacitances may be installed.

Figure 27:
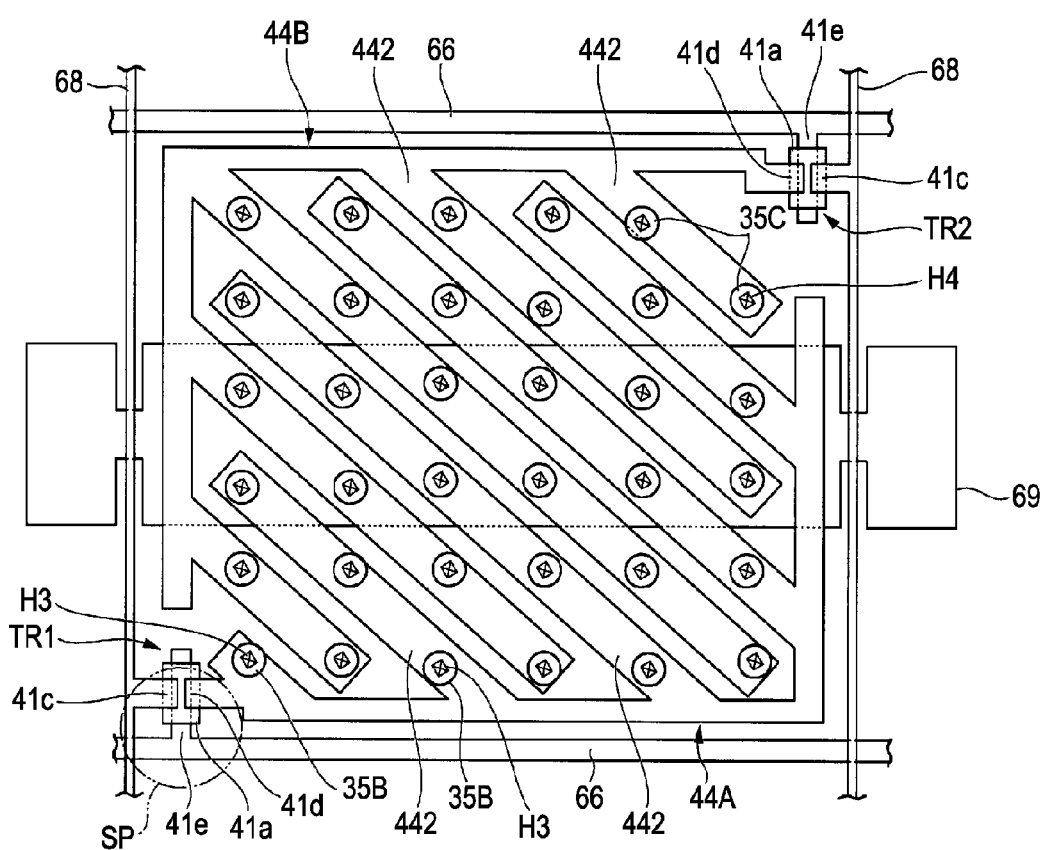
FIG. 27 is a planar diagram illustrating a specific configuration example of one pixel according to the third embodiment.

FIG. 27 is a planar diagram illustrating a specific configuration example of one pixel according to the third embodiment. As shown in FIG. 27, the first connection electrode 44A and the second connection electrode 44B of the embodiment has a planar pectinate shape and are connected to the first pixel electrode 35B and the second pixel electrode 35C which are formed thereon via the contact holes H3 and H4 which are formed in an interlayer insulating film (not shown) formed on the first substrate 30 so as to cover the first connection electrode 44A and the second connection electrode 44B. The holding capacitance C1 and C2 (FIG. 26) are formed in a region where the pixel electrode 35 and a capacitance line 69 overlap.

The first pixel electrode 35B is connected in the first connection electrode 44A via the contact hole H3 and the second pixel electrode 35C is connected in the second connection electrode 44B via the contact hole H4. A spacer SP for maintaining a gap between the element substrate 300 and the opposing substrate 310 has a thickness (height) of 40 µm with a column shape using photosensitive acrylic, and is used in a ratio of one for every plurality of the pixels 40.

In the embodiment, red is displayed, but it is possible to perform full color display or controlling of hue using a green display and a blue display in the same manner. In this case, red, blue, and green sub pixels are separated by a separation means such as a partition wall and are set so that the colored particles or dispersion mediums do not mix. One pixel is configured by the three sub pixels of red, blue, and green being arranged in lines. According to this, it is possible to perform controlling of hue and a full color display is possible.

In the embodiment, by sequentially selecting the scanning lines 66, a voltage is supplied to each of the connection electrodes 44A and 44B and each of the pixel electrodes 35B and 35C via the first selection transistor TR1 and the second selection transistor TR2.

There is no particular basis for selecting the polarities of the black particles, the white particles and the dispersion medium, and the non-charge, and any combination may be used.

In addition, the voltage after the preset state shown in FIG. 25 is controlled by the size of the absolute value of the voltage corresponding to FIGS. 14A to 17B, but is not limited to this. Control including the length of the voltage application time may be used. At this time, since the relationship between the voltage and the display shown in FIG. 14A to 17B can be partially reversed, it is not limited to this.

The constituent material of the transparent electrodes used in the opposing electrode 37, the first pixel electrode 35B, and the second pixel electrode 35C is not particularly limited as long as the material has conductivity in practice, but for example, there are various types of conductive materials such as metallic materials such as copper, aluminum, or an alloy including copper and aluminum, carbon-based materials such as carbon black, electronically conductive polymer materials such as polyacetylene, polypyrrole or a conductor of polyacetylene and polypyrrole, ion conductive polymer materials such as an ionic material such as NaCl, LiClO$_4$, KCl, LiBr, LiNO$_3$, or LiSCN dispersed in a matrix resin such as polyvinyl alcohol, polycarbonate, or polyethylene oxide, or conductive oxide materials such as indium tin oxide (ITO), fluorine-doped tin oxide (FTO), tin oxide (SnO$_2$), or indium oxide (IO), and it is possible to use one type or a combination of two or more types.

In addition, as the electrode material of the pixel electrode 35B and the pixel electrode 35C, it is not necessary for the materials to be transparent since the electrodes are positioned on a side opposite to the visually recognized side, and for example, a paste of a metal, a silicide, silver, or the like may be used.

As the material for the dispersion medium 21, it is preferable that it is colorless and transparent in practice. As such a dispersion medium, a material with relatively high insulating properties is suitably used. As the dispersion medium, there are various types of water (distilled water, pure water, ion-exchange water, or the like), alcohols such as methanol, ethanol, or butanol, cellosolves such as methyl cellosolve, esters such as methyl acetate or ethyl acetate, ketones such as acetone or methyl ethyl ketone, aliphatic hydrocarbons such as pentane, alicyclic hydrocarbons such as cyclohexane, aromatic hydrocarbons such as benzene with a long-chain alkyl group such as benzene or toluene, halogenated hydrocarbons such as methylene chloride or chloroform, aromatic heterocycles such as pyridine or pyrazine, nitriles such as acetonitrile or propionitrile, amides such as N,N-dimethylformamide, mineral oils such as carboxylate or liquid paraffin, vegetable oils such as linoleic acid, linolenic acid, or oleic acid, silicone oils such as dimethyl silicone oil, methyl phenyl silicone oil, or methyl hydrogen silicone oil, fluorine-based liquids such as hydrofluoro ether, or other types of oils, and it is possible to use one or a combination.

As the dispersion medium 21, a gas or a vacuum may be used.

In addition, in the dispersion medium 21, various types of additives such as electrolytes, surfactants, metallic soaps, resins, rubber, oils, varnishes, charge control agents formed from particles such as compounds, dispersants such as titanium-based coupling agents, aluminum-based coupling agents, and silane-based coupling agents, lubricants, and stabilizers may be added as required.

For the charged particles, non-charged particles, and transparent particles included in the dispersion medium 21, it is possible to use various materials for each, and while not particularly limiting, at least one type of dye particles, pigment particles, resin particles, ceramic particles, metallic particles, metal oxide particles, or particles which are a combination of these are suitably used. The particles have advantages in that manufacturing is easy and it is possible to relatively easily perform charge control.

As the pigments which configure the pigment particles, there are black pigments such as aniline black, carbon black, or black titanium oxide, white pigments such as titanium dioxide, antimony trioxide, zinc sulfide, or zinc oxide, azo-based pigments such as monoazo, diaso, or polyazo, yellow pigments such as isoindolinone, chrome yellow, yellow iron oxide, cadmium yellow, or titan yellow, red pigments such as quinachrome red or chrome vermillion, blue pigments such as phthalocyanine blue, indanthrene blue, iron blue, ultramarine, or cobalt blue, green pigments such as phthalocyanine green, cyan pigments such as ferric ferrocyanide, or magenta pigments such as inorganic iron oxide. It is possible to use an inorganic pigment or an organic pigment. It is possible to use one type or a combination of two or more types.

It is possible to use a dye instead of the pigments described above and to configure dye particles. In this case, a dye may be used by being mixed with a white pigment or mixed with a colored pigment. For example, it is possible to use a dye such as a carbonium-type magenta.

In addition, as the resin material which configures the resin particles, there are acrylic resins, urethane resins, urea resins, epoxy resins, rosin resins, polystyrene, polyester, or AS resins which are a copolymer of styrene and acrylonitrile, and it is possible to use one type or a combination of two or more types.

In addition, as compound particles, for example, there are particles which are configured by a resin material covering the surface of pigment particles, a pigment covering the surface of resin particles, or a compound where a pigment and a resin material are mixed in an appropriate composition ratio. In addition, as each type of particle included in the dispersion medium 21, a particle configuration where the centers have been made hollow may be used. According to the configuration such as this, in addition to the surface of the particles scattering light, it is possible that light is also scattered by wall surfaces which configure the hollow inside of the particles and it is possible for the scattering efficiency of light to be improved. As such, it is possible to improve the coloring of white or other colors.

In addition, in order to improve the dispersibility of the electrophoretic particles in the dispersion medium, it is possible to physically adsorb or chemically bond a polymer with a high compatibility with the dispersion medium on the surface of each particle. Out of these, due to the problem of detaching from the surface of the electrophoretic particles, it is particularly preferable if the polymer is chemically bonded. According to the configuration, there is an action in a direction of reducing the specific gravity of the appearance of the electrophoretic particles and it is possible to improve the affinity of the electrophoretic particles to the dispersion medium, that it, the dispersibility.

As a polymer such as this, there are polymers which have a group which has reactivity with the electrophoretic particles and a charged functional group, polymers which have a group which has reactivity with the electrophoretic particles and a long alkyl chain, long ethylene oxide chain, long alkyl fluoride chain, long dimethyl silicone chain, and the like, or polymers which have a group which has reactivity with the electrophoretic particles, a charged functional group, a long alkyl chain, long ethylene oxide chain, long alkyl fluoride chain, long dimethyl silicone chain, and the like.

In the polymers described above, as a group which has reactivity with the electrophoretic particles, there are epoxy groups, thio epoxy groups, alkoxysilane groups, silanol groups, alkylamide groups, aziridine groups, oxazoline groups or isocyanate groups, and it is possible to select and use one type or two or more types, but the selection may be made to correspond to the type of electrophoretic particle used or the like.

The average particle diameter of the electrophoretic particles is not particularly limited, but it is preferable if the average particle diameter is approximately 0.01 to 10 μm and it is more preferable if the average particle diameter is approximately 0.02 to 5 μm.

In addition, acrylic is used as the material of the insulating film for securing insulation of the pixel electrodes 35B and 35C and the connection electrodes 44A and 44B. It is possible to use materials other than acrylic, and inorganic insulating films such as a silicon oxide film or organic insulating films are possible.

As the first substrate 30 included in the element substrate 300 and the second substrate 31 included in the opposing substrate 310, an organic insulating substrate other than a PET substrate, an inorganic glass substrate such as thin glass, or a composite substrate formed from an inorganic material and an organic material may be used.

In addition, it is possible for the driving method of the embodiment described above to be also applied to the electrophoretic display devices of the first embodiment and the second embodiment described previously. The writing of a new display is possible since each embodiment of the electrophoretic display device is returned once to an initial state by a voltage which moves the electrophoretic particles to the opposing electrode side being applied to each of the pixel electrodes and the opposing electrode before an image writing operation. By returning once to an initial state, the movement of the electrophoretic particles is smoothly performed and the display of gradation corresponding to the applied voltage is reliably realized.

Fourth Embodiment

Next, an electrophoretic display device according to a fourth embodiment will be described. The embodiment is equivalent to a configuration which is more detailed than the electrophoretic display device and the driving method of the same according to the second embodiment.

Figure 28:
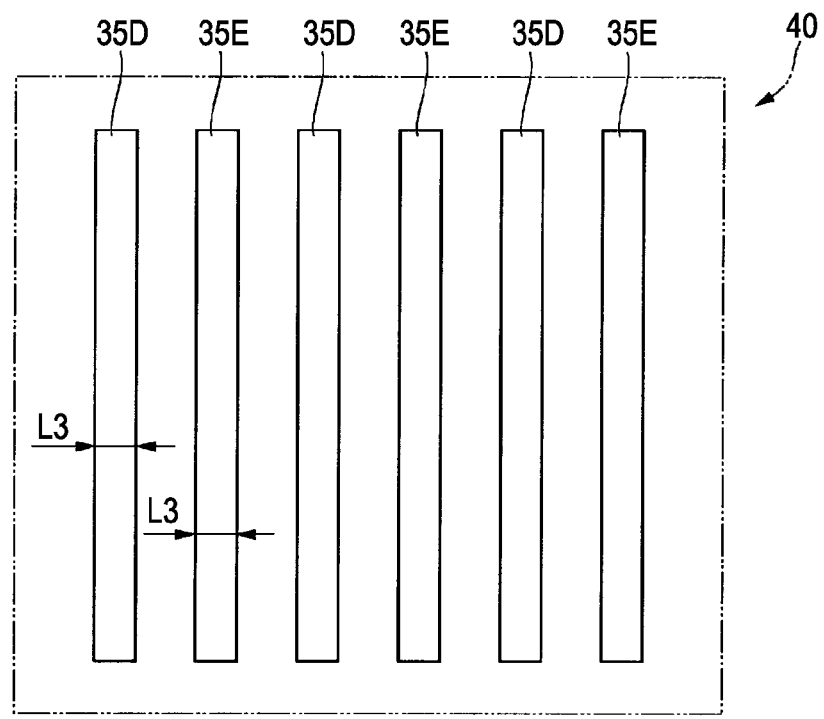
FIG. 28 is a planar diagram illustrating an arrangement example of a pixel electrode in an electrophoretic display device according to a fourth embodiment.

FIG. 28 is a planar diagram illustrating an arrangement example of a pixel electrode in the electrophoretic display device according to the fourth embodiment.

In the embodiment, a plurality of first pixel electrodes 35D and second pixel electrodes 35E (third electrodes) are shown which have a rectangular shape and not a planar circular shape, and are arranged in a stripe shape with predetermined intervals between each other in a state where each pixel electrode is parallel. The first pixel electrodes 35D and the second pixel electrodes 35E are alternately lined up in one direction, and a length L3 of the short side of each pixel electrode is set to a length shorter than the cell gap, preferably to a length equal to or less than ½ of the cell gap.

Figure 29:
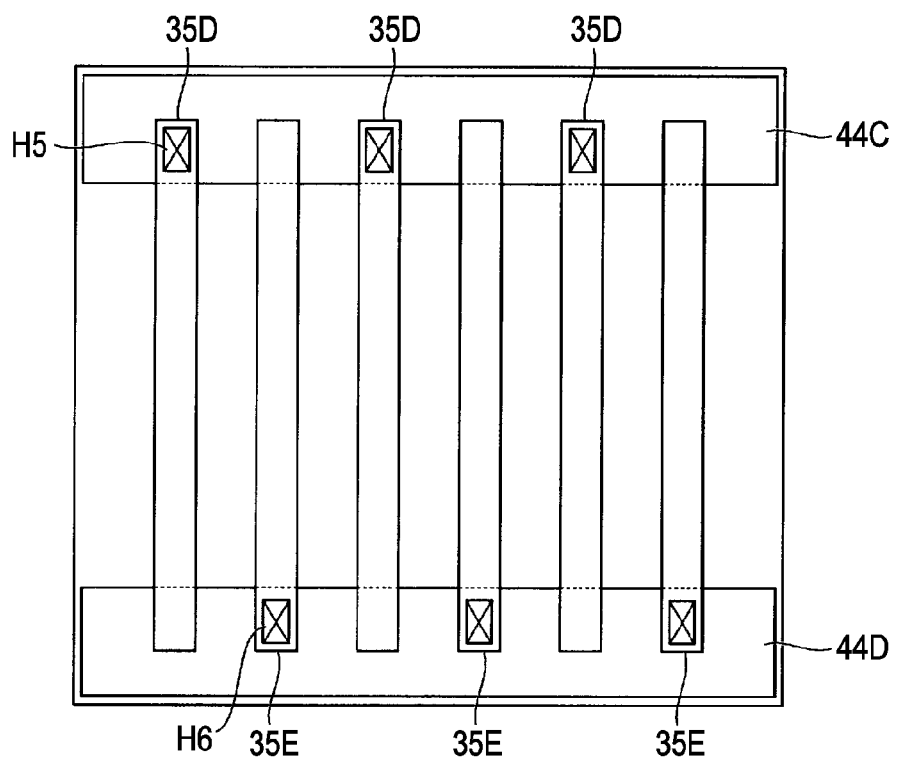
FIG. 29 is a planar diagram illustrating a specific configuration of the one pixel shown in FIG. 28.

FIG. 29 is a planar diagram illustrating a specific configuration example of the one pixel shown in FIG. 28.

As shown in FIG. 29, two connection electrodes 44C and 44D are formed which extend along an arrangement direction of the pixel electrodes 35D and 35E on the first substrate 30. In the first connection electrode 44C, the first pixel electrode 35D is connected via a contact hole H5, and in the second connection electrode 44D, the second pixel electrode 35E is connected via a contact hole H6.

Fifth Embodiment

Next, an electrophoretic display device according to a fifth embodiment will be described. The embodiment is equivalent to a configuration which is more detailed than the electrophoretic display device and the driving method of the same according to the second embodiment.

Figure 30:
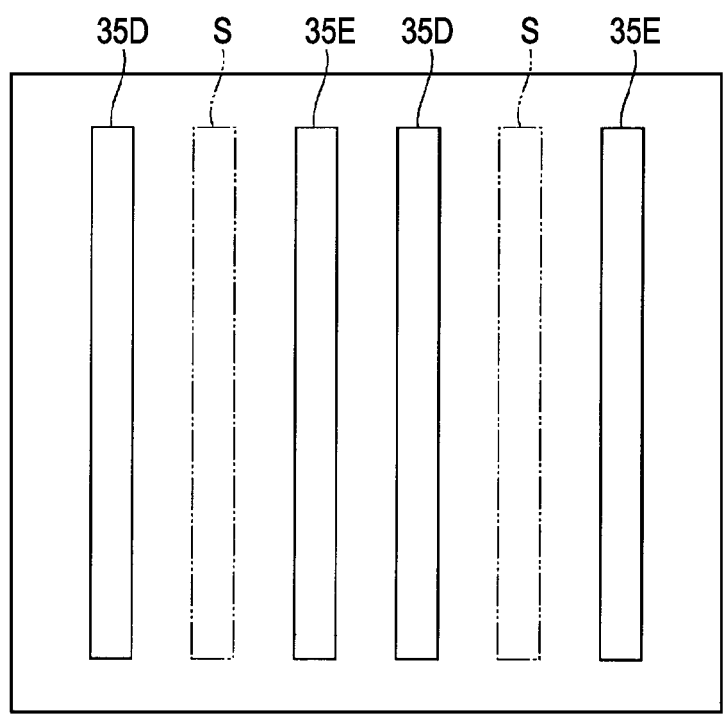
FIG. 30 is a planar diagram illustrating an arrangement example of a pixel electrode in an electrophoretic display device according to a fifth embodiment.

FIG. 30 is a planar diagram illustrating an arrangement example of a pixel electrode in the electrophoretic display device according to the fifth embodiment.

Here, a no-electrode-formed region S is provided between the first pixel electrode 35D and the second pixel electrode 35E. In the no-electrode-formed region S, there is actually no electrode formed and a space is provided. As the arrangement order of the first pixel electrode 35D, the second pixel electrode 35E, and the no-electrode-formed region S, the first pixel electrode 35D, the no-electrode-formed region S, and the second pixel electrode 35E are arranged in this order in a repeated pattern in one direction.

In this manner, there may be a configuration where the no-electrode-formed region S is appropriately provided between each of the pixel electrodes 35D and 35E.

Sixth Embodiment

Next, an electrophoretic display device according to a sixth embodiment will be described. The embodiment is equivalent to a configuration which is more detailed than the electrophoretic display device and the driving method of the same according to the second embodiment.

Figure 31:
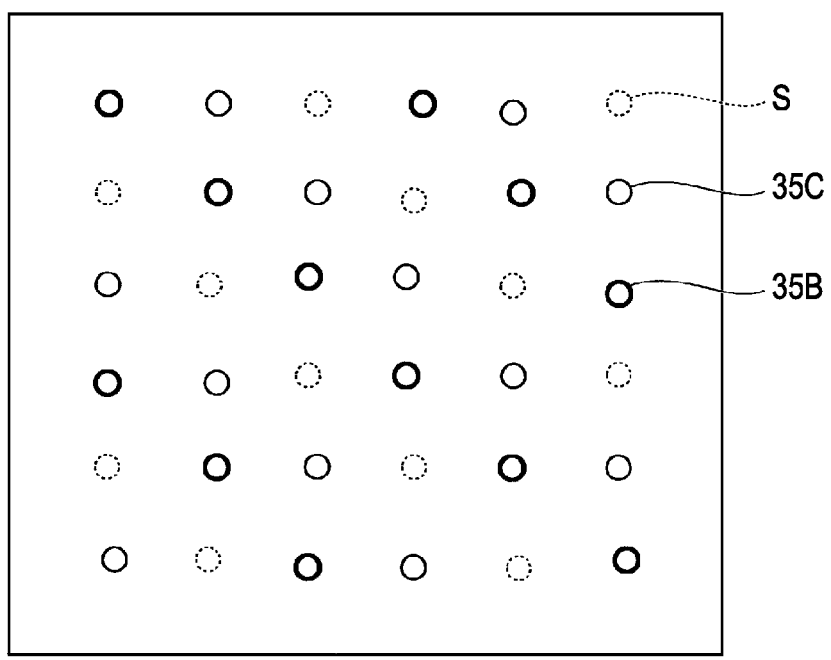
FIG. 31 is a planar diagram illustrating an arrangement example of a pixel electrode in an electrophoretic display device according to a sixth embodiment.

FIG. 31 is a planar diagram illustrating an arrangement example of a pixel electrode in the electrophoretic display device according to the sixth embodiment.

In the embodiment, the no-electrode-formed region S is provided between the first pixel electrode 35B and the second pixel electrode 35C with circular planar shapes. Since the first pixel electrode 35B corresponds to the black particles and the second pixel electrode 35C corresponds to the white particles, there is no collecting of the black particles and the white particles and there are only non-charged red particles in the no-electrode-formed region S.

Even in the embodiment, it is possible to perform controlling of saturation and brightness in each pixel by adjusting the size of the black particle and the white particle spots distributed on the opposing electrode.

Next, other applied examples will be described.

FIGS. 32A to 33D are cross-sectional diagrams illustrating a schematic configuration of different applied examples.

Figure 32A:
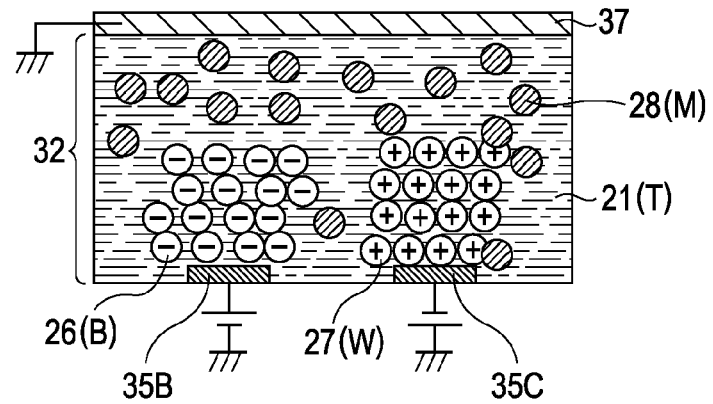
FIGS. 32A to 32C are cross-sectional diagrams illustrating a schematic configuration of different applied examples.

In FIG. 32A, magenta particles are used instead of the red particles. The negatively charged particles 26 (B) with a black color which have a negative charge, the positively charged particles 27 (W) with a white color which have a positive charge, and the non-charged particles 28 (M) with a magenta color are held in the colorless and transparent dispersion medium 21 (T). In this case, a light magenta display is possible by applying the positive voltage VH to the first pixel electrode 35B and the negative voltage VL to the second pixel electrode 35C.

In addition, it is possible to perform controlling of hue by further using cyan and yellow as charged particles and providing sub pixels which include charged particles of any of cyan, magenta, and yellow and to perform the color display.

Figure 32B:
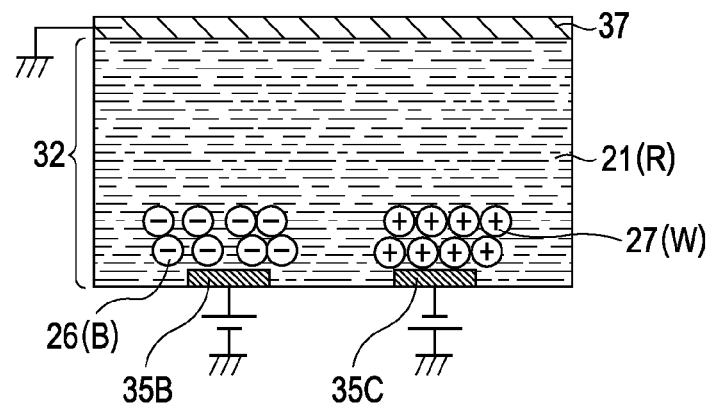

In FIG. 32B, the negatively charged particles 26 (B) with a black color and the positively charged particles 27 (W) with a white color are held in the dispersion medium 21 (R) with a red color. In this case, in the same manner as was described using FIGS. 14A to 17B, it is possible to control the brightness and saturation of red by applying a voltage to the first pixel electrode 35B and the second pixel electrode 35C.

Figure 32C:
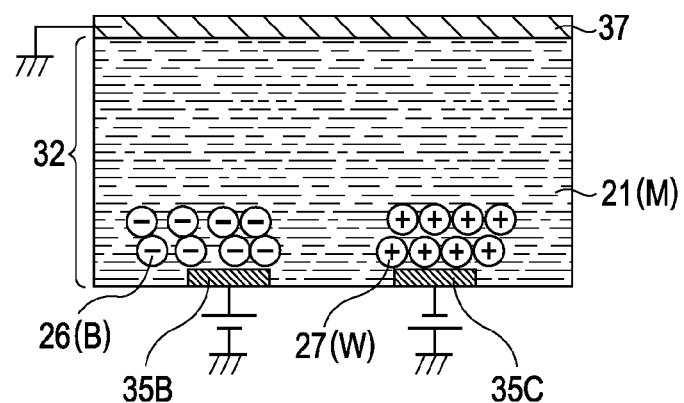

In FIG. 32C, the negatively charged particles 26 (B) with a black color and the positively charged particles 27 (W) with a white color are held in the dispersion medium 21 (M) with a magenta color. In this case, in the same manner as FIG. 32B, it is possible to control the brightness and saturation of magenta.

In addition, in FIG. 32C, it is possible to display a darker color than the magenta which can be displayed in FIG. 32A.

In addition, as the colors of the charged particles, the non-charged particles, and the dispersion medium, CMY, RGB, or the like may be used.

Even in FIGS. 32B and 32C, a color display is possible by using sub pixels.

In FIG. 33A, the negatively charged particles 26 (C) with a cyan color which have a negative charge, the positively charged particles 27 (Y) with a yellow color which have a positive charge, and the non-charged particles 28 (M) with a magenta color are held in the colorless and transparent dispersion medium 21 (T). In this case, using the method shown in FIGS. 14A to 17B, a faint color display is possible by applying a voltage to the first pixel electrode 35B and the second pixel electrode 35C. In this case, controlling of not only brightness and saturation but also hue is performed using the distribution of the charged particles. In the controlling of brightness, saturation, and hue, the area of the distribution of the charged particles is used, but mixed colors due to the mixing of the particles is also used. For example, in a region where the yellow particles exist close to the cyan particles, the light reflected by both particles becomes green which is transmitted light which is common to both particles and only green light is reflected to the viewing side. In this manner, a mixed color is obtained by light being reflected and scattered by different colored particles. The mixing of the charged particles is a state where each of the positively charged particles 27 (W) with a white color and the negatively charged particles 26 (B) with a black color of FIG. 15B are swapped with the particles of any of cyan, magenta, or yellow. In addition, a mixed color is possible even if the non-charged particles and the charged particles are mixed.

In this method, the separating means of the sub pixels such as a partition wall is not used since the sub pixels are not used.

In FIG. 33B, the dispersion medium 21 (M) with a magenta color is used instead of the colorless and transparent dispersion medium 21 (T) of FIG. 33A. In addition, the non-charged particles with a magenta color are not used. In this case, a dark magenta display is possible by applying the positive voltage VH to the first pixel electrode 35B and the negative voltage VL to the second pixel electrode 35C.

In FIG. 33C, the negatively charged particles 26 (C) with a cyan color which have a negative charge, the positively charged particles 27 (R) with a red color which have a positive charge, and transparent particles 29 which are non-charged particles are held in the colorless and transparent dispersion medium 21 (T). In this case, a white display is possible by applying the positive voltage VH to the first pixel electrode 35B and the negative voltage VL to the second pixel electrode 35C. The light incident from the opposing electrode 37 side is scattered and reflected by the transparent particles 29 suspended in the dispersion medium 21 (T) and is discharged from the display surface (the opposing electrode 37) side. According to this, a bright white display can be obtained.

In this manner, by mixing in the transparent particles 29, it is possible to effectively scatter light in the dispersion medium 21 and it is possible to improve display luminance. As a result, a high contrast display is possible.

Here, an example is shown of a combination of red and cyan which is a complementary color of red, and a black display is possible by the size of the voltage applied to the first pixel electrode 35B and the second pixel electrode 35C being controlled, a portion of the negatively charged particles 26 (C) with a cyan color and the positively charged particles 27 (R) with a red color each being moved to the opposing electrode 37 side, and each of the particles is mixed (dispersed) three-dimensionally.

In addition, blue with yellow and green with magenta which are other combinations of complementary colors are also possible. By arranging sub pixels with the combinations, it is possible to perform color display in one pixel.

As in the invention, a full color display is possible by arbitrarily combining colored dispersion mediums and colored particles.

In FIG. 33D, a color filter CF (R) with a red color is provided in a lower layer of the first pixel electrode 35B and the second pixel electrode 35C. In addition, the negatively charged particles 26 (B) with a black color and the positively charged particles 27 (W) with a white color are held in the colorless and transparent dispersion medium 21 (T). In this case, a red display is possible by applying the positive voltage VH to the first pixel electrode 35B and the negative voltage VL to the second pixel electrode 35C. In this example, the particles can be seen from the opposing electrode 37 side also when the charged particles are collected on the first pixel electrode 35B and the second pixel electrode 35C. With this state as a standard, the particles are moved to the opposing electrode 37 side and display is performed. As in this example, it is possible for the controlling of the display to be performed using the distribution and the area of not only the particles in the vicinity of the opposing electrode 37 but also the particles which can be seen from the opposing electrode 37 side including the particles on the pixel electrode side.

In the same manner as the embodiments described above, a full color display is possible by combining green and blue sub pixels.

In addition, although not shown, it is possible to use a capsule-type electrophoretic layer.

Above, preferred embodiments according to the invention have been described while referring to the attached diagrams, but it goes without saying that the invention is not particularly limited by the examples. It should be understood by those skilled in the art that various modifications and alterations can be made which are within the scope of the technical concept described in the above-described aspects and these belong to the technical scope of the invention.

In each of the embodiments described above, by executing a preset operation where a voltage which moves the charged particles to the pixel electrode side is applied to each electrode before an image writing operation, display rewriting is smoothly performed.

In addition, in the previous embodiments, the configuration where the plurality of pixel electrodes 35 is provided with a total area in one pixel which is equal to or less than ¼ of a pixel and the configuration where the plurality of first pixel electrodes 35B and the plurality of second pixel electrodes 35C are provided with a total area which is equal to or less than ¼ of a pixel are described, but one pixel electrode 35, which has an area in one pixel equal to or less than ¼ of a pixel, may be provided for each pixel.

In addition, in each of the embodiments, a liquid dispersion medium is used but the dispersion medium may be a gas.

Electronic Apparatus

Next, cases will be described where the electrophoretic display devices of each of the embodiments described above are applied to electronic apparatuses.

Figure 34A:
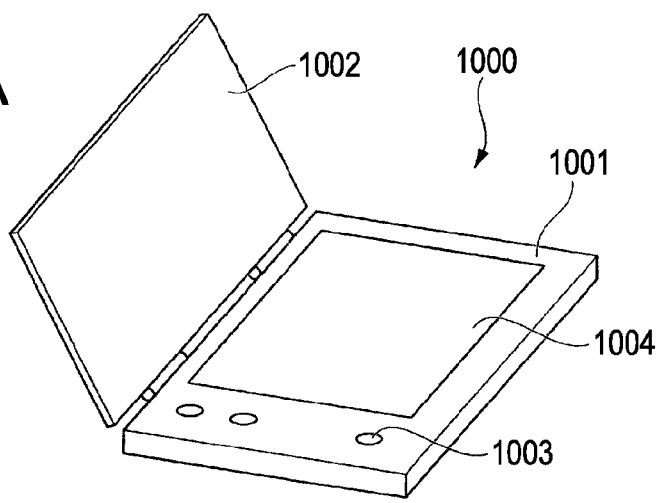
FIGS. 34A to 34C are diagrams illustrating examples of electronic apparatuses.
Figure 34B:
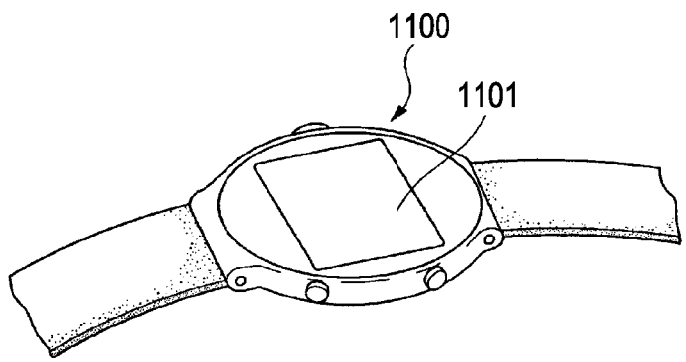
Figure 34C:
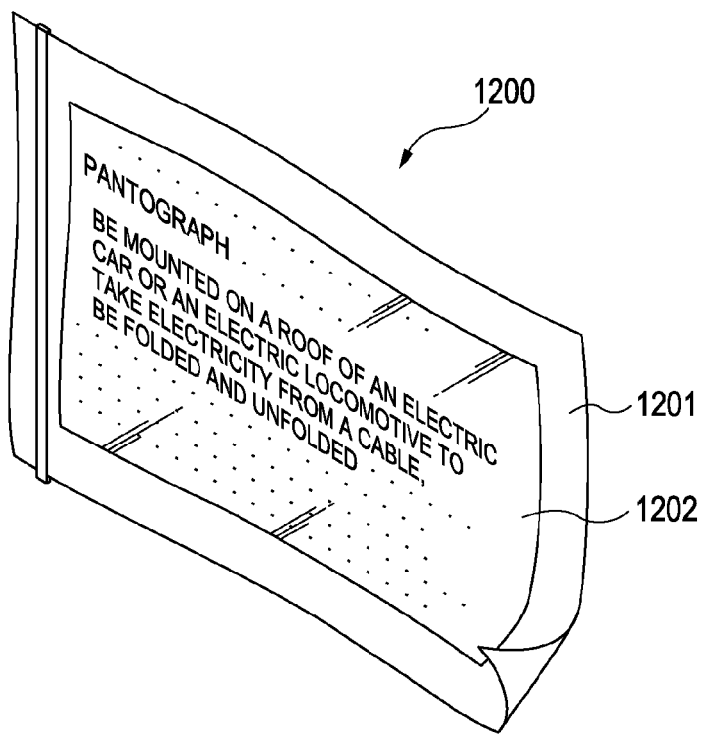

FIGS. 34A to 34C are perspective diagrams describing specific examples of electronic apparatuses where the electrophoretic display device of the invention has been applied.

FIG. 34A is a perspective diagram illustrating an electronic book which is an example of the electronic apparatus. An electronic book 1000 is provided with a frame 1001 with a book shape, a cover 1002 (able to be opened and closed) provided to freely rotate with regard to the frame 1001, an operation section 1003, and a display section 1004 configured using the electrophoretic display device of the invention.

FIG. 34B is a perspective diagram illustrating a wrist watch which is an example of the electronic apparatus.

A wrist watch 1100 is provided with a display section 1101 configured using the electrophoretic display device of the invention.

FIG. 34C is a perspective diagram illustrating an electronic paper which is an example of the electronic apparatus. An electronic paper 1200 is provided with a body section 1201 configured using a rewriteable sheet having the same feeling and flexibility as paper and a display section 1202 configured using the electrophoretic display device of the invention.

For example, since it is supposed that a purpose of the electronic book and the electronic paper and the like is to have characters repeatedly written onto a white background, it is necessary to resolve residual images when erasing and residual images over time.

In addition, the range of electronic apparatuses to which the electrophoretic display device of the invention can be applied is not limited to these and broadly includes apparatuses which use a visual change in color tone which accompanies movement of charged particles.

According to the electronic book 1000, the wrist watch 1100 and the electronic paper 1200 above, since the electrophoretic display device according to the invention is adopted, an electronic apparatus is provided with a color display means.

In addition, the electronic apparatuses described above exemplify the electronic apparatuses according to the invention and do not limit the technical scope of the invention. For example, it is possible to appropriately use the electrophoretic display device according to the invention also in the display sections of electronic apparatuses such as a mobile phone or a portable audio device.

Figure 35:
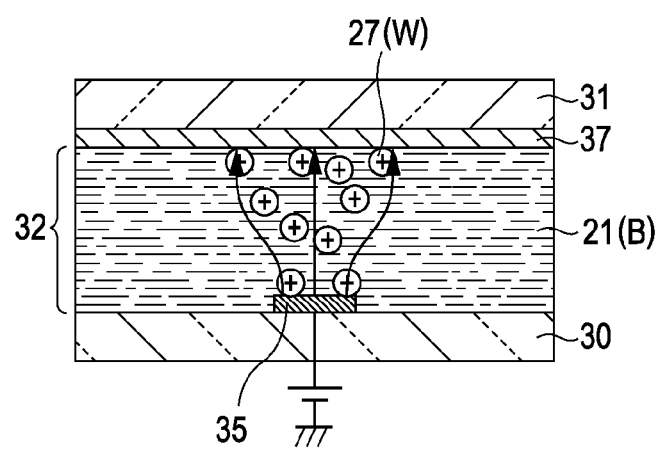
FIG. 35 is a diagram illustrating the distribution state of charged particles when a voltage is applied.

FIG. 35 is a diagram illustrating the distribution state of the charged particles when a voltage is applied.

In FIG. 1A described above, a portion of the positively charged particles 27 (W) are moved from the pixel electrode 35 toward the opposing electrode 37, and the majority of the moved charged particles reach the opposing electrode 37 and is positioned in the vicinity thereof. However, in practice, as shown in FIG. 35, not all of the charged particles which have separated from the pixel electrode 35 reach the opposing electrode 37, and there are some charged particles 27 (W) which are positioned in the dispersion medium 21 between the pixel electrode 35 and the opposing electrode 37. Even in this case, gradation and mixed colors are expressed by the effective distribution area of the particles viewed from the opposing electrode 37 side which includes the charged particles 27 (W) with a white color in the black dispersion medium 21 (B).

Figure 36A:
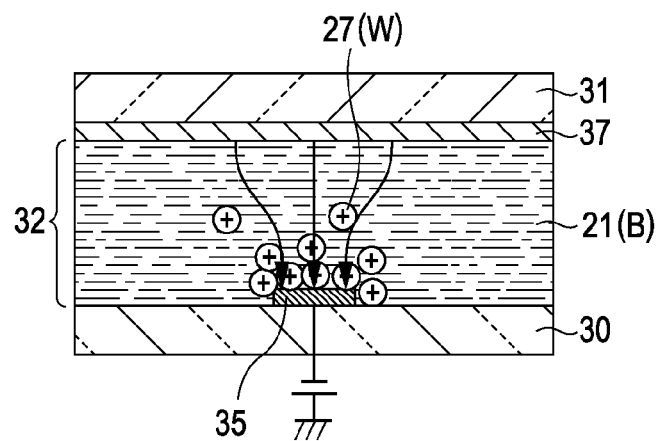
FIGS. 36A and 36B are diagrams illustrating the distribution state of charged particles when a voltage is applied.
Figure 36B:
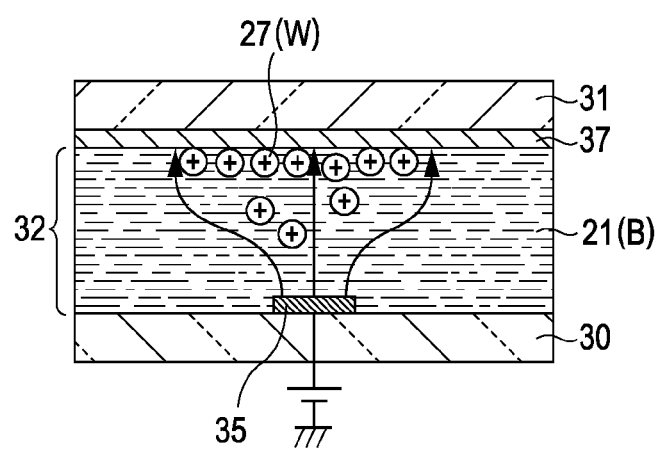

FIGS. 36A and 36B are diagrams illustrating the distribution state of the charged particles when a voltage is applied, where FIG. 36A is the appearance when a negative voltage is applied and FIG. 36B is the appearance when a positive voltage is applied.

In FIG. 2A described above, substantially all of the charged particles 27 (W) are positioned in the vicinity of the pixel electrode 35, and in FIG. 2B, substantially all of the charged particles 27 (W) are positioned in the vicinity of the opposing electrode 37, but to have the distribution states such as these, it is necessary to apply a predetermined voltage for a certain longer length of time or apply a large voltage.

As shown in FIG. 36A, in a case where the time of applying the negative voltage VL to the pixel electrode 35 is short, all of the charged particles 27 (W) are not moved to the pixel electrode 35 side and a portion of the charged particles 27 (W) are positioned in the dispersion medium 21 (B). In addition, as shown in FIG. 36B, in a case where the time of applying the positive voltage VH to the pixel electrode 35 is short, all of the charged particles 27 (W) are not moved to the opposing electrode 37 side and a portion of the charged particles 27 (W) are positioned in the dispersion medium 21 (B). Even in this case, gradation and mixed colors are expressed by the effective distribution area of the particles viewed from the opposing electrode 37 side which includes the charged particles 27 (W) in the dispersion medium 21 (B).

As above, even if a portion of the charged particles are positioned in the dispersion medium 21 (B), operation of the electrophoretic display device is possible. This is the same in the case of using 2 types of pixel electrodes which are driven independently of each other in one pixel.

Figure 37:
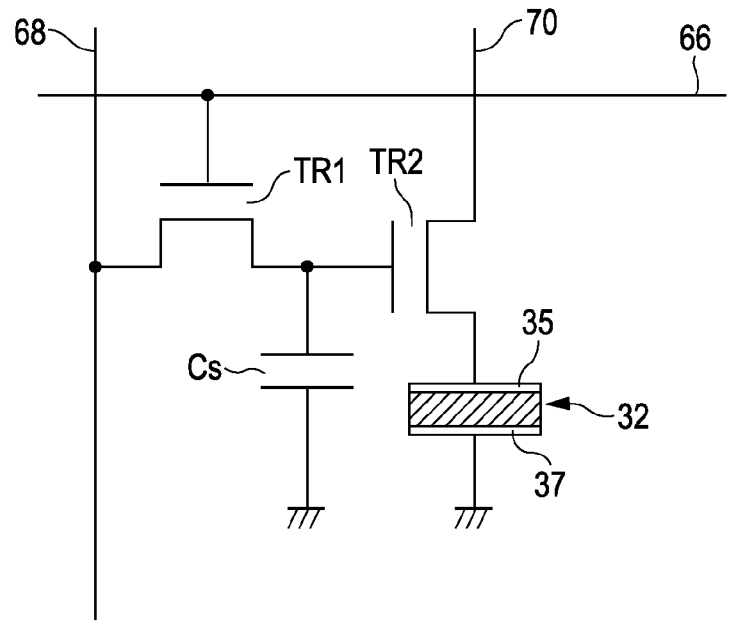
FIG. 37 is a diagram illustrating a modified example of an equivalent circuit of one pixel.

FIG. 37 is a diagram illustrating a modified example of an equivalent circuit of one pixel.

As shown in FIG. 37, a two-transistor two-capacitor configuration may be used. In this case, image data is written from the data line 68 into a holding capacitance Cs via the selection transistor TR1. The voltage held by the holding capacitance Cs is applied to the gate electrode 41e of the selection transistor TR2 and the selection transistor TR2 is in a conductive state according to the gate voltage. In the source electrode 41c of the selection transistor TR2, a signal line 70 is connected and a signal potential is applied. In addition, in the drain electrode 41d, the electro-optic material formed from an electrophoretic material is connected via the pixel electrode 35. According to the conductive state of the selection transistor TR2, the signal potential is modulated and applied to the electro-optic material. That is, in accordance with the image data written from the data line 68, the signal potential is modulated and applied to the electro-optic material. In this manner, display is performed.

Here, the holding capacitance Cs may be specifically formed or the parasitic capacitance of the two transistors TR1 and TR2 may be used. In addition, as the equivalent circuit which is able to be used in the invention other than these, there is no particular limitation.

Figure 38:
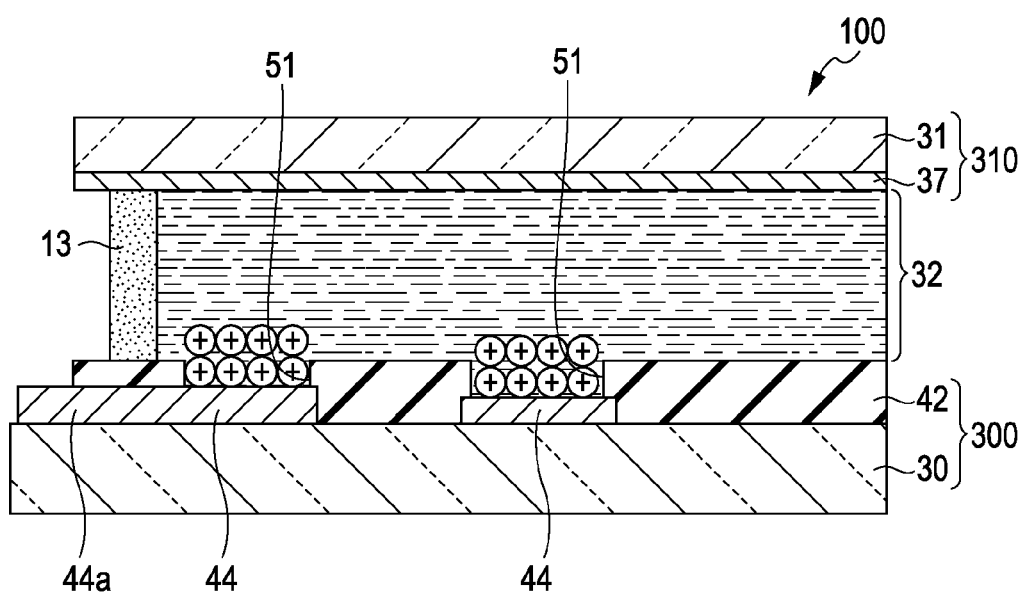
FIG. 38 is a cross-sectional diagram illustrating a modified example of the electrophoretic display device according to the first embodiment.
Figure 39:
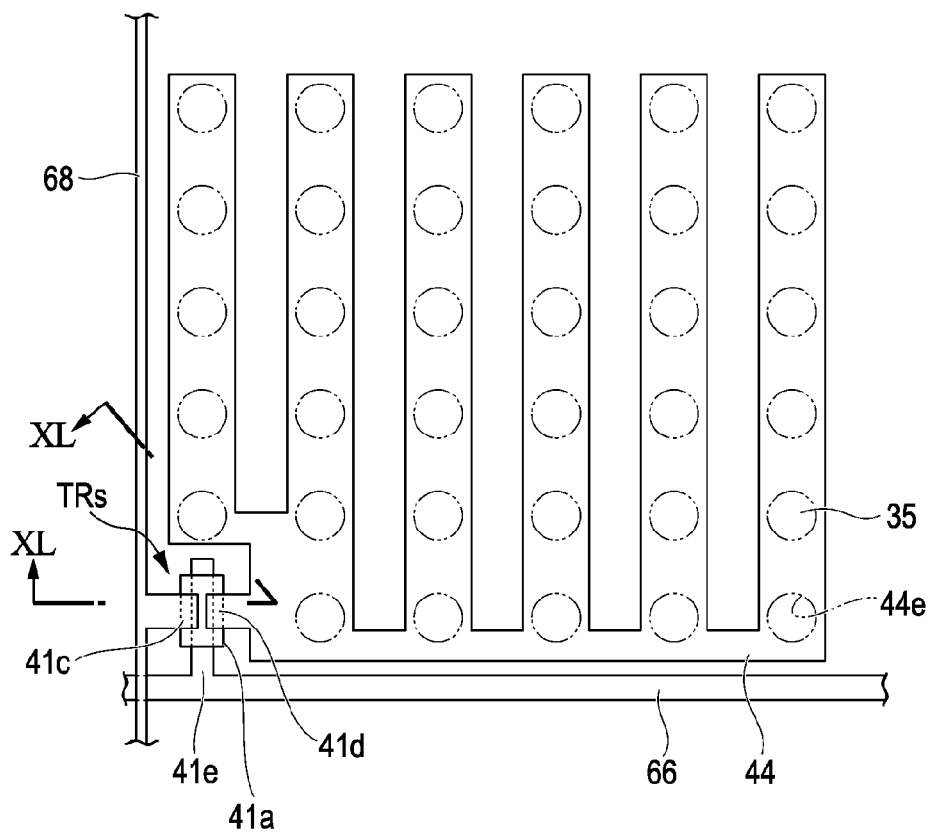
FIG. 39 is a planar diagram illustrating a modified example of a layout of one pixel shown in FIG. 9A.
Figure 40:
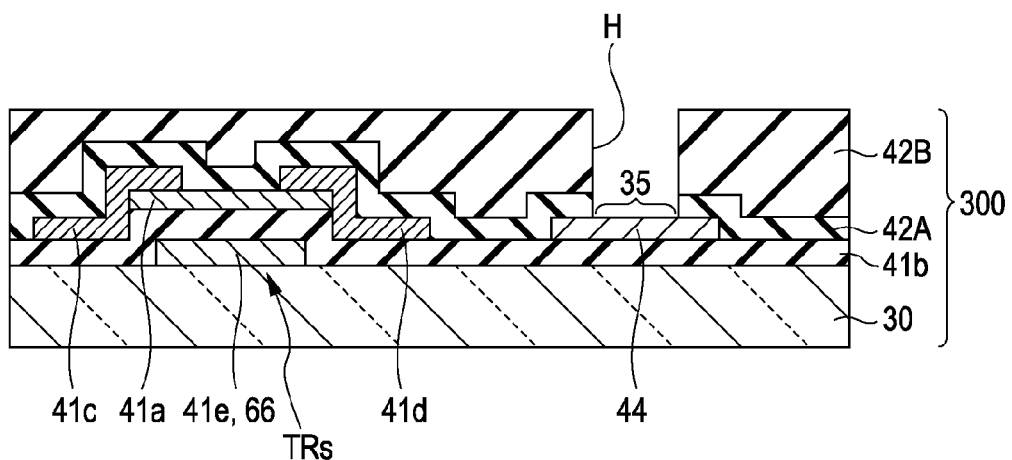
FIG. 40 is a cross-sectional diagram along a line XL-XL of FIG. 39.

FIGS. 38 to 40 are modified examples of FIG. 7 and FIGS. 9A and 9B. In addition, FIG. 39 is a rewriting of the outline diagram of FIG. 38 to a detailed planar diagram of a layout of one pixel, and FIG. 40 is a cross-sectional diagram along a line XXXX-XXXX of FIG. 39.

As shown in FIG. 38, here, the pixel electrode 35 with an island shape is not formed on the uppermost layer of the element substrate 300.

In the embodiment, the electrophoretic layer 32 is interposed between the element substrate 300 which includes from the first substrate 30 to the insulating film 42 and the opposing electrode 310 which includes the second substrate 31 and the opposing electrode 37, and a portion of the connection electrode 44 formed on the first substrate 30 is a connection portion 44a with an external circuit.

In the insulating film 42, a plurality of through holes 51 is formed for partially exposing the connection electrode 44. Specifically, as shown in FIGS. 39 and 40, the plurality of through holes 51 is formed at predetermined intervals following the shape of the connection electrode 44 so as to overlap with the connection electrode 44, and via the respective through holes 51, the connection electrode 44 is partially exposed. A portion of the connection electrode 44 which is exposed by the plurality of through holes 51 performs a function in the same manner as the pixel electrode 35 with an island shape shown in the previous embodiment and comes in contact with the electrophoretic layer 32. Even with the configuration such as this, the operation as the electrophoretic display device is the same as the embodiment described above.

For example, when the negative voltage VL is applied to the connection electrode 44, the positively charged particles 27 (W) are drawn to the connection electrode 44 side which is exposed in the through hole 51 and enter into the through hole 51. As a result, even in a case where the applying of the voltage to the connection electrode 44 is stopped, since many of the positively charged particles 27 (W) are held in the through hole 51, it is possible to prevent the spreading out of the particles when having moved to a state where a voltage is not applied.

Here, it is sufficient if the connection electrode 44 is not necessarily exposed from the insulating film. For example, in FIG. 40, there is the configuration where the interlayer insulating films 42A and 42B are both penetrated through and the connection electrode 44 is exposed, but there may be a configuration where only the interlayer insulating film 42B is penetrated through and the interlayer insulating film 42A remains. Even with this configuration, in a portion where the interlayer insulating film 42B has been removed, the fall in voltage at the interlayer insulating film 42B is lower than the other region where the interlayer insulating film 42B exists, and it is possible to more efficiently apply a voltage to the electro-optic material. As a result, a portion of the connection electrode 44A which is directly under the through hole formed in only the interlayer insulating film 42B functions in practice as the pixel electrode 35A.

Figure 41:
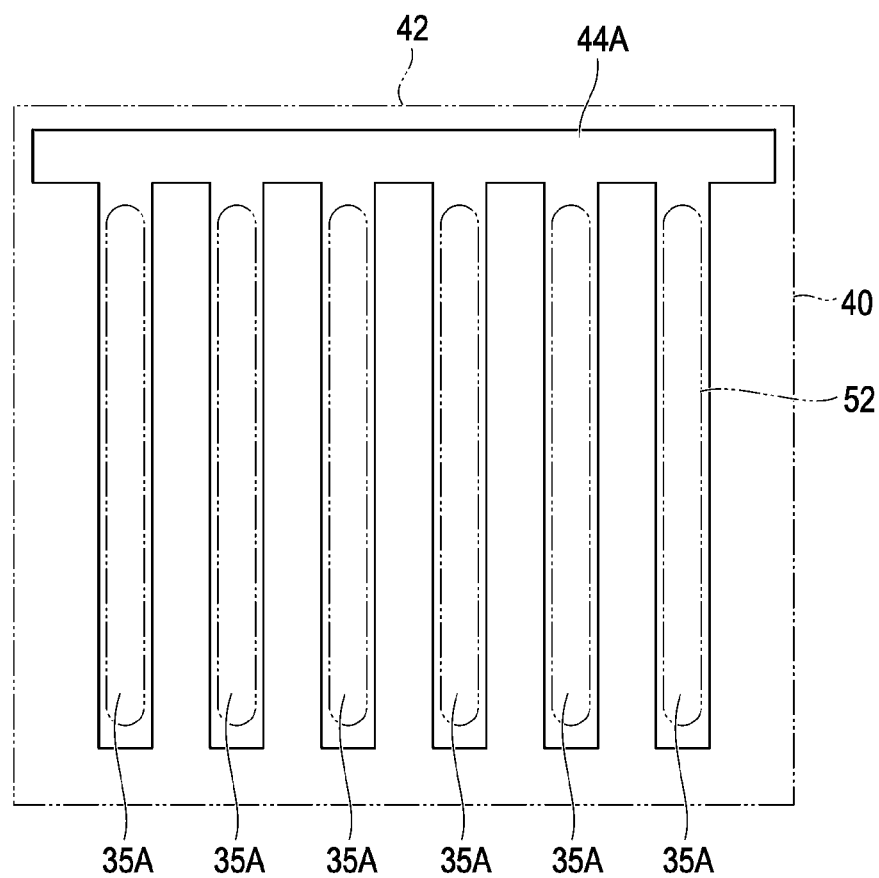
FIG. 41 is a modified example of FIG. 11.

FIG. 41 is a modified example of FIG. 11, and shows a configuration example of one pixel.

In FIG. 11 described above, there is a configuration where the plurality of pixel electrodes 35A arranged in a stripe shape are connected to each other via the connection electrode 44A with a planar rectangular shape which is provided at a lower layer side of the plurality of pixel electrodes 35A and extends along an arrangement direction of the plurality of pixel electrodes 35A. However, as shown in FIG. 41, the connection electrode 44A may be formed in a pectinate shape so as to include the pixel electrode 35A. In this case, there is a configuration where a plurality of long holes 52 with stripe shapes is formed in the insulating film 42 which is laminated on the connection electrode 44A and the connection electrode 44A is partially exposed, and a portion of the connection electrode 44A which is exposed in the long holes 52 may function as the pixel electrode 35A with an island shape.

In addition, in a case where the pixel electrode 35 is not provided in a separate layer as shown in FIGS. 38, 39, 40, and 41, it is preferable in terms of reliability that the material of the surface of the connection electrode 44 at least in the through hole 51 is the same material as the opposing electrode 37.

In addition, in the embodiment and modified example described above, the connection electrode is formed as a thin wire and is not an electrode which covers the pixel area with no gaps. In the case of the electrode with no gaps, a slight voltage is applied to the electro-optic material via the interlayer insulating film even in a region other than the pixel area. This works in a direction of hindering the operation of the electrophoretic display device of the invention. For example, as shown in FIG. 2A, when the charged particles are collected on the pixel electrodes, a portion of the charged particles remain on the connection electrode and are difficult to collect. In order to reduce the phenomena such as this, it is preferable if there is a configuration where the potential of the connection electrode is not applied to the electro-optic material. To achieve this, it is preferable if there is high resistance by the connection electrode being formed as a thin wire or the film thickness of the interlayer insulating film on the connection electrode being thickened.

FIGS. 42A to 43B are diagrams illustrating the distribution state of the charged particles in a configuration example of another electrophoretic display device.

The electrophoretic display device shown in FIGS. 42A to 43B is provided with a reflective electrode 45 which is formed on the substrate surface on a lower layer side of the two types of the pixel electrodes 35A and 35B which are driven independently of each other in one pixel.

In the configuration of the electrophoretic display device shown in FIGS. 2A to 2D described above, color display is performed by the scattering of the charged particles 27 (W) in the dispersion medium 21 (B). In this example, there is a configuration where the display is performed using the reflection of the reflective electrode 45.

The electrophoretic display device shown in FIGS. 42A to 43B has the configuration where the electrophoretic layer 32 is provided where two colors of the negatively charged particles 26 (R) and the positively charged particles 27 (B) which are formed from transparent particles are held in the transparent dispersion medium 21 (T). The negatively charged particles 26 (R) are formed from transparent particles with a red color and the positively charged particles 27 (B) are formed from transparent particles with a blue color.

In FIG. 42A, a state is shown where the positive voltage VH is applied to the pixel electrode 35B, the negative voltage VL is applied to the pixel electrode 35C, the negatively charged particles 26 (R) are collected on the pixel electrode 35B and the positively charged particles 27 (B) are collected on the pixel electrode 35C. At this time, external light which is incident from the opposing electrode 37 side is reflected by the reflective electrode 45 and exits to the outside. As a result, a white display can be obtained. The operation of performing a white display may be performed when changing an image as a preset operation.

In FIG. 42B, a state is shown where a display is performed on the basis of the white display shown in FIG. 42A, and after the preset operation, the negatively charged particles 26 (R) are moved from on the pixel electrode 35B to the opposing electrode 37 side when the negative voltage VL is applied to the pixel electrode 35B and the pixel electrode 35C and are distributed on the opposing electrode 37. Since the negatively charged particles 26 (R) are transparent, after passing through the red particles, the incident light from the outside is reflected by the reflective electrode 45, passes through the red particles again, and exits to the outside. The red particles have the transmittance characteristics shown in FIG. 13B and absorb light other than red. As a result, there is a red display.

In FIG. 42C, a state is shown where, after the preset operation shown in FIG. 42A, the positive voltage VH is applied to the pixel electrodes 35B and 35C, the positively charged particles 27 (B) with a blue color are moved from on the pixel electrode 35C to the opposing electrode 37 side, and are distributed on the opposing electrode 37. Since the blue particles absorb light other than blue, there is a blue display.

In FIG. 42D, a state is shown where, after the preset operation shown in FIG. 42A, first, after the negative voltage VL is applied to the pixel electrode 35B and the negatively charged particles 26 (R) with a red color are moved to the opposing electrode 37 side, the positive voltage VH is applied to the pixel electrodes 35C, and the positively charged particles 27 (B) with a blue color are moved to the opposing electrode 37 side and arranged under the red particles. In this manner, the red particles and the blue particles are layered in the vicinity of the opposing electrode 37. Since there is no visible light which is able to pass through both the red particles and the blue particles, there is a black display.

Here, in this example, the negatively charged particles 26 (R) with a red color are arranged to come into contact with the opposing electrode 37, but the positively charged particles 27 (B) with a blue color may be arranged to come into contact with the opposing electrode 37.

Figure 43A:
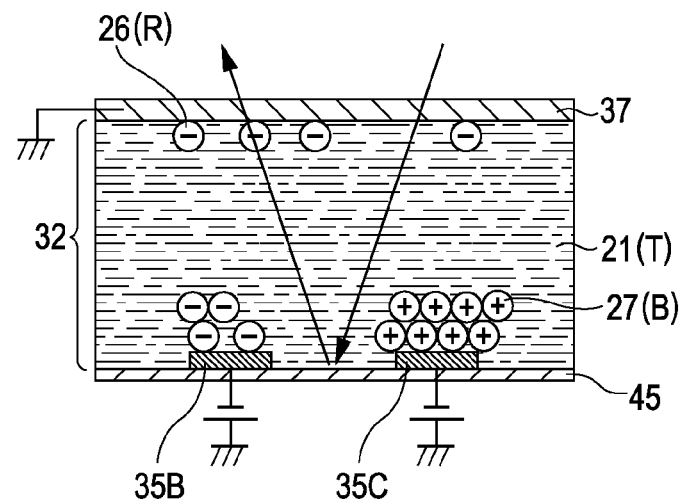
FIGS. 43A and 43B are diagrams illustrating the distribution state of the charged particles in another embodiment.

In FIG. 43A, after the preset operation shown in FIG. 42A, the negative voltage Vl (Vl<VL) is applied to the pixel electrode 35B and a portion of the negatively charged particles 26 (R) with a red color are moved to the opposing electrode 37 side. Even here, the saturation of the red color is controlled using the effective area viewed from the opposing electrode 37 side. In this manner, the gradation is controlled using the effective area of the particles which are visually recognized in practice viewed from the opposing substrate side.

In addition, as the black display, a black display is possible by applying a voltage, which arranges the red particles and the blue particles randomly in the opposing electrode 37 side and in the dispersion medium 21 (T), to each of the pixel electrodes 35B and 35C.

Here, the reflective electrode 45 may be on the outer side (the electrophoretic layer 32 side) of the first substrate 30 and, for example, formed in the same layer as the pixel electrode 35 in FIGS. 9A and 9B and may be at the first substrate 30. For example, the reflective electrode 45 may be formed in the same layer as the source and drain electrodes of the transistor.

In addition, the potential of the reflective electrode 45 may be floating, or a predetermined potential may be applied. For example, it is possible to smoothly move the particles to the pixel electrode 35 side or the opposing electrode 37 side by applying a voltage so as if to knock out the particles which have moved onto the reflective electrode 45. According to this, an effect is able to be obtained for shortening the image changing time.

Figure 43B:
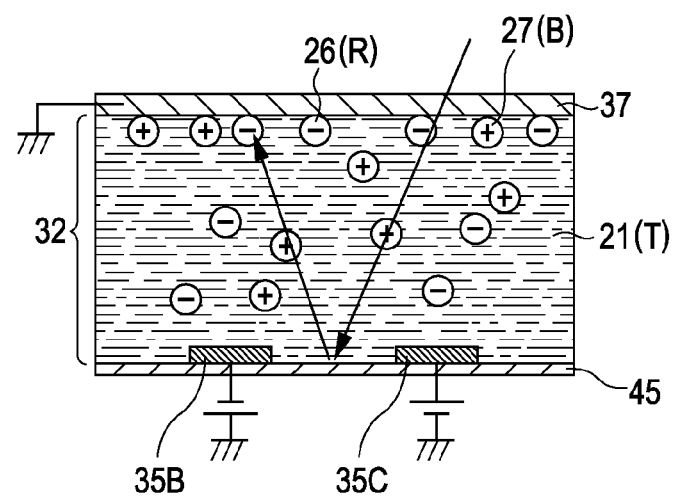

In FIGS. 42D and 43B, that a black display is able to be obtained is because the wavelengths of the red particles and the blue particles do not overlap. As a result, for example, it is possible to perform a black display in the same manner by there being a relationship where the colors of two particles are complementary colors and by using two colors whose wavelengths do not overlap.

In addition, in the embodiment and modified example described above, in FIGS. 2, 14, 15, and the like, it is described that the charged particles are arranged in the vicinity of the pixel electrode or the opposing electrode, but at this time, it is possible for the display to be held even after the applying of the voltage is stopped by the electrophoretic layer having a memory. For example, the charged particles may be electrically adsorbed to the opposing electrode 37 and the pixel electrode 35.

In FIGS. 42A to 43B, the colored particles are transparent particles but may be semi-transparent particles or transparent particles with reflectivity. Here, in regard to the reflectivity of the particles, it is desirable if isotropic scattered light is able to be obtained.

In addition, it is not necessary that the planar shape of the pixel electrode is a circular shape and may be another shape.

In addition, the distance (interval) between the pixel electrodes on the first substrate 30 may be set to be smaller than the distance (interval) between the pixel electrode and the opposing electrode.

In addition, the description above describes the display device where electrophoresis is used, but in practice, dielectrophoresis may be included therein. In a case where both are mixed, it is difficult for each of these to be strictly separated. Also in this case, in a case where the same phenomena as the description of the embodiment are generated, it is possible to consider it as an example of the embodiment.

In addition, the movement of the particles is assisted by the movement of the dispersion medium 21 which is generated by the movement of the particles 26 and 27 and the like, and it is easier to move the particles, but this case is also the same as described above.

What is claimed is:

1. An electrophoretic display device comprising:
a first substrate;
a second substrate;
an electrophoretic layer which is arranged between the first substrate and the second substrate and has at least a dispersion medium and particles mixed in the dispersion medium;
a first electrode which is formed in an island shape on the electrophoretic layer side of the first substrate for each pixel; and
a second electrode which is formed on the electrophoretic layer side of the second substrate with an area wider than the first electrode,
wherein gradation is controlled using an area of the particles which are visually recognized when the electrophoretic layer is viewed from the second electrode side;
the gradation includes a first gradation and a second gradation, the first gradation being displayed by applying a first voltage to the first electrode and a second voltage to the second electrode;
the second gradation is displayed by applying, in a first period, the first voltage to the first electrode and the second voltage to the second electrode and, in second period after the first period, by applying a third voltage to the first electrode and the second voltage to the second electrode, the third voltage being between the first voltage and the second voltage; and
the particles collect on the first electrode and the second electrode after the second period.

2. The electrophoretic display device according to claim 1, wherein a plurality of first electrodes is provided for each pixel and each of the plurality of first electrodes is mutually connected at a layer further to the first substrate side than the first electrodes.

3. The electrophoretic display device according to claim 1, further comprising:
a third electrode formed in an island shape for each pixel on the electrophoretic layer side of the first substrate,
wherein the first electrode and the third electrode are driven independently of each other.

4. The electrophoretic display device according to claim 3, wherein the width of the first electrodes and the third electrodes in a direction where the first electrodes are adjacent to each other and a direction where the first electrodes and the third electrodes are adjacent is shorter than a gap between the first electrode and the second electrode.

5. The electrophoretic display device according to claim 4, wherein the widths of the first electrode and the third electrode are equal to or less than half of the length of the gap between the first electrode and the second electrode.

6. The electrophoretic display device according to claim 1, wherein the particles are charged particles which have a positive or negative charge, and
non-charged particles with a color different from the charged particles are mixed in the dispersion medium.

7. The electrophoretic display device according to claim 6, wherein a mixed color of the color of the non-charged particles and the color of the charged particles is displayed according to an area of the non-charged particles and an area of the charged particles which are visually recognized when the electrophoretic layer is viewed from the second electrode side.

8. The electrophoretic display device according to claim 1, wherein first particles which have a positive charge and second particles which have a negative charge and a color different from the first particles are mixed in the dispersion medium.

9. The electrophoretic display device according to claim 8, wherein a mixed color of the color of the first particles and the color of the second particles is displayed according to an area of the first particles and an area of the second particles which are visually recognized when the electrophoretic layer is viewed from the second electrode side.

10. The electrophoretic display device according to claim 1, wherein the dispersion medium is colored.

11. The electrophoretic display device according to claim 1, wherein a color filter is provided on the first substrate side or the second substrate side of the electrophoretic layer.

12. The electrophoretic display device according to claim 1, wherein the particles have a transparent portion and a colored portion, and
the colored portion is configured so that transmissivity varies according to wavelength.

13. An electronic apparatus comprising:
the electrophoretic display device according to claim 1.

14. An driving method of an electrophoretic display device, which is provided with a first substrate, a second substrate, an electrophoretic layer which is arranged between the first substrate and the second substrate and has at least a dispersion medium and particles mixed in the dispersion medium, a first electrode which is formed in an island shape on the electrophoretic layer side of the first substrate and is provided for each pixel, a second electrode which is formed on the electrophoretic layer side of the second substrate with an area wider than the first pixel electrode, where gradation is controlled using an area of the particles which are visually recognized when the electrophoretic layer is viewed from the second electrode side, comprising the steps of:
a first applying a first voltage to the first electrode and a second voltage to the second electrode for displaying a first gradation; and
a second applying the first voltage to the first electrode and the second voltage to the second electrode in a first period and applying a third voltage to the first electrode and the second voltage to the second electrode in a second period after the first period for displaying a second gradation, the third voltage being between the first voltage and the second voltage, and the particles collecting on the first electrode and the second electrode by the second applying.

15. The driving method of an electrophoretic display device according to claim 14, wherein the two-dimensional and three-dimensional distribution of the charged particles on the second substrate side is controlled using the size and the application time of the voltage applied to the first electrode and the second electrode.

16. The driving method of an electrophoretic display device according to claim 14, wherein the application time is controlled using a pulse width or the number of frames.

17. The driving method of an electrophoretic display device according to claim 14, wherein the electrophoretic display device has a third electrode formed in an island shape for each pixel on the electrophoretic layer side of the first substrate, and voltages which are different from each other are applied at the same time to the first electrode and the third electrode.

18. The driving method of an electrophoretic display device according to claim 14, wherein the electrophoretic display device has a third electrode formed in an island shape for each pixel on the electrophoretic layer side of the first substrate and voltages which are different from each other are sequentially applied to the first electrode and the third electrode.

19. The driving method of an electrophoretic display device according to claim 14, the electrophoretic display device further having a third electrode formed in an island shape for each pixel on the electrophoretic layer side of the first substrate, and the method further comprising the steps of:
performing a first preset operation where the particles are drawn to the first electrode side and the third electrode side by a positive voltage being applied to the first electrode with regard to the second electrode and a negative voltage being applied to the third electrode with regard to the second electrode; and
performing a second preset operation where the particles are drawn to the first electrode side and the third electrode side by a negative voltage being applied to the first electrode with regard to the second electrode and a positive voltage being applied to the third electrode with regard to the second electrode.

20. The driving method of an electrophoretic display device according to claim 19, wherein the first preset operation and the second preset operation are alternately performed.

* * * * *